(12) United States Patent
Matsuzaki et al.

(10) Patent No.: US 8,356,170 B2
(45) Date of Patent: Jan. 15, 2013

(54) MANAGEMENT-APPARATUS CARD, MEASURING APPARATUS, HEALTH CARE SYSTEM, AND METHOD FOR COMMUNICATING VITAL SIGN DATA

(75) Inventors: Natsume Matsuzaki, Osaka (JP); Kaoru Yokota, Hyogo (JP); Yuichi Futa, Osaka (JP); Masao Nonaka, Osaka (JP); Shunji Harada, Osaka (JP)

(73) Assignee: Panasonic Corporation, Osaka (JP)

( * ) Notice: Subject to any disclaimer, the term of this patent is extended or adjusted under 35 U.S.C. 154(b) by 1132 days.

(21) Appl. No.: 12/249,212

(22) Filed: Oct. 10, 2008

(65) Prior Publication Data

US 2009/0097641 A1   Apr. 16, 2009

(30) Foreign Application Priority Data

Oct. 12, 2007   (JP) ................................ 2007-266863
Aug. 29, 2008   (JP) ................................ 2008-221724

(51) Int. Cl.
*H04L 29/06* (2006.01)
*H04L 9/00* (2006.01)

(52) U.S. Cl. ........ 713/150; 713/182; 713/189; 713/193; 380/44

(58) Field of Classification Search .................... 713/150
See application file for complete search history.

(56) References Cited

U.S. PATENT DOCUMENTS 6,268,788 B1 * 7/2001 Gray .............................. 340/5.2

2002/0166048 A1 * 11/2002 Coulier .......................... 713/169
2003/0038965 A1 *  2/2003 Simpson et al. ............. 358/1.15
2007/0006322 A1 *  1/2007 Karimzadeh et al. ........... 726/27
2007/0078866 A1 *  4/2007 Takashima .................... 707/100

OTHER PUBLICATIONS

Ascii Media Works, Mar. 8, 2007, "*Tanita Starts Healthcare Service "Monitoring Your Health" Using Network*", retrieved on Oct. 11, 2007 from <http://ascii24.com/news/i/serv/article/2007/03/08/667789-000.html>.

* cited by examiner

*Primary Examiner* — David Pearson
*Assistant Examiner* — Mohammad L Rahman
(74) *Attorney, Agent, or Firm* — Wenderoth, Lind & Ponack, L.L.P.

(57) ABSTRACT

The management-apparatus card capable of being attached to a management apparatus receives, from the measuring apparatus, first unique information indicating the measuring apparatus, and identification information indentifying a user of the measuring apparatus; stores second unique information indicating the management-apparatus card; generates a decryption key corresponding to an encryption key, using the first unique information, the second unique information, and the identification information; stores the generated decryption key; receives encrypted vital sign data from the measuring apparatus; decrypts the received vital sign data using the stored decryption key; and obtains the decrypted vital sign data.

20 Claims, 29 Drawing Sheets

Key storage unit

<Measuring-apparatus information table>  1064a

| Measuring-apparatus ID | Button number | Network ID | Shared key |
|---|---|---|---|
| Weight scales 1 | 2 | 123 | K_a |
| Blood pressure meter 2 | 1 | 111 | K_b |

<Service information table>  1064b

| Service ID | Measurement category | Network ID | Shared key |
|---|---|---|---|
| Service A | User ID, Body weight | URL1 | K_1 |
| Service B | User ID, Blood pressure | URL2 | K_2 |

FIG. 22

Key storage unit — 1028

<Management-apparatus information table> — 1028a

| Management-apparatus-card ID | Measuring-apparatus ID | Button number | Network ID | Public key |
|---|---|---|---|---|
| Management-apparatus-card ID1 | Weight scales 1 | 2 | 123 | Public key a |
| Management-apparatus-card ID2 | Weight scales 1 | 1 | 111 | Public key b |

FIG. 23

Key storage unit 1064

<Measuring-apparatus information table> 1064a

| Measuring-apparatus ID | Button number | Network ID | Secret key |
|---|---|---|---|
| Weight scales 1 | 2 | 123 | Secret key a |
| Blood pressure meter 2 | 1 | 111 | Secret key b |

<Service information table> 1064b

| Service ID | Measurement category | Network ID | Public key |
|---|---|---|---|
| Service A | User ID, Body weight | URL1 | Public key a |
| Service B | User ID, Blood pressure | URL2 | Public key b |

MANAGEMENT-APPARATUS CARD, MEASURING APPARATUS, HEALTH CARE SYSTEM, AND METHOD FOR COMMUNICATING VITAL SIGN DATA

BACKGROUND OF THE INVENTION (1) Field of the Invention

The present invention relates to a management-apparatus card, a measuring apparatus, a health care system, and a method for communicating vital sign data which allow personal vital sign data to be personally managed.

(2) Description of the Related Art

A conventional weight scales having a body fat measuring function includes plural buttons. For instance, in the case where family members commonly use the weight scales having the body fat measuring function, respective users input a body height of a user or the like in association with each button in advance. When a user wants to measure a body weight of the user, the user presses a button before measuring the body weight, the button being associated with a body height of the user. However, since such information is only registered or distinguished in association with a button, the information inputted is not linked to information identifying a user. Hence, in order to notify vital sign data measured by the user to a health care service provider, for example, via the Internet, it has been necessary to manually and separately input information or the like identifying the user.

On the other hand, as a personal health care management apparatus to which the provision of services has been started recently, there is a portable apparatus having, for example, an infrared communication function and an USB terminal (see, for instance, Non-patent Reference 1: ASCII Media Works. (Mar. 8, 2007). "Tanita, nettowaaku wo riyoushita herusu kea saabisu 'monitaringu yua herusu' wo kaishi." ("Tanita launches health care service 'Monitoring Your Health' using network.") Retrieved on Oct. 11, 2007, from http://ascii24.com/news/i/serv/article/2007/03/08/67789-000/html). When the user carrying the portable apparatus steps on a weight scales, the portable apparatus receives weight information measured by the weight scales through infrared communication with an infrared sensor of the weight scales. Then, the portable apparatus stores the received weight information. Subsequently, when the portable apparatus is connected to the USB terminal of an apparatus (e.g. a personal computer (PC)) that can be connected to a service providing server via a network, the apparatus such as the PC transmits the measured weight information to the service providing server. As a result, the user can receive health care services from the service providing server.

With the above conventional structure, however, the user has to measure the body weight of the user, carrying the above portable apparatus. Accordingly, in the case where, for example, the user wants to measure the body weight or the like after taking a bath, the conventional structure has caused significant inconvenience to the user. Furthermore, the weight information is personal information that some people do not want even their family members to know, and the conventional structure poses a problem from the point of view of privacy protection.

SUMMARY OF THE INVENTION

The present invention is devised to solve the above-mentioned conventional problems, and has an object of providing a management-apparatus card and the like which are highly convenient for the user and which can assure, for each user, confidentiality of vital sign data in collecting the vital sign data such as a body weight from a measuring apparatus.

In order to solve the above-mentioned conventional problems, the management-apparatus card according to one aspect of the present invention is a management-apparatus card capable of being attached to a management apparatus, the management apparatus receiving encrypted vital sign data from a measuring apparatus and managing the received encrypted vital sign data, the measuring apparatus measuring vital sign data of a user of the measuring apparatus and encrypting the vital sign data using an encryption key. The management-apparatus card includes: an interface unit configured to receive, from the measuring apparatus, first unique information indicating the measuring apparatus, and identification information indentifying the user of the measuring apparatus; a first storage unit configured to store second unique information indicating the management-apparatus card; a generation unit configured to generate a decryption key corresponding to the encryption key, using the first unique information, the second unique information, and the identification information; a second storage unit configured to store the generated decryption key; and a control unit configured to receive the encrypted vital sign data from the measuring apparatus, to decrypt the received vital sign data using the stored decryption key, and to obtain the decrypted vital sign data.

FURTHER INFORMATION ABOUT TECHNICAL BACKGROUND TO THIS APPLICATION

The disclosure of Japanese Patent Application No. 2007-266863 filed on Oct. 12, 2007 and Japanese Patent Application No. 2008-221724 filed on Aug. 29, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the accompanying drawings:

FIG. 9 is a diagram illustrating respective examples of a measuring-apparatus information table and a service information table according to the embodiment 1 of the present invention;

FIG. 22 is a diagram illustrating an example of a management-apparatus information table according to the embodiment 2 of the present invention;

FIG. 23 is a diagram illustrating respective examples of a measuring-apparatus information table and a service information table according to the embodiment 2 of the present invention;

DESCRIPTION OF THE PREFERRED EMBODIMENT(S)

Figure 1:
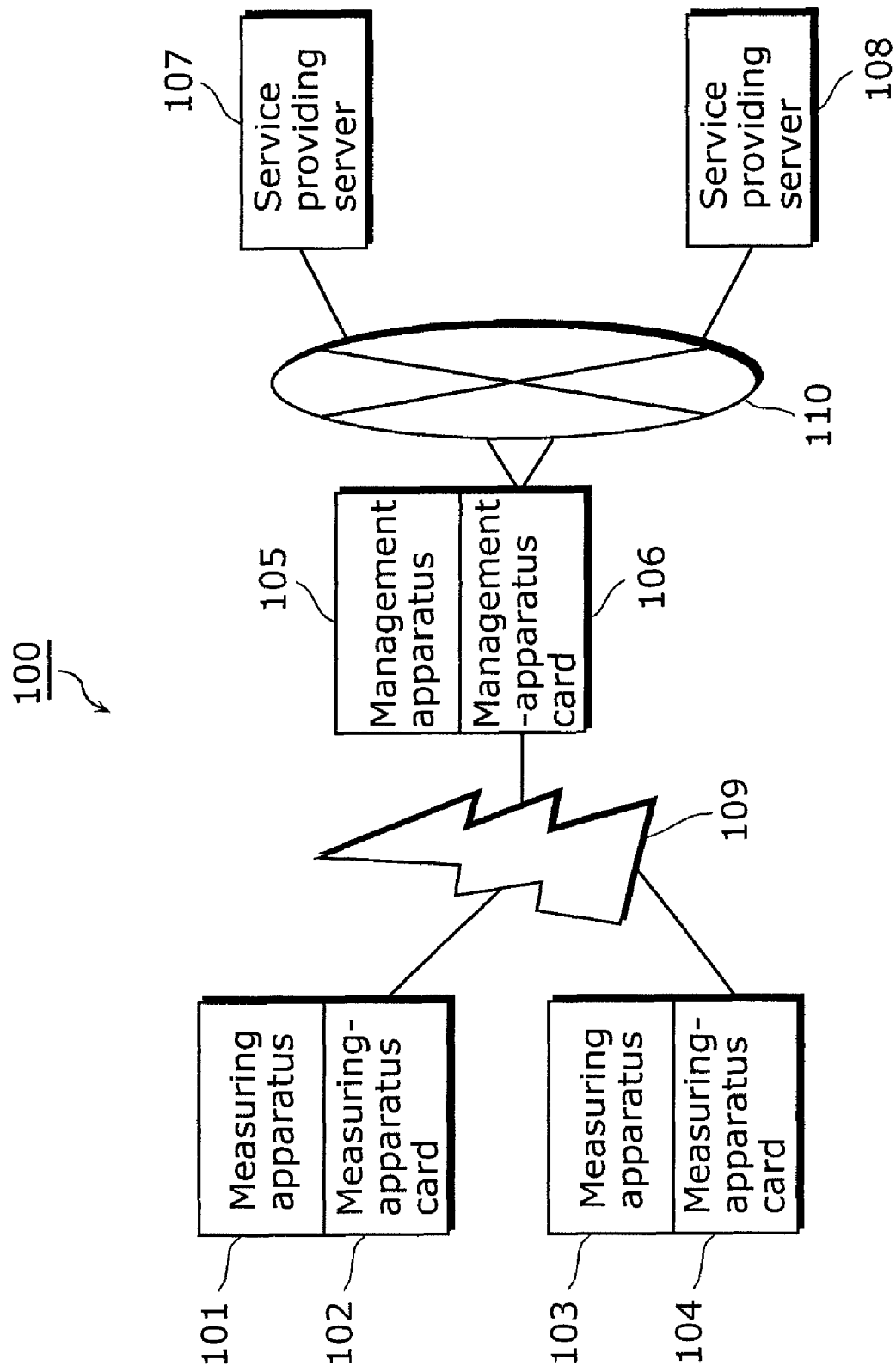
FIG. 1 is a schematic diagram illustrating a health care system according to embodiments 1 and 2 of the present invention.

A management-apparatus card according to a first aspect of the present invention is a management-apparatus card capable of being attached to a management apparatus, the management apparatus receiving encrypted vital sign data from a measuring apparatus and managing the received encrypted vital sign data, the measuring apparatus measuring vital sign data of a user of the measuring apparatus and encrypting the vital sign data using an encryption key. The management-apparatus card includes: an interface unit configured to receive, from the measuring apparatus, first unique information indicating the measuring apparatus, and identification information indentifying the user of the measuring apparatus; a first storage unit configured to store second unique information indicating the management-apparatus card; a generation unit configured to generate a decryption key corresponding to the encryption key, using the first unique information, the second unique information, and the identification information; a second storage unit configured to store the generated decryption key; and a control unit configured to receive the encrypted vital sign data from the measuring apparatus, to decrypt the received vital sign data using the stored decryption key, and to obtain the decrypted vital sign data.

According to the first aspect of the present invention, the management-apparatus card generates the decryption key which is used to decrypt the vital sign data encrypted by the measuring apparatus using the encryption key, based on the first unique information received from the measuring apparatus, the identification information received from the measuring apparatus, and the second unique information stored in the management-apparatus card itself. Because the management-apparatus card generates the decryption key based on the first unique information and the identification information both of which can be received from the measuring apparatus, the management-apparatus card is associated with the measuring-apparatus card through the generated decryption key. As a result, it becomes possible to transmit and receive the vital sign data between the measuring apparatus and the management-apparatus card with the confidentiality of the vital sign data being assured.

Furthermore, because the encryption key is generated based on the identification information and the vital sign data of the user is decrypted using a decryption key which is unique to the user and is generated based on user information identifying the user, the vital sign data of the user cannot be decrypted using a decryption key of another user, and thus the confidentiality of the vital sign data can be assured.

Moreover, the decryption key is generated also based on the second unique information stored in the management-apparatus card itself. Because the decryption key is generated also based on information having an information source different from an information source of the first unique information and identification information which can be received from the measuring apparatus, the decryption key cannot be generated without information from both information sources. As a result, the confidentiality of the generated decryption key can be assured.

Further, the decryption key is generated based on information including the identification information. In the case where the user is identified based on the identification information and a request for the vital sign data corresponding to the identification information is transmitted to the measuring apparatus, because the encrypted vital sign data corresponding to the identification information can be decrypted using the generated decryption key, it is not necessary to generate the decryption key in association with the user of the vital sign data, and it is possible to receive only necessary vital sign data with the confidentiality of personal information being assured.

Moreover, in the management-apparatus card according to the first aspect of the present invention, the interface unit may receive the first unique information and the identification information from the measuring apparatus, when the management-apparatus card is attached to the measuring apparatus.

According to the first aspect of the present invention, because the management-apparatus card can receive the first unique information and the identification information from the measuring apparatus only when the management-apparatus card is directly attached to the measuring apparatus, the first unique information and the identification information are never leak out through communication. As a result, the confidentiality of the generated decryption key can be assured.

Furthermore, in a management-apparatus card according to a second aspect of the present invention, the encryption key may be a public key, the decryption key may be a secret key corresponding to the public key, and the generation unit may generate the public key and the secret key, using the first unique information, the second unique information, and the identification information.

A measuring apparatus according to the first aspect of the present invention transmits vital sign data to a management-apparatus card attached to a management apparatus, the management apparatus managing the vital sign data. The measuring apparatus includes: a measuring unit configured to measure vital sign data of a user of the measuring apparatus; a storage unit configured to store first unique information indicating the measuring apparatus; an interface unit configured to receive second unique information indicating a management-apparatus card from the management-apparatus card, to store, in the storage unit, the second unique information in association with identification information identifying the user, and to transmit the first unique information and the identification information to the management-apparatus card; and a control unit configured to obtain, from the storage unit, the first unique information, the second unique information, and the identification information, to generate an encryption key based on the first unique information, the second unique information, and the identification information, to obtain the vital sign data corresponding to the user from the measuring unit, to encrypt the received vital sign data using the encryption key, and to transmit the encrypted vital sign data to the management-apparatus card.

According to the first aspect of the present invention, the management-apparatus card generates the decryption key which is used to decrypt the vital sign data encrypted by the measuring apparatus using the encryption key, based on the first unique information received from the measuring apparatus, the identification information received from the measuring apparatus, and the second unique information stored in the management-apparatus card itself. Because the measuring-apparatus card generates the encryption key based on the first unique information and the identification information both of which can be received from the measuring apparatus, and the second unique information which can be received from the management-apparatus card, the measuring-apparatus card is associated with the management-apparatus card through the generated encryption key. As a result, it becomes possible to transmit and receive the vital sign data between the measuring apparatus and the management-apparatus card with the confidentiality of the vital sign data being assured.

Moreover, because the encryption key is generated based on the identification information and the vital sign data of the user is encrypted using an encryption key which is unique to the user and is generated based on user information identifying the user, the vital sign data of the user cannot be decrypted using a decryption key corresponding to an encryption key of another user, and thus the confidentiality of the vital sign data can be assured.

Further, the encryption key is generated based on the second unique information which can be received from the measuring apparatus to which the measuring-apparatus card is to be attached. Because the encryption key is generated also based on information having an information source different from an information source of the second unique information stored in the management-apparatus card itself, the encryption key cannot be generated without information from both information sources. Consequently, the confidentiality of the generated encryption key can be assured.

A health care system according to the first aspect of the present invention is a health care system including a measuring apparatus, a management apparatus, a measuring-apparatus card, and a management-apparatus card, the measuring apparatus measuring vital sign data, the management apparatus managing the vital sign data, the measuring-apparatus card being attached to the measuring apparatus and transmitting the vital sign data to the management apparatus, and the management-apparatus card being attached to the management apparatus, receiving the vital sign data, and storing the received vital sign data in the management apparatus, wherein the management-apparatus card includes: a first interface unit configured to receive, from the measuring apparatus, first unique information indicating the measuring apparatus, and identification information indentifying a user of the measuring apparatus; a first storage unit configured to store second unique information indicating the management-apparatus card; a first control unit configured to generate a decryption key, using the first unique information, the second unique information, and the identification information; and a second storage unit configured to store the generated decryption key, the measuring apparatus includes: a measuring unit configured to measure the vital sign data of the user of the measuring apparatus; a third storage unit configured to store the first unique information; and a second interface unit configured to receive the second unique information from the management-apparatus card, and transmit the first unique information and the identification information to the management-apparatus card, the measuring-apparatus card includes a second control unit configured to receive, from the measuring apparatus, the first unique information, the second unique information, and the identification information, to generate an encryption key corresponding to the decryption key based on the first unique information, the second unique information, and the identification information, to receive the vital sign data corresponding to the user from the measuring apparatus, to encrypt the received vital sign data using the encryption key, and to transmit the encrypted vital sign data to the management-apparatus card attached to the measuring apparatus, and the first control unit is configured to decrypt the encrypted vital sign data using the decryption key stored in the second storage unit, and transmit the decrypted vital sign data to the management apparatus, when the management-apparatus card receives the encrypted vital sign data from the measuring-apparatus card.

According to the first aspect of the present invention, the management-apparatus card generates the decryption key based on the first unique information received from the measuring apparatus, the identification information received from the measuring apparatus, and the second unique information, while the measuring-apparatus card receives the first unique information from the measuring apparatus, the second unique information from the management apparatus, and the identification information from the management-apparatus card, and generates the encryption key corresponding to the decryption key. Because the measuring-apparatus card and the management-apparatus card generate the encryption key and the decryption key, respectively, based on the first unique information and the identification information both of which can be received from the measuring apparatus and the second unique information which can be received from the management-apparatus card, the measuring-apparatus card and the management-apparatus card are associated with each other through the generated encryption key and decryption key, the encryption key and the decryption key corresponding to each other. As a result, it becomes possible to transmit and receive the vital sign data between the measuring-apparatus card and the management-apparatus card with the confidentiality of the vital sign data being assured.

Moreover, because the encryption key is generated based on the identification information and the vital sign data of the user is encrypted using an encryption key which is unique to the user and is generated based on user information identifying the user, the vital sign data of the user cannot be decrypted using an encryption key of another user, and thus the confidentiality of the vital sign data can be assured.

In addition, because the first unique information which can be received from the measuring apparatus and the second unique information which can be received from the management-apparatus card have different information sources, the encryption key cannot be generated without information from both information sources. Consequently, the confidentiality of the generated encryption key can be assured.

Further, the decryption key is generated based on information including the identification information. In the case where the user is identified based on the identification information and a request for the vital sign data corresponding to the identification information is transmitted to the measuring apparatus, because the encrypted vital sign data corresponding to the identification information can be decrypted using the generated decryption key, it is not necessary to generate the decryption key in association with the user of the vital sign data, and it is possible to receive only necessary vital sign data with the confidentiality of personal information being assured.

In the health care system according to the first aspect of the present invention, the measuring apparatus further includes an identification unit configured to identify the user among a plurality of users of the measuring apparatus, and the second interface unit may transmit, to the management-apparatus card, identification information of the user identified by the identification unit, when the management-apparatus card is attached to the second interface unit, and may transmit, to the measuring-apparatus card, vital sign data of the user identified by the identification unit, when the measuring-apparatus card is attached to the second interface unit.

According to the first aspect of the present invention, because the same identification unit is used in the case where the management-apparatus card is attached to the second interface unit and where the measuring-apparatus card is attached to the second interface unit, it is not necessary to provide a unit separately in the above-mentioned cases, and reduction in the number of components allows the miniaturization of a device.

Moreover, in the health care system according to the first aspect of the present invention, the identification unit may be a button provided to the measuring apparatus.

A health care system according to the second aspect of the present invention is a health care system including a measuring apparatus, a management apparatus, a measuring-apparatus card, and a management-apparatus card, the measuring apparatus measuring vital sign data, the management apparatus managing the vital sign data, the measuring-apparatus card being attached to the measuring apparatus and transmitting the vital sign data to the management apparatus, and the management-apparatus card being attached to the management apparatus, receiving the vital sign data, and storing the received vital sign data in the management apparatus, wherein the management-apparatus card includes: a first interface unit configured to receive, from the measuring apparatus, first unique information indicating the measuring apparatus, and identification information indentifying a user of the measuring apparatus; a first storage unit configured to store second unique information indicating the management-apparatus card; a first control unit configured to generate a public key and a secret key in advance, using the first unique information, the second unique information, and the identification information; and a second storage unit configured to store the generated secret key, the measuring apparatus includes: a measuring unit configured to measure the vital sign data of the user of the measuring apparatus; a third storage unit configured to store the first unique information; and a second interface unit configured to transmit the first unique information and the identification information to the management-apparatus card, and receive the public key from the management-apparatus card, the public key being generated at the management-apparatus card by using the first unique information and the identification information transmitted by the second interface unit, the measuring-apparatus card includes a second control unit configured to receive, from the measuring apparatus, the public key and the vital sign data corresponding to the user, to encrypt the received vital sign data using the public key, and to transmit the encrypted vital sign data to the management-apparatus card attached to the measuring apparatus, and the first control unit is configured to decrypt the encrypted vital sign data using the secret key stored in the second storage unit, and store the decrypted vital sign data in the management apparatus, when the management-apparatus card receives the encrypted vital sign data from the measuring-apparatus card.

According to the second aspect of the present invention, the management-apparatus card may generate the public key and the secret key based on the first unique information, the second unique information, and the identification information, transmit the public key to the measuring-apparatus card via the measuring apparatus, and encrypt the vital sign data using the public key. On the other hand, the management-apparatus card may decrypt the vital sign data encrypted using the secret key.

It is to be noted that the above-mentioned aspects may be realized, for example, not only as a device but also as an integrated circuit having a processing unit included in such a device, a method with which processes performed by the processing unit included in the device are executed, and a program which causes a computer to execute these processes. The program may be distributed via recording media such as CD-ROM and via communication media such as the Internet.

The following will describe embodiments of the present invention with reference to the drawings.

Embodiment 1

FIG. 1 is a schematic diagram illustrating a health care system 100 according to the embodiment 1 of the present invention. As shown in FIG. 1, the health care system 100 includes: measuring apparatuses 101 and 103; measuring-apparatus cards 102 and 104, a management apparatus 105; a management-apparatus card 106; and service providing servers 107 and 108. Here, in the health care system 100, the measuring-apparatus cards 102 and 104 and the management-apparatus card 106 are connected to one another via a near field wireless communication path 109. Moreover, the management-apparatus card 106 and the service providing servers 107 and 108 are connected to one another via a communication path 110.

The measuring apparatuses 101 and 103 are, for instance, a weight scales and a blood pressure meter, respectively, and each measure vital sign data of a user. Here, the vital sign data indicates information regarding health such as a body weight, a body fat, and a blood pressure of the user, or a measurement value of the information.

The measuring-apparatus cards 102 and 104 each are a card attachable to the measuring apparatuses 101 and 103. In addition, the measuring-apparatus cards 102 and 104 each receive vital sign data measured respectively by the measuring apparatuses 101 and 103 from the measuring apparatuses 101 and 103 to which the measuring-apparatus cards 102 and 104 are attached, respectively. Subsequently, the measuring-apparatus cards 102 and 104 each accumulate the received vital sign data. Further, the measuring-apparatus cards 102 and 104 each transmit a measurement value corresponding to the management-apparatus card 106 to the management-apparatus card 106 via the near field wireless communication path 109. Specifically, the measuring-apparatus cards 102 and 104 each are, for example, a contact IC card having a near field wireless communication function such as Bluetooth™ and WiFi™.

The management apparatus 105 is, for instance, a PC, and displays the measurement value stored in the management-apparatus card 106.

The management-apparatus card 106 is a card attachable (e.g., physically attachable) to the measuring apparatuses 101 and 103 and the management apparatus 105. Under the control of the management apparatus 105, the management-apparatus card 106 receives measurement values such as the body weight and the blood pressure of the user from the measuring-apparatus cards 102 and 104 via the near field wireless communication path 109. Further, the management-apparatus card 106 accumulates the vital sign data received from the measuring-apparatus cards 102 and 104. In addition, the management-apparatus card 106 transmits only the measurement values each corresponding to a corresponding one of the service providing servers 107 and 108 to the service providing servers 107 and 108 via the communication path 110.

The near field wireless communication path 109 is, for instance, the Bluetooth. Moreover, the communication path 110 is, for example, a wide area communication network such as the Internet.

The following will describe an outline of each component included in the health care system 100 as shown in FIG. 1.

<Measuring Apparatus 101>

Figure 2:
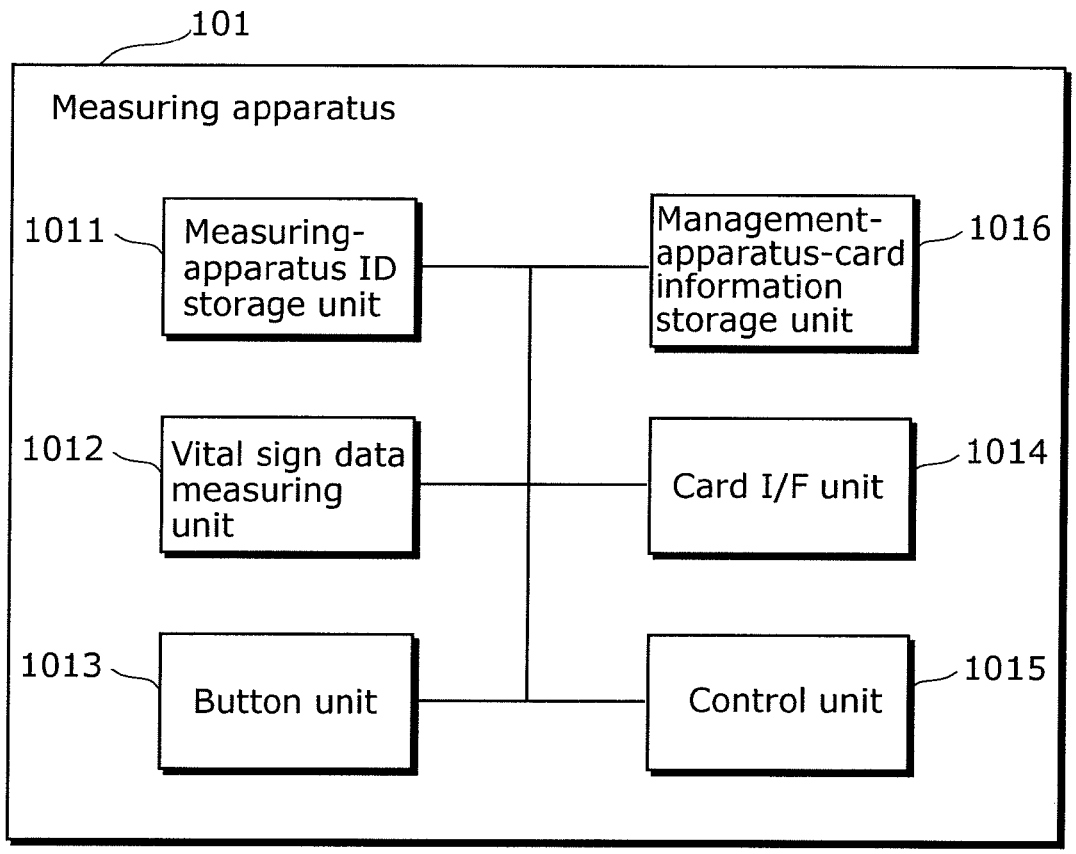
FIG. 2 is a diagram illustrating a functional configuration of a measuring apparatus according to the embodiments 1 and 2 of the present invention.

FIG. 2 is a diagram illustrating a functional configuration of the measuring apparatus 101. It is to be noted that the description of the measuring apparatus 103 is omitted since the measuring apparatus 103 has the same functional configuration as the measuring apparatus 101. As shown in FIG. 2, the measuring apparatus 101 includes a measuring-apparatus ID storage unit 1011, a vital sign data measurement unit 1012, a button unit 1013, a card I/F unit 1014, a control unit 1015, and a management-apparatus-card information storage unit 1016.

The measuring-apparatus ID storage unit 1011 stores identification information of the measuring apparatus 101. That is to say, a measuring-apparatus ID, which is information indicating the measuring apparatus 101, is stored in the measuring-apparatus ID storage unit 1011, and the vital sign data measurement unit 1012 measures vital sign data of a user.

The button unit 1013 is an example of a specifying unit or an identification unit, and identifies which user among users uses the measuring apparatus 101. For instance, the button unit 1013 includes buttons provided to the measuring apparatus 101.

Moreover, each button is identified by a corresponding button number. That is to say, the button number is an example of identification information identifying the user of the measuring apparatus 101.

Specifically, for example, in the case where the measuring apparatus 101 is a weight scales, the button unit 1013 corresponds to buttons (each of which is labeled as a button 1, a button 2, and so on) for measurement with each family member being identified. The measuring-apparatus card 102 registers each measurement value (vital sign data) of a corresponding family member in association with a corresponding one of the buttons. Furthermore, each user information such as a height and age of the user necessary at a time when the vital sign data measurement unit 1012 measures a measurement value of the user may be registered in association with a corresponding one of the buttons. For instance, in the case where a height of a father is registered in association with the button 1 in advance, when the father presses the button 1 and steps on the weight scales, the vital sign data measurement unit 1012 measures a body weight and a body fat of the father in association with the button 1.

The card I/F unit 1014 is an example of an interface unit. When the management-apparatus card 106 is attached to the measuring apparatus 101, the card I/F unit 1014 receives a management-apparatus-card ID, information indicating the management-apparatus card 106, from the management-apparatus card 106. Subsequently, the card I/F unit 1014 stores the received management-apparatus-card ID into the management-apparatus-card information storage unit 1016. Further, when the management-apparatus card 106 is attached to the measuring apparatus 101, the card I/F unit 1014 provides a measuring-apparatus ID and a button number to the management-apparatus card 106.

Specifically, in a measuring apparatus registration phase where information regarding the management-apparatus card 106 is registered on the measuring apparatus 101, the management-apparatus card 106 is connected to the card I/F unit 1014. On the other hand, in a measurement phase where vital sign data is measured, the measuring-apparatus card 102 is connected to the card I/F unit 1014. In the measurement phase, the card I/F unit 1014 transmits, to the measuring-apparatus card 102 to which the card I/F unit 1014 is attached, a measuring apparatus ID, a measurement value, and a button number (e.g. 1).

The control unit 1015 controls various functions held by the measuring apparatus 101.

Figure 3:
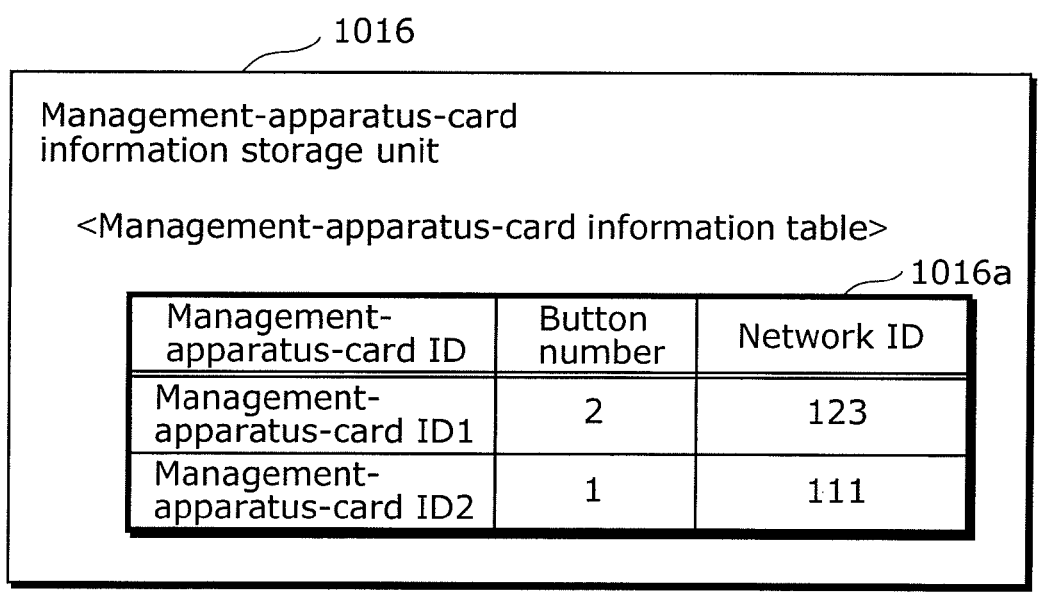
FIG. 3 is a diagram illustrating an example of a management-apparatus-card information table according to the embodiment 1 of the present invention.

The management-apparatus-card information storage unit 1016 stores, into a management-apparatus-card information table 1016a, the management-apparatus-card ID and a network ID of the management-apparatus card 106 attached to the measuring apparatus 101 in association with the button number. FIG. 3 is a diagram illustrating an example of the management-apparatus-card information table 1016a. As shown in FIG. 3, a management-apparatus card, a button number, and a network ID are stored into the management-apparatus-card information table 1016a. For example, the management-apparatus-card information table 1016a shown in FIG. 3 indicates that a button number "2" corresponds to the management-apparatus card 106 identified by a management-apparatus-card ID "Management-apparatus-card ID 1". It is to be noted that one button number may correspond to management-apparatus-card IDs.

<Measuring-Apparatus Card 102>

Figure 4:
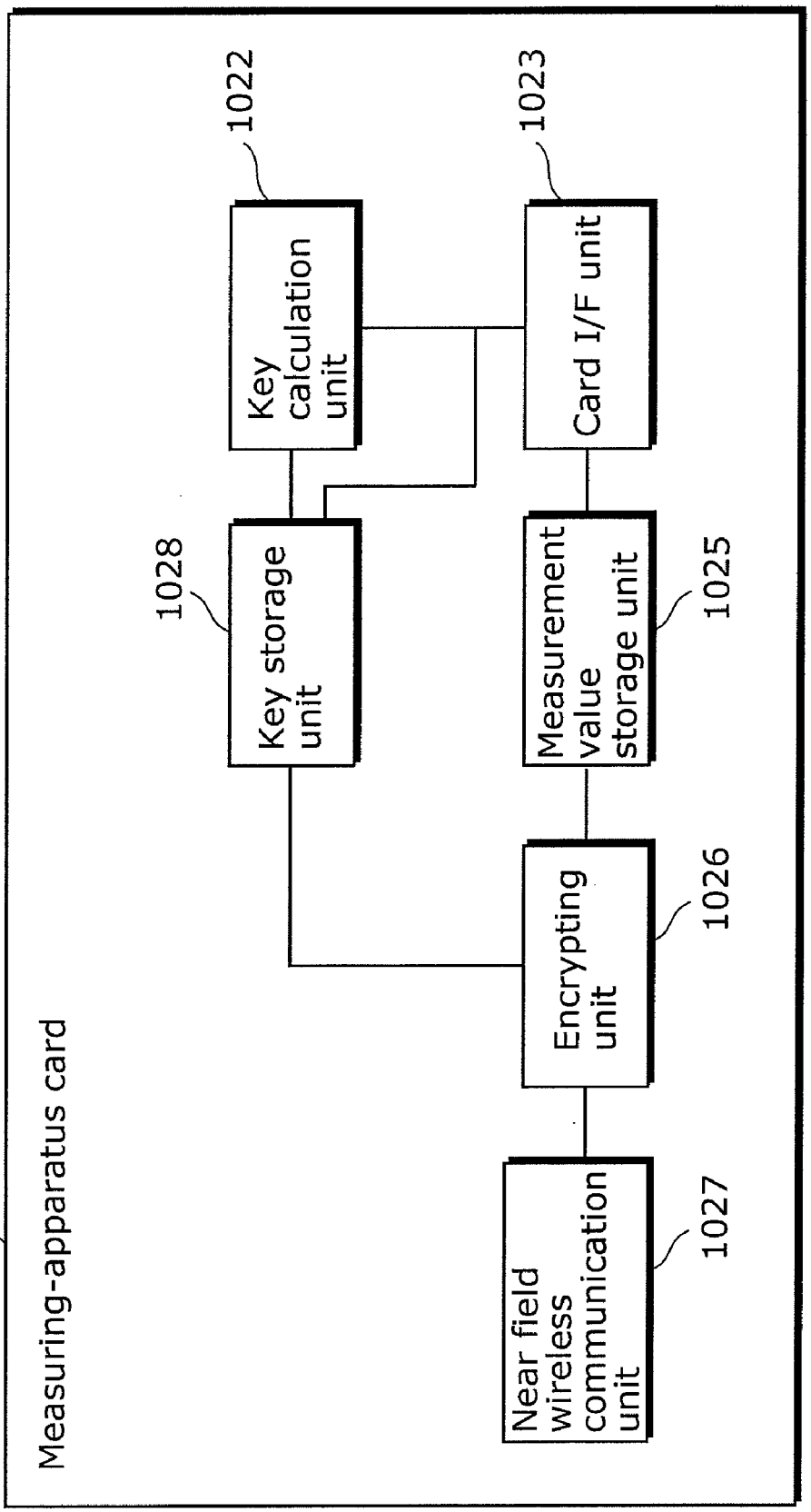
FIG. 4 is a diagram illustrating a functional configuration of a measuring-apparatus card according to the embodiment 1 of the present invention.

FIG. 4 is a diagram illustrating a functional configuration of the measuring-apparatus card 102. It is to be noted that the description of the measuring-apparatus card 104 is omitted since the measuring-apparatus card 104 has the same functional configuration as the measuring-apparatus card 102. As shown in FIG. 4, the measuring-apparatus card 102 includes a key calculation unit 1022, a card I/F unit 1023, a measurement value storage unit 1025, an encrypting unit 1026, a near field wireless communication unit 1027, and a key storage unit 1028.

The key calculation unit 1022 is an example of a control unit, and receives a measuring-apparatus ID from the measuring-apparatus ID storage unit 1011 included in the measuring apparatus 101 via the card I/F unit 1023. In addition, the key calculation unit 1022 receives a button number from the button unit 1013 included in the measuring apparatus 101 via the card I/F unit 1023. Further, the key calculation unit 1022 receives the management-apparatus-card ID from the management-apparatus-card information table 1016a stored in the management-apparatus-card information storage unit 1016 included in the measuring apparatus 101 via the card I/F unit 1023. The key calculation unit 1022 generates a shared key based on the measuring-apparatus ID, the button number, and the management-apparatus-card ID received in the above manner.

Specifically, the key calculation unit 1022 calculates a shared key K_a using, for instance, a predetermined function f as expressed by the following equation.

$$K\_a = f(\text{management-apparatus-card ID} \| \text{measuring-apparatus ID} \| \text{button number})$$

Here, "||" denotes a combination of information. In addition, the function f is the same function as the management-apparatus card 106 has.

The card I/F unit 1023 is an interface for the measuring-apparatus card 102 to be attached to the measuring apparatus 101. For example, the card I/F unit 1023 is configured to comply with the SDIO standard.

Figure 5:
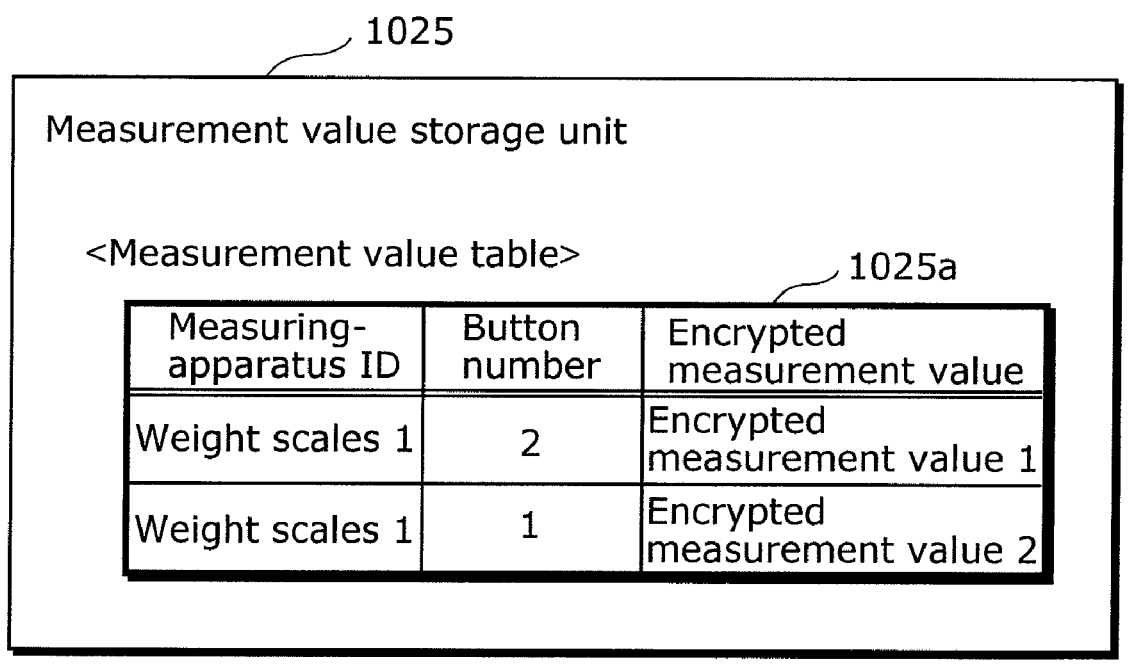
FIG. 5 is a diagram illustrating an example of a measurement value table according to the embodiments 1 and 2 of the present invention.

The measurement value storage unit 1025 stores, for each user, into a measurement value table 1025a, vital sign data in association with a button number that is identification information identifying the user. FIG. 5 is a diagram illustrating an example of the measurement value table 1025a. As shown in FIG. 5, a measuring-apparatus ID, a button number, and an encrypted measurement value are stored into the measurement value table 1025a. For instance, the measurement value table 1025a shown in FIG. 5 indicates that an encrypted measurement value corresponding to a button number "2" of a measuring-apparatus ID "Weight scales 1" is an "Encrypted measurement value 1."

The encrypting unit 1026 is an example of the control unit, and receives a measurement value (vital sign data) corresponding to a user. The encrypting unit 1026 encrypts the received measurement value using the shared key generated by the key calculation unit 1022.

The near field wireless communication unit 1027 is an example of the control unit, and transmits the encrypted measurement value to the management-apparatus card 106 via the near field wireless communication path 109. Specifically, in the case where the management-apparatus card 106 requests the near field wireless communication unit 1027 to transmit a measurement value corresponding to a predetermined button number, the near field wireless communication unit 1027 transmits an encrypted measurement value to the management-apparatus card 106. It is to be noted that in the case where the measuring apparatus 101 notifies the transmission of the measurement value corresponding to the predetermined button number to the management-apparatus card 106, the near field wireless communication unit 1027 may transmit the encrypted measurement value to the management-apparatus card 106. Moreover, in the case where the management-apparatus card 106 is detected within a predetermined range (e.g. within 3 meters) of the measuring apparatus 101, the near field wireless communication unit 1027 may transmit the encrypted measurement value to the management-apparatus card 106.

Figure 6:
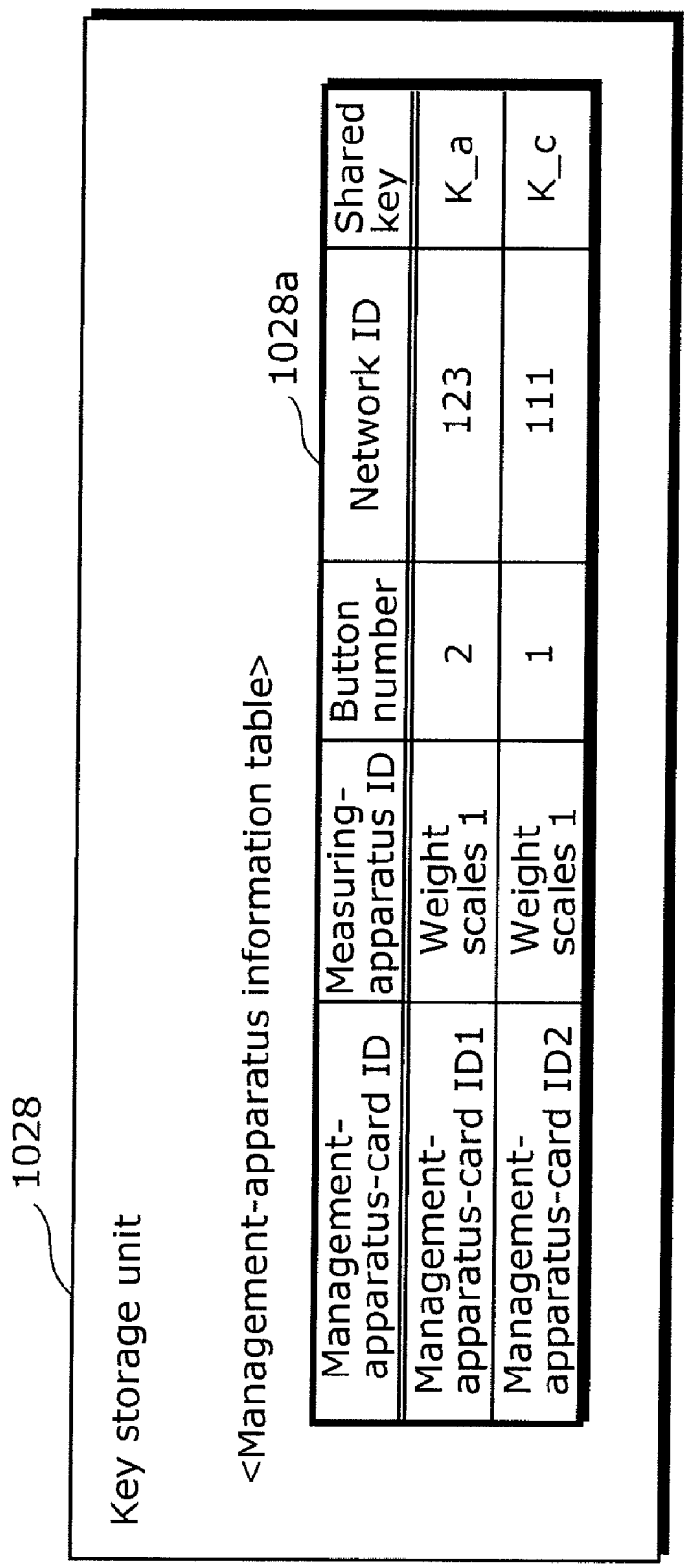
FIG. 6 is a diagram illustrating an example of a management-apparatus information table according to the embodiment 1 of the present invention.

The key storage unit 1028 stores the shared key generated by the key calculation unit 1022 into a management-apparatus information table 1028a. FIG. 6 is a diagram illustrating an example of the management-apparatus information table 1028a. As shown in FIG. 6, a management-apparatus-card ID, a measuring-apparatus ID, a button number, a network ID, and a shared key are stored into the management-apparatus information table 1028a. For example, the management-apparatus information table 1028a shown in FIG. 6 indicates that a shared key corresponding to a management-apparatus-card ID "Management-apparatus-card ID 1", a measuring-apparatus ID "Weight scales 1", and a button number "2" is "K_a".

It is to be noted that the measuring-apparatus card 102 is, for instance, a device having a secure region such as an SD card and an IC card, and at least the key storage unit 1028, the measurement value storage unit 1025, and the key calculation unit 1022 are included in the secure region.

<Management Apparatus 105>

Figure 7:
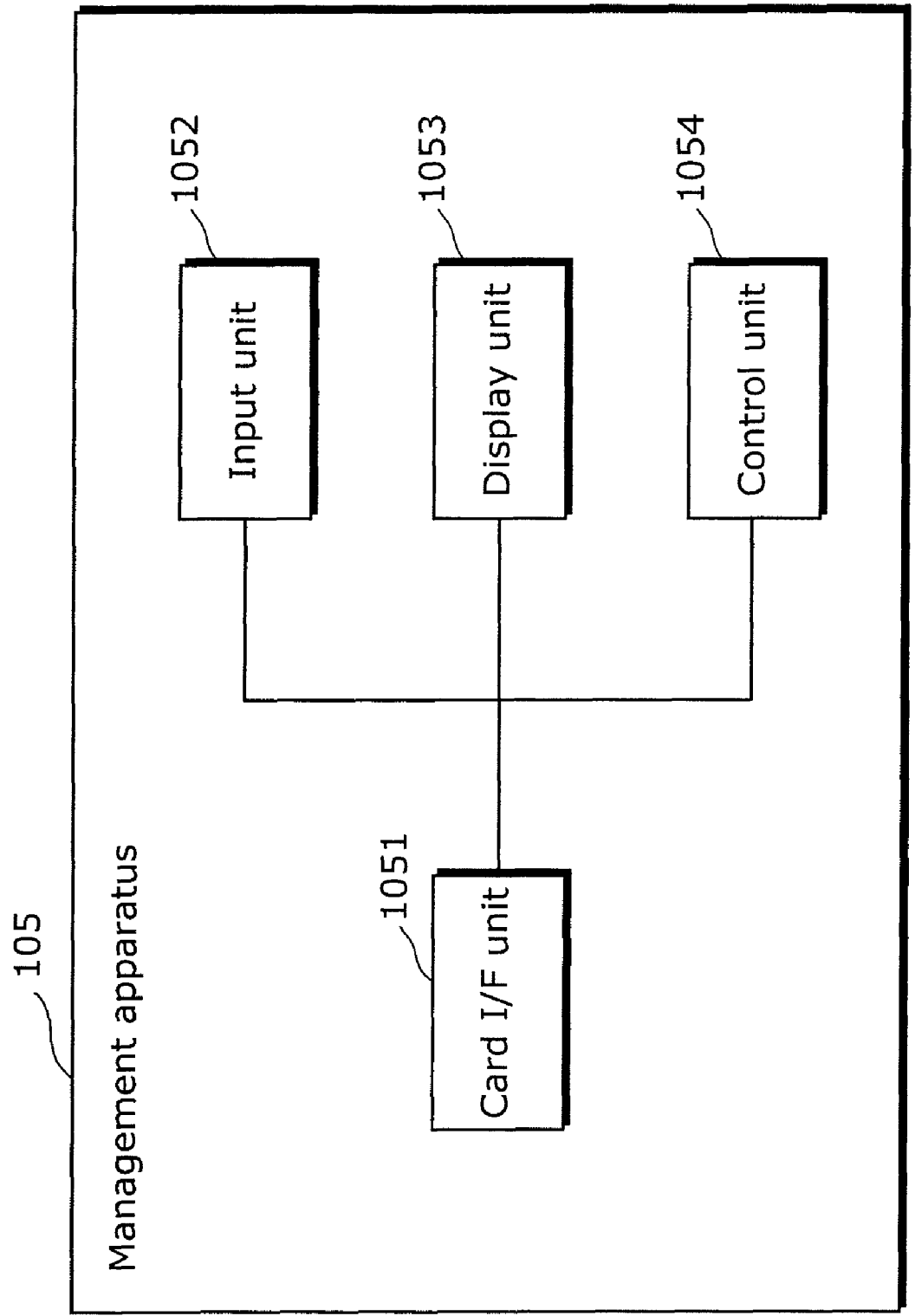
FIG. 7 is a diagram illustrating a functional configuration of a management apparatus according to the embodiments 1 and 2 of the present invention.

FIG. 7 is a diagram illustrating a functional configuration of the management apparatus 105. As shown in FIG. 7, the management apparatus 105 includes a card I/F unit 1051, an input unit 1052, a display unit 1053, and a control unit 1054.

The card I/F unit receives and transmits data from and to the management-apparatus card 106. The input unit 1052 is, for instance, a keyboard, and an operation of a user is inputted with the input unit 1052. The display unit 1053 is, for example, a liquid crystal display, and displays a measurement value or the like. The control unit 1054 includes, for instance, a CPU and a memory, transmits the operation of the user inputted with the input unit 1052 to the management-apparatus card 106, allows the data to be displayed, and establishes connection with the service providing servers 107 and 108 via the communication path 110.

As stated above, as with a PC for example, the management apparatus 105 to which the management-apparatus card 106 is attached displays information stored in the management-apparatus card 106 and controls the management-apparatus card 106 with the input unit 1052 being inputted.

<Management-Apparatus Card 106>

Figure 8:
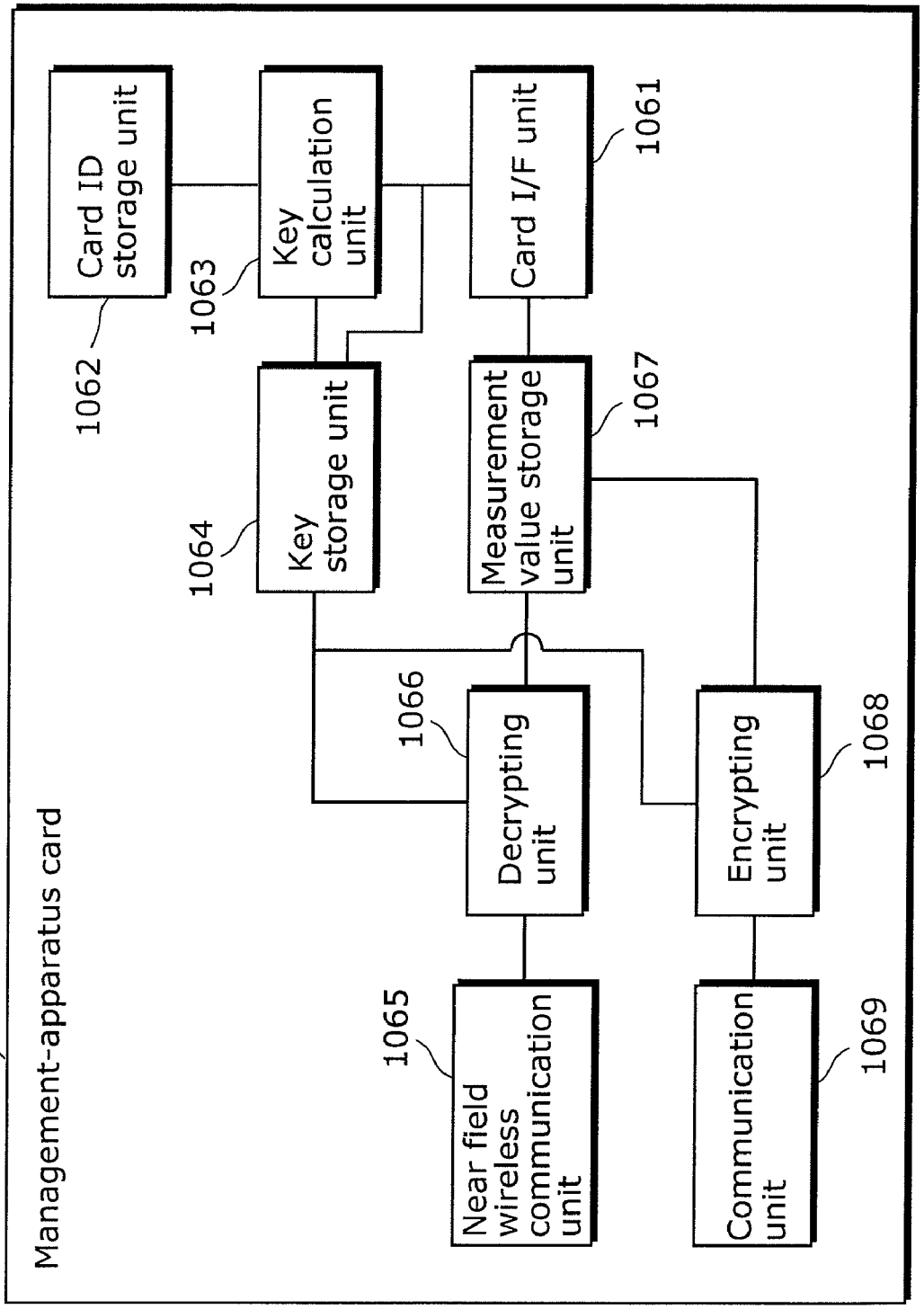
FIG. 8 is a diagram illustrating a functional configuration of a management-apparatus card according to the embodiments 1 and 2 of the present invention.

FIG. 8 is a diagram illustrating a functional configuration of the management-apparatus card 106. As shown in FIG. 8, the management-apparatus card 106 includes a card I/F unit 1061, a card ID storage unit 1062, a key calculation unit 1063, a key storage unit 1064, a near field wireless communication unit 1065, a decrypting unit 1066, a measurement value storage unit 1067, an encrypting unit 1068, and a communication unit 1069.

The management-apparatus card 106 is attached to the measuring apparatus 101 in the measuring apparatus registration phase. The management-apparatus card 106 stores identification information of the measuring apparatus 101, button information of the measuring apparatus 101, and a shared key for encrypting and transmitting a measurement value. In addition, the management-apparatus card 106 is attached to the management apparatus 105 in the service registration phase. The management-apparatus card 106 stores identification information of the service providing server 107 and a shared key for encrypting and transmitting a measurement value (different from the shared key in the measuring apparatus registration phase). It is to be noted that each operation phase will be described later.

The following will describe each component of the management-apparatus card 106 shown in FIG. 8.

The card I/F unit 1061 is an example of an interface unit. When the management-apparatus card 106 is attached to the measuring apparatus 101, the card I/F unit 1061 receives, from the measuring apparatus 101, a measuring-apparatus ID, which is information indicating the measuring apparatus 101, and a button number, which is identification information identifying a user of the measuring apparatus 101.

A management-apparatus-card ID, which is information indicating the management-apparatus card 106, is stored in the card ID storage unit 1062.

The key calculation unit 1063 is an example of a generation unit, and generates a shared key shared with the measuring-apparatus card 102, using the measuring-apparatus ID, the management-apparatus-card ID, and the button number. Further, the key calculation unit 1063 generates a shared key shared with the service providing server 107. It is to be noted that the details of the key calculation unit 1063 will be described later.

The key storage unit 1064 stores information relevant to the measuring apparatus 101 (a measuring-apparatus ID, a button number, a network ID, and a shared key) into a measuring-apparatus information table 1064*a*. In addition, the key storage unit 1064 stores information relevant to the service providing server 107 (a service ID, a measurement category, a network ID, and a shared key) into a service information table 1064*b*. It is to be noted that the details of the key storage unit 1064 will be described later.

The near field wireless communication unit 1065 is an example of a control unit, and receives an encrypted measurement value corresponding to the management-apparatus card 106 from the measuring-apparatus card 102 via the near field wireless communication path 109.

The decrypting unit 1066 is an example of the control unit, and decrypts the encrypted measurement value received by the near field wireless communication unit 1065, using the shared key stored in the measuring-apparatus information table 1064*a* stored in the key storage unit 1064.

The measurement value storage unit 1067 stores the measurement value decrypted by the decrypting unit 1066.

The encrypting unit 1068 re-encrypts the measurement value of a measurement category corresponding to the service providing server 107, using the shared key shared with the service providing server 107.

The communication unit 1069 transmits the measurement value encrypted by the encrypting unit 1068 to the service providing server 107 via the communication path 110.

<Key Calculation Unit 1063>

The following will describe the details of the key calculation unit 1063.

As with the key calculation unit 1022 included in the measuring-apparatus card 102, the key calculation unit 1063 calculates a shared public key K_a' using, for instance, a predetermined function f as expressed by the following equation.

$$K\_a' = f(\text{management-apparatus-card ID} \| \text{measuring-apparatus ID} \| \text{button number})$$

It is to be noted that the measuring-apparatus ID and the button number are received by the card I/F unit 1061 and stored into the measuring-apparatus information table 1064*a* by the key storage unit 1064 when the management-apparatus card 106 is attached to the measuring apparatus 101. Moreover, the function f is embedded in each card in advance so that the measuring-apparatus card 102 and the management-apparatus card 106 can secretly share the function f. As stated above, because the function f is shared, the aforementioned K_a and K_a' become the same value in the case where combinations of the management-apparatus-card ID, the measuring-apparatus ID, and the button number are identical. That is to say, the measuring-apparatus card 102 and the management-apparatus card 106 share the same key.

Furthermore, the key calculation unit 1063 calculates a shared key K_1 using, for instance, a predetermined function g as expressed by the following equation.

$$K\_1 = g(\text{management-apparatus-card ID} \| \text{service ID})$$

It is to be noted that the communication unit 1069 receives a service ID in the service registration phase when the management-apparatus card 106 is attached to the management apparatus 105.

It is also to be noted that the management-apparatus card 106 is, for instance, a device having a secure region such as an SD card and an IC card, and at least the key storage unit 1064, the measurement value storage unit 1067, and the key calculation unit 1067 are included in the secure region. Moreover, the card I/F unit 1061 is configured to comply with, for example, the SDIO standard. Furthermore, the management-apparatus card 106 may be a card for a specific user and include a user ID for identifying a user.

<Key Storage Unit 1064>

Next, the details of the key storage unit 1064 included in the management-apparatus card 106 will be described. FIG. 9 is a diagram illustrating respective examples of the measuring-apparatus information table 1064*a* and the service information table 1064*b*. As shown in FIG. 9, the measuring-apparatus information table 1064*a* which associates the management-apparatus card 106 with the measuring apparatus 101 and the service information table 1064*b* which associates the management-apparatus card 106 with a service provided by the service providing server 107 are stored in the key storage unit 1064.

The measuring-apparatus ID, which is the identification information of the measuring apparatus 101 used by a user of the management-apparatus card 106, the button number of the measuring apparatus 101, the network ID for connecting to the measuring apparatus 101, and the shared key shared with the measuring-apparatus card 102 are stored into the measuring-apparatus information table 1064*a*. For instance, the measuring-apparatus information table 1064*a* shown in FIG. 9 indicates that a user, an owner of the management-apparatus card 106, usually measures vital sign data after pressing a button identified by a button number "1" when the user wants to measure the vital sign data with a measuring apparatus identified by a measuring-apparatus ID "Blood pressure meter 2".

It is to be noted that the network ID is information for identifying the measuring apparatus 101 over the network. For example, the management-apparatus card 106 can establish a communication link using the network ID. It is also to be noted that the network ID may be an IP address.

Moreover, the shared key is a value calculated by the key calculation unit 1063 included in the management-apparatus card 106. For instance, the shared key K_a is a key shared by the measuring-apparatus card 102 and the management-apparatus card 106 when the measuring-apparatus card 102 transmits, to the management-apparatus card 106, a measurement value corresponding to the management-apparatus card 106 and the button number "1".

On the other hand, the service ID, the identification information of the service providing server 107 which provides the user of the management-apparatus card 106 with a service registered by the user, a measurement category of a measurement value collected by the service providing server 107, the network ID for connecting to the service providing server 107, and the shared key shared with the service providing server 107 are stored into the service information table 1064b. For example, the service information table 1064b shown in FIG. 9 indicates that the user, the owner of the management-apparatus card 106, collects information regarding a measurement category "User ID" and "Body weight", and that the user has joined a service provided by a service providing server identified by a service ID "Service A".

The network ID is information identifying the service providing server over the network. For instance, the management-apparatus card 106 can establish a communication link with the service providing server 107 identified by the service ID "Service A" using a network ID "URL 1". In addition, the management-apparatus card 106 can establish a communication link with the service providing server 107 identified by a service ID "Service B" using a network ID "URL 2".

<Service Providing Server 107>

Figure 10:
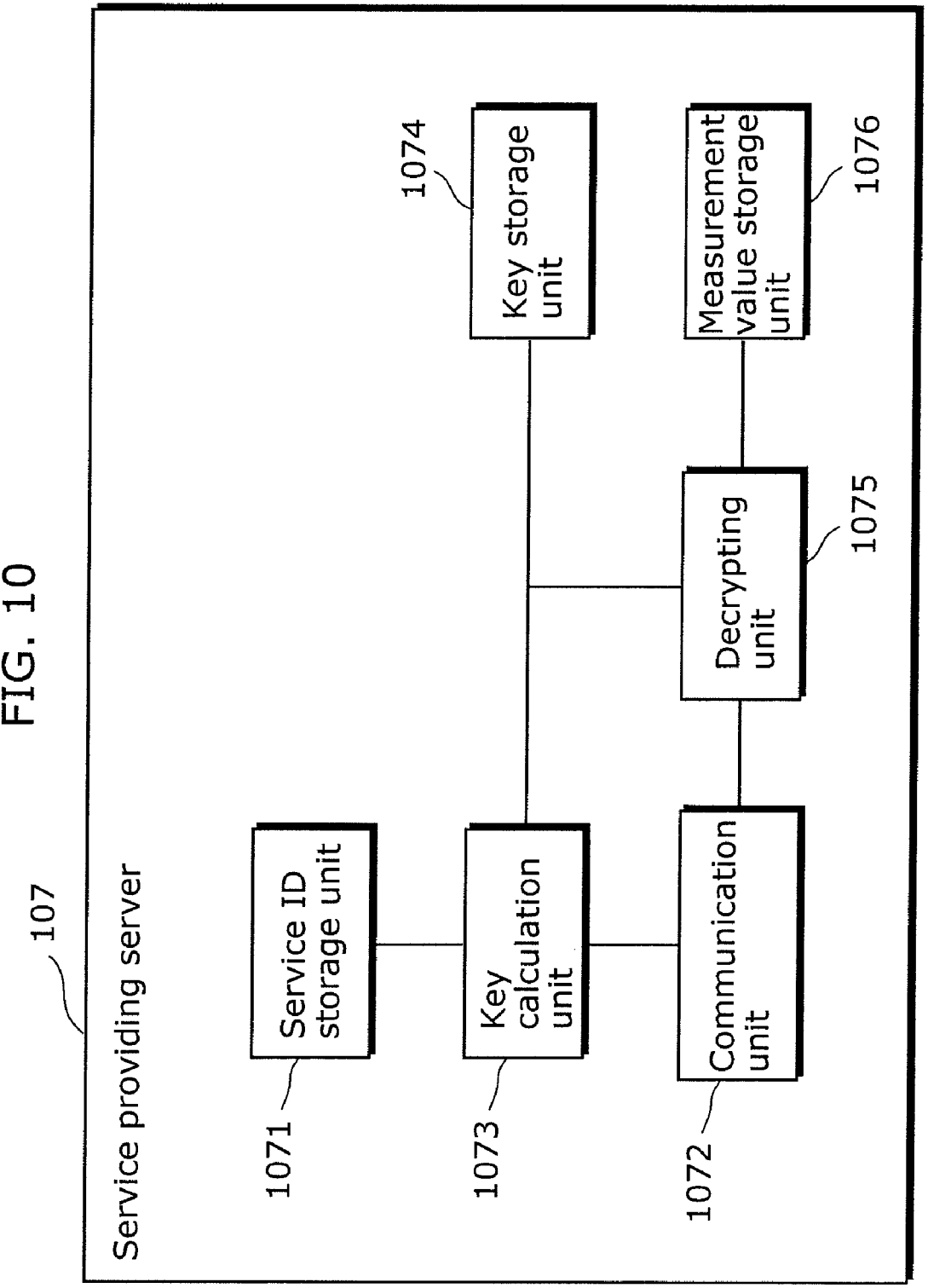
FIG. 10 is a diagram illustrating a functional configuration of a service providing server according to the embodiments 1 and 2 of the present invention.

FIG. 10 is a diagram illustrating a functional configuration of the service providing server 107. It is to be noted that the description of the service providing server 108 is omitted since the service providing server 108 has the same functional configuration as the service providing server 107. As shown in FIG. 10, the service providing server 107 includes a service ID storage unit 1071, a key calculation unit 1073, a key storage unit 1074, a decrypting unit 1075, and a measurement value storage unit 1076.

The service ID, which is the identification information of the service providing server 107, is stored in the service ID storage unit 1071. The communication unit 1072 communicates with the management-apparatus card 106 via the communication path 110. The key calculation unit 1073 generates a shared key shared with the management-apparatus card 106. The key storage unit 1074 stores the shared key which is generated by the key calculation unit 1073 and which is shared with the management-apparatus card 106. The decrypting unit 1075 decrypts an encrypted measurement value received from the management-apparatus card 106 using the shared key generated by the key calculation unit 1073. The measurement value storage unit 1076 stores the measurement value decrypted by the decrypting unit 1075.

The key calculation unit 1073 calculates a shared key using a secret function g as expressed by the following equation, the secret function g being the same as the function included in the management-apparatus card 106.

$$K\_1'=g(\text{management-apparatus-card ID}\|\text{service ID})$$

It is to be noted that the communication unit 1072 receives the management-apparatus-card ID from the management-apparatus card 106. The aforementioned K_1 and K_1' become the same value, in the case where combinations of the management-apparatus card ID and the service ID are identical.

It is to be noted that the embodiment 1 has so far described that the service providing server 107 collects a measurement value of a registered user. Although there is no description in the embodiment 1, the service providing server 107 provides various services such as advice and recipes based on the collected measurement value. Specifically, the service providing server 107 regularly collects, for instance, body weight information of an overweight worker, and provides appropriate advice based on the collected body weight information. A health insurance association of a company or the like owns the service providing server 107.

Next, operations of the health care system 100 configured as above will be described. The operations of the health care system 100 are classified broadly into the following four phases: (1) Measuring Apparatus Registration Phase; (2) Service Registration Phase; (3) Measurement Phase; and (4) Measurement Value Transmission Phase. Hereafter, (1) Measuring Apparatus Registration Phase and (2) Service Registration Phase are described with reference to FIG. 11, and (3) Measurement Phase and (4) Measurement Value Transmission Phase are described with reference to FIG. 12. It is to be noted that, in the following description, the management-apparatus card 106 collects discrete information of a specific user (user A) from the measuring apparatus 101 (e.g. weight scales or blood pressure meter) corresponding to the management-apparatus card 106. The collected information is accumulated in the management-apparatus card 106, and only a measurement value necessary for receiving a predetermined service is transmitted to the service providing server 107. It is to be noted that, for the sake of privacy protection, near field wireless communication between the measuring-apparatus card 102 and the management-apparatus card 106 and communication between the management-apparatus card 106 and the service providing server 107 are encrypted using a discrete key, respectively. The detail of the encryption will be described later.

Figure 11:
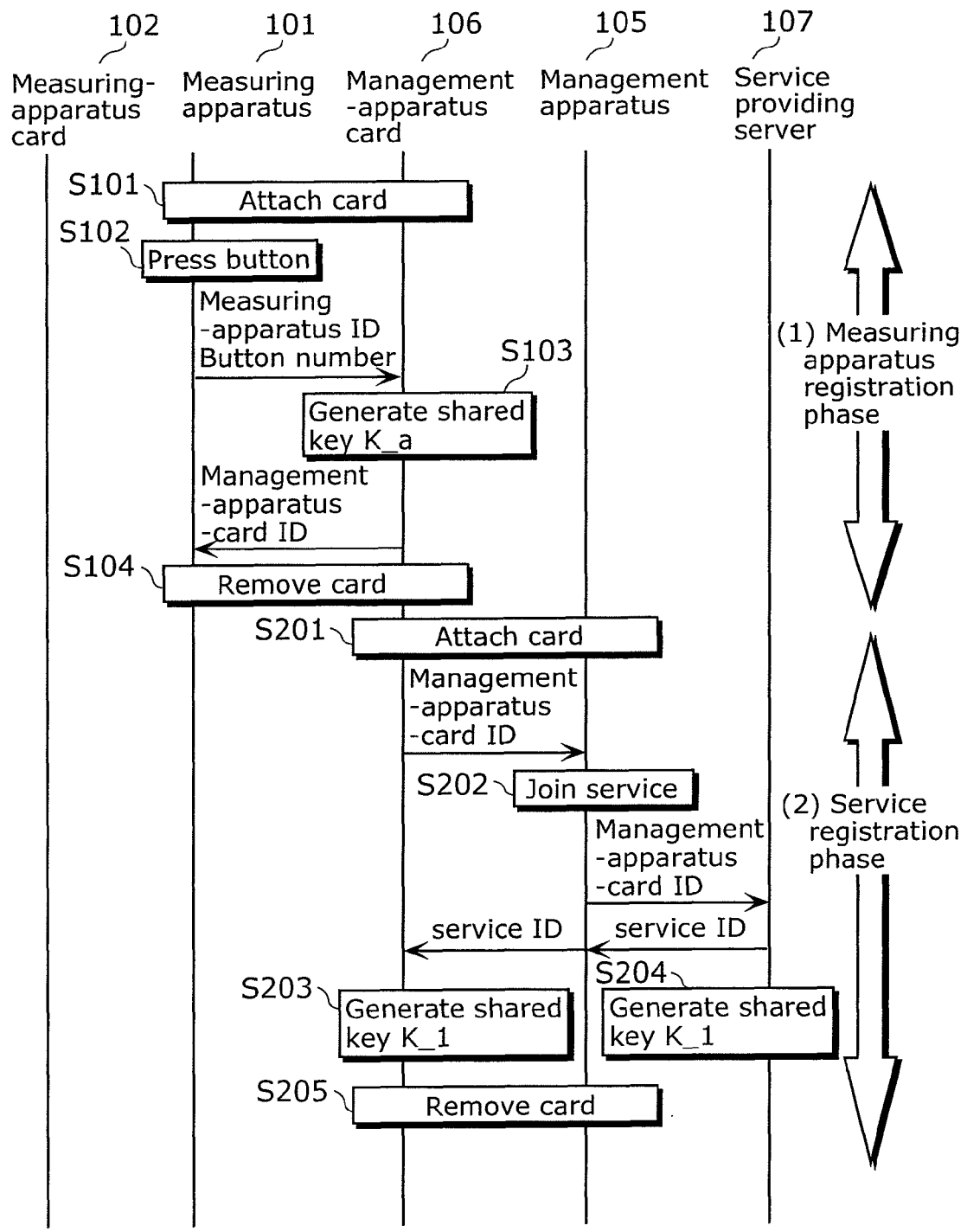
FIG. 11 is a sequence diagram illustrating a process flow in a measuring apparatus registration phase and a service registration phase in the health care system according to the embodiment 1 of the present invention.

FIG. 11 is a sequence diagram illustrating a process flow in (1) Measuring Apparatus Registration Phase and (2) Service Registration Phase in the health care system 100.

(1) Measuring Apparatus Registration Phase

In Measuring Apparatus Registration Phase, information of a button of a measuring apparatus 101 usually used by the user A is registered on a management-apparatus card 106 for the user A, the button corresponding to the user A.

First, when the user A attaches the management-apparatus card 106 to the measuring apparatus 101, the measuring apparatus 101 detects the attachment of the management-apparatus card 106 (Step S101).

When the user A subsequently presses the button (e.g. button number 2) corresponding to the user A, the measuring apparatus 101 receives a button number of the pressed button (Step S102).

The management-apparatus card 106 then receives a measuring-apparatus ID and the button number from the measuring apparatus 101. The received measuring-apparatus ID and button number are stored into the measuring-apparatus information table 1064a stored in the key storage unit 1064 of the management-apparatus card 106. The key calculation unit 1063 of the management-apparatus card 106 generates a shared key K_a by calculating a predetermined secret function f with the use of a management-apparatus-card ID, the measuring-apparatus ID, and the button number (Step S103). The generated shared key K_a is stored, in association with the measuring-apparatus ID and the button number, into the measuring-apparatus information table 1064a stored in the key storage unit 1064 of the management-apparatus card 106.

On the other hand, the measuring apparatus 101 receives the management-apparatus-card ID from the management-apparatus card 106. The received management-apparatus-card ID is then stored, in association with the button number, into the management-apparatus-card information table 1016a stored in the management-apparatus-card information storage unit 1016 of the measuring apparatus 101.

When the user A removes the management-apparatus card 106 from the measuring apparatus 101, the measuring apparatus 101 detects the removal of the management-apparatus card 106 (Step S104).

It is to be noted that, in to-be-described (3) Measurement Phase, the measuring-apparatus card 102 is attached to the measuring apparatus 101. At this time, the measuring-apparatus card 102 generates a shared key K_a shared with the management-apparatus card 106 using the same information as above and the predetermined secret function f. It is to be noted that the secret function f is embedded in the management-apparatus card 106 and the measuring-apparatus card 102 in advance. For this reason, the shared key K_a becomes secret to the outside.

(2) Service Registration Phase

In Service Registration Phase, a service to be used by the user A is registered on the management-apparatus card 106.

First, when the user A attaches the management-apparatus card 106 to the management apparatus 105, the management apparatus 105 detects the attachment of the management-apparatus card 106 (Step S201).

The management apparatus 105 subsequently registers the service to be used by the user A (Step S202). Specifically, for instance, the management apparatus 105 transmits information or the like with which the user A filled out an application form available on a web site designated by the service providing server 107. At the same time, the management apparatus 105 transmits the management-apparatus-card ID stored in the management-apparatus card 106 to the service providing server 107. On the other hand, the service providing server 107 transmits, to the management-apparatus card 106, a network ID, which is identification information (e.g. URL) for establishing a communication path, together with a service ID and a measurement category.

The key calculation unit 1063 of the management-apparatus card 106 then generates a shared key K_1 by calculating a predetermined secret function g with the use of the management-apparatus-card ID and the service ID (Step S203). The generated shared key K_1, together with the service ID, the measurement category, and the network ID, is stored into the key storage unit 1064 of the management-apparatus card 106.

On the other hand, the key calculation unit 1073 of the service providing server 107 similarly generates a shared key K_1 by calculating the predetermined secret function g with the use of the management-apparatus-card ID and the service ID (Step S204), the shared key K_1 being the same as the shared key generated in Step S203. It is to be noted that the secret function g is embedded in the management-apparatus card 106 and the service providing server 107 in advance. For this reason, the shared key K_1 becomes secret to the outside.

When the user A removes the management-apparatus card 106 from the management apparatus 105, the management apparatus 105 detects the removal of the management-apparatus card 106 (Step S205).

Figure 12:
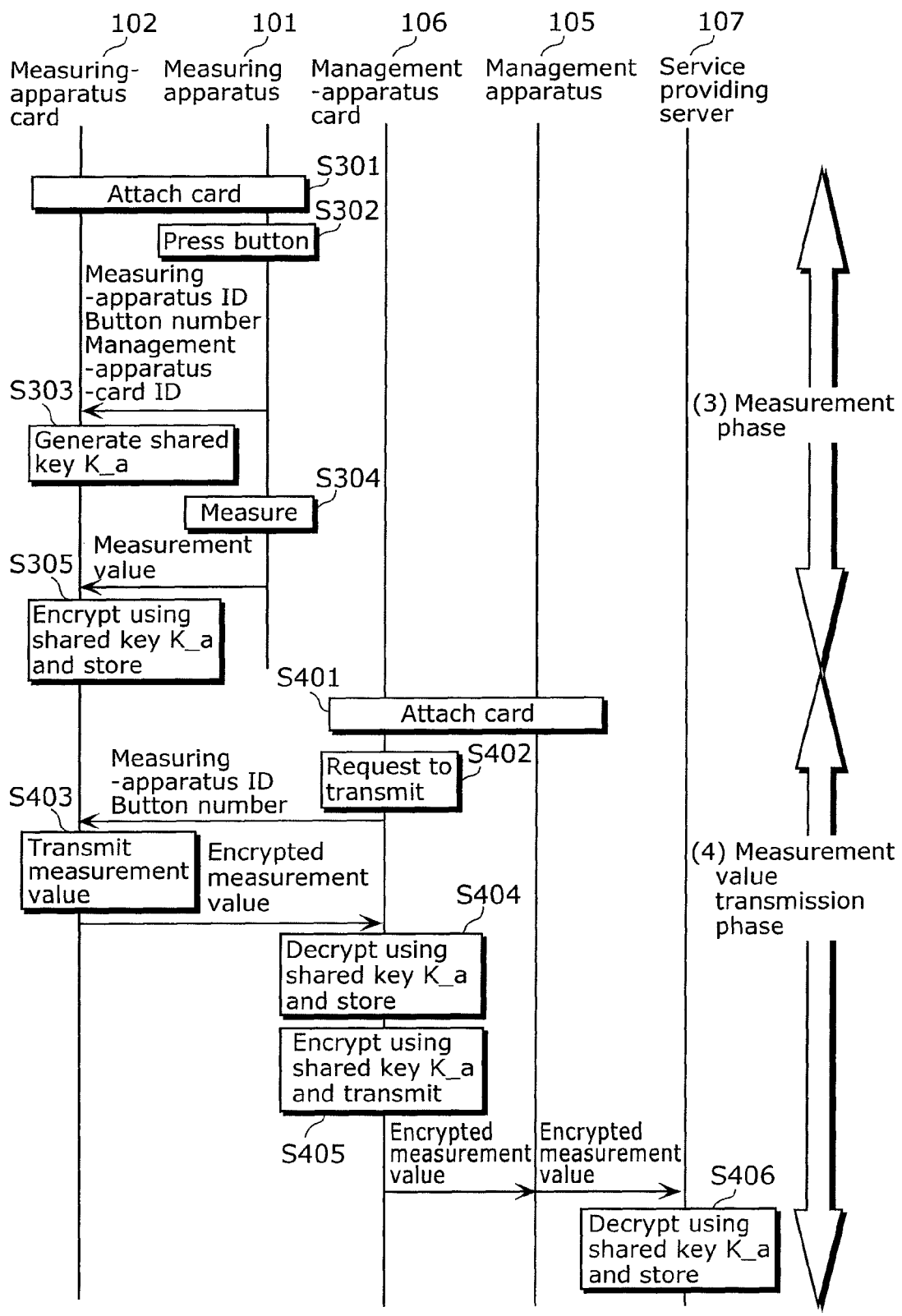
FIG. 12 is a sequence diagram illustrating a process flow in a measurement phase and a measurement value transmission phase in the health care system according to the embodiment 1 of the present invention.

FIG. 12 is a sequence diagram illustrating a process flow in (3) Measurement Phase and (4) Measurement Value Transmission Phase in the health care system 100.

(3) Measurement Phase

In Measurement Phase, the measuring-apparatus card 102 attached to the measuring apparatus 101 encrypts a measurement value measured by the measuring apparatus 101. The encrypted measurement value is then stored into the measuring-apparatus card 102.

First, when the user A attaches the measuring-apparatus card 102 to the measuring apparatus 101, the measuring apparatus 101 detects the attachment of the measuring-apparatus card 102 (Step S301). It is to be noted that hereafter the measuring-apparatus card 102 remains attached to the measuring apparatus 101. That is to say, thereafter the user A can always measure vital sign data empty-handed.

When the user A subsequently presses the button (e.g. button number 2) corresponding to the user A, the measuring apparatus 101 receives a button number of the pressed button (Step S302).

The measuring-apparatus card 102 then generates a shared key K_a by calculating the predetermined secret function f with the use of the measuring-apparatus ID of the measuring apparatus 101, the button number, and the management-apparatus-card ID (Step S303). The generated shared key K_a is stored, in association with the management-apparatus ID, the measuring-apparatus ID, and the button number, into the management-apparatus information table 1028a stored in the key storage unit 1028 of the measuring-apparatus card 102. When the user A subsequently measures vital sign data of the user A, the measuring apparatus 101 generates a measurement value (Step S304).

Next, the measuring-apparatus card 102 receives the measurement value generated by the measuring apparatus 101. The measuring-apparatus card 102 then encrypts the received measurement value using the shared key K_a. Further, the measuring-apparatus card 102 stores the encrypted measurement value, together with the measuring-apparatus ID of the measuring apparatus 101 and the button number of the button pressed at measurement, into the measurement value table 1025a stored in the measurement value storage unit 1025 (Step S305).

(4) Measurement Value Transmission Phase

In Measurement Value Transmission Phase, the management-apparatus card 106 attached to the management apparatus 105 transmits the measurement value of the user A accumulated in the measuring-apparatus card 102 to the service providing server 107 via the management apparatus 105.

First, when the user A attaches the management-apparatus card 106 to the management apparatus 105, the management apparatus 105 detects the attachment of the management-apparatus card 106 (Step S401).

Subsequently, the management-apparatus card 106 receives the measuring-apparatus ID and the button number by referring to the measuring-apparatus information table 1064a stored in the key storage unit 1064. The management-apparatus card 106 then requests the measuring-apparatus card 102 to transmit the measurement value corresponding to the measuring-apparatus ID and the button number by transmitting the received measuring-apparatus ID and button number (Step S402). It is to be noted that, as with the measuring-apparatus information table 1064a shown in FIG. 9, in the case where measuring-apparatus IDs are registered, the management-apparatus card 106 requests each of measuring apparatuses identified by corresponding one of the registered measuring-apparatus IDs to transmit a measurement value. Specifically, by referring to the measuring-apparatus information table 1064a shown in FIG. 9, the management-apparatus card 106 requests both the measuring apparatus 101 identified by a measuring-apparatus ID "Weight scales 1" and the measuring apparatus 103 identified by a measuring-apparatus ID "Blood pressure meter 2" to transmit a measurement value corresponding to a button number "2" and a measurement value corresponding to a button number "1", respectively.

Then, the measuring apparatus 102, which is requested to transmit the measurement value, transmits the encrypted measurement value corresponding to the button number to the management-apparatus card 106 (Step S403).

The management-apparatus card 106 subsequently decrypts the received encrypted measurement value using the shared key K_a shared with the measuring-apparatus card 102. The management-apparatus card 106 then stores the decrypted measurement value into the measurement value storage unit 1067 (Step S404).

Next, by referring to the service information table 1064*b* stored in the key storage unit 1064, the management-apparatus card 106 encrypts only the measurement value to be collected by the service providing server 107 using the shared key K_1 shared with the service providing server 107. The management-apparatus card 106 then transmits the encrypted measurement value to the service providing server 107 (Step S405).

The service providing server 107 subsequently decrypts the received encrypted measurement value using the shared key K_1 shared with the management-apparatus card 106. The management-apparatus card 106 then stores the decrypted measurement value into the measurement value storage unit 1076 (Step S406).

Next, an operation of each of the measuring apparatus 101, the measuring-apparatus card 102, the management apparatus 105, the management-apparatus card 106, and the service providing server 107 will be described.

Figure 13:
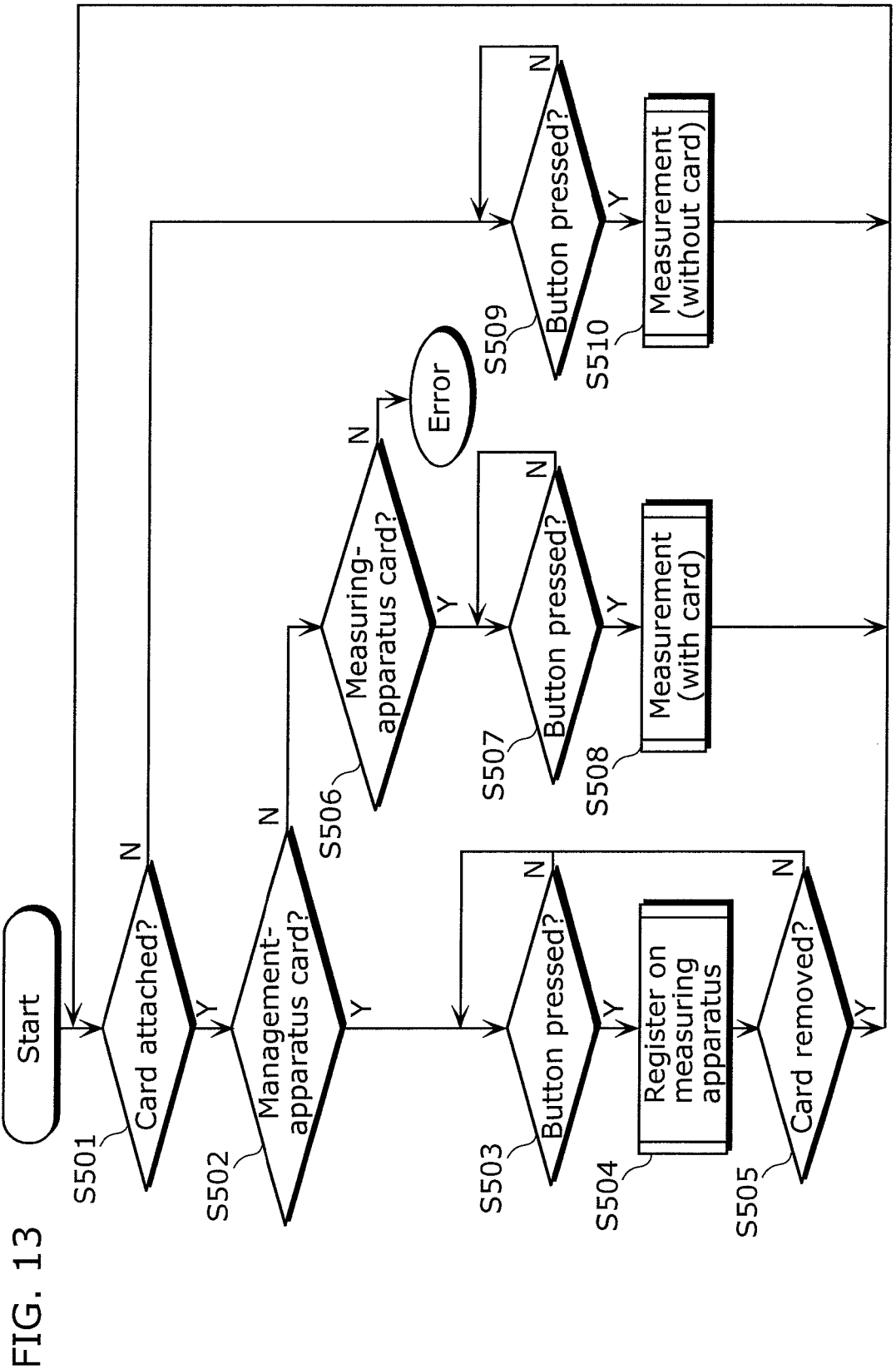
FIG. 13 is a flow chart illustrating a process flow in the measuring apparatus according to the embodiments 1 and 2 of the present invention.

FIG. 13 is a flow chart illustrating a process flow in the measuring apparatus 101.

First, the card I/F unit 1014 judges whether or not a card is attached (Step S501). Here, in the case where it is judged that the card is attached (Y in Step S501), the card I/F unit 1014 judges whether or not the attached card is a management-apparatus card (Step S502). Here, in the case where it is judged that the attached card is the management-apparatus card (Y in Step S502), the button unit 1013 judges whether or not a button is pressed (Step S503). Here, in the case where it is judged that the button is pressed (Y in Step S503), the measuring apparatus 101 registers a management-apparatus-card ID and a button number of the pressed button on the management-apparatus-card information storage unit 1016 (Step S504). On the other hand, in the case where it is judged that the button is not pressed (N in Step S503), the button unit 1013 judges again whether or not a button is pressed (Step S503). Subsequently, the card I/F unit 1014 judges whether or not the card is removed (Step S505). Here, in the case where it is judged that the card is removed (Y in Step S505), the card I/F unit 1014 judges again whether or not the card is attached (Step S501). On the other hand, in the case where it is judged that the card is not removed (N in Step S505), the button unit 1013 judges again whether or not the button is pressed (Step S503).

It is to be noted that in the case where it is judged that the attached card is not the management-apparatus card in Step S502 (N in Step S502), the card I/F unit 1014 judges whether or not the attached card is a measuring-apparatus card (Step S506). Here, in the case where it is judged that the attached card is not the measuring-apparatus card (N in Step S506), the control unit 1015 performs error processing. On the other hand, in the case where it is judged that the attached card is the measuring-apparatus card (Y in Step S506), the button unit 1013 judges whether or not a button is pressed (Step S507). Here, in the case where it is judged that the button is pressed (Y in Step S507), the measuring apparatus 101 measures vital sign data (Step S508). On the other hand, in the case where it is judged that the button is not pressed (N in Step S507), the button unit 1013 judges again whether or not a button is pressed (Step S507).

It is to be noted that in the case where it is judged that the card is not attached in Step S501 (N in Step S501), the button unit 1013 judges whether or not a button is pressed (Step S509). Here, in the case where it is judged that the button is pressed (Y in Step S509), the vital sign data measurement unit 1012 measures vital sign data (Step S510). On the other hand, in the case where it is judged that the button is not pressed (N in Step S509), the button unit 1013 judges again whether or not a button is pressed (Step S509).

Figure 14:
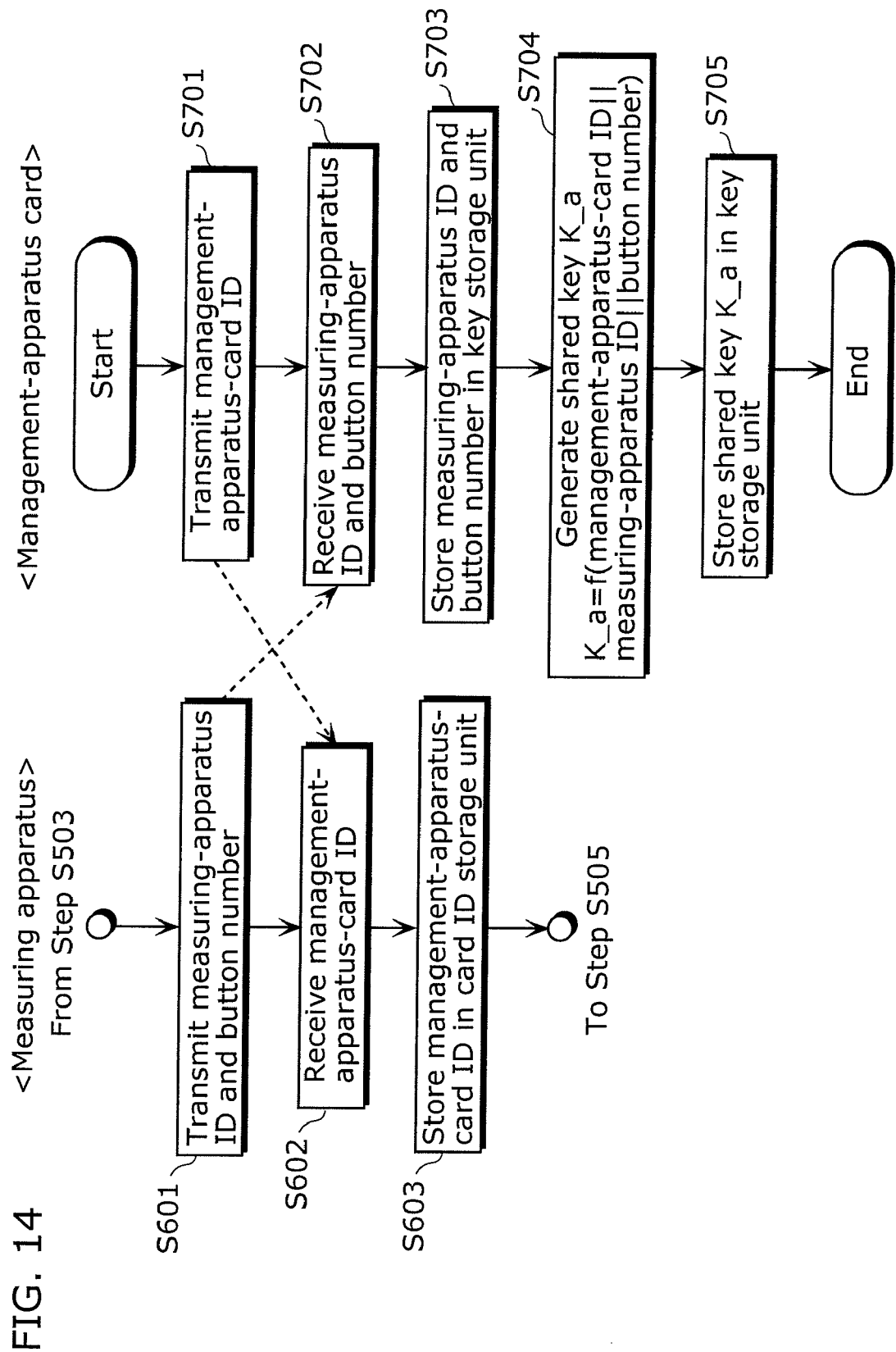
FIG. 14 is a flow chart illustrating a detailed process flow in a measuring apparatus registration step shown in FIG. 13.

FIG. 14 is a flow chart illustrating a detailed process flow in a measuring apparatus registration step (Step S504) shown in FIG. 13. In FIG. 14, a left flow chart illustrates a process flow in the measuring apparatus 101. In contrast, a right flow chart illustrates a process flow in the management-apparatus card 106 attached to the measuring apparatus 101. Moreover, a dotted line with arrow indicates an information flow (the same applies to all of the subsequent flow charts).

To begin with, the flow chart of the measuring apparatus 101 will be described.

First, the card I/F unit 1014 transmits the measuring-apparatus ID stored in the measuring-apparatus ID storage unit 1011 and the button number received by the button unit 1013 to the management-apparatus card 106 (Step S601). The card I/F unit 1014 subsequently receives the management-apparatus-card ID from the management-apparatus card 106 attached to the measuring apparatus 101 (Step S602). The management-apparatus-card information storage unit 1016 then stores, into the management-apparatus-card information table 1016*a*, the received management-apparatus-card ID in association with the button number (Step S603).

Next, the flow chart of the management-apparatus card 106 attached to the measuring apparatus 101 will be described.

First, the card I/F unit 1061 transmits the management-apparatus-card ID stored in the card ID storage unit 1062 to the measuring apparatus 101 (Step S701). The card I/F unit 1061 then receives the measuring-apparatus ID and the button number from the measuring apparatus 101 (Step S702). The key storage unit 1064 then stores the received measuring-apparatus ID and the button number into the measuring-apparatus information table 1064*a* (Step S703). The key calculation unit 1063 then generates a shared key K_a shared with the measuring-apparatus card 102 by calculating a function f with the use of the received measuring-apparatus ID and button number and the management-apparatus-card ID stored in the card ID storage unit 1062 (Step S704). The key storage unit 1064 then stores, into the measuring-apparatus information table 1064*a*, the generated shared key in association with the measuring-apparatus ID and the button number (Step S705).

Figure 15:
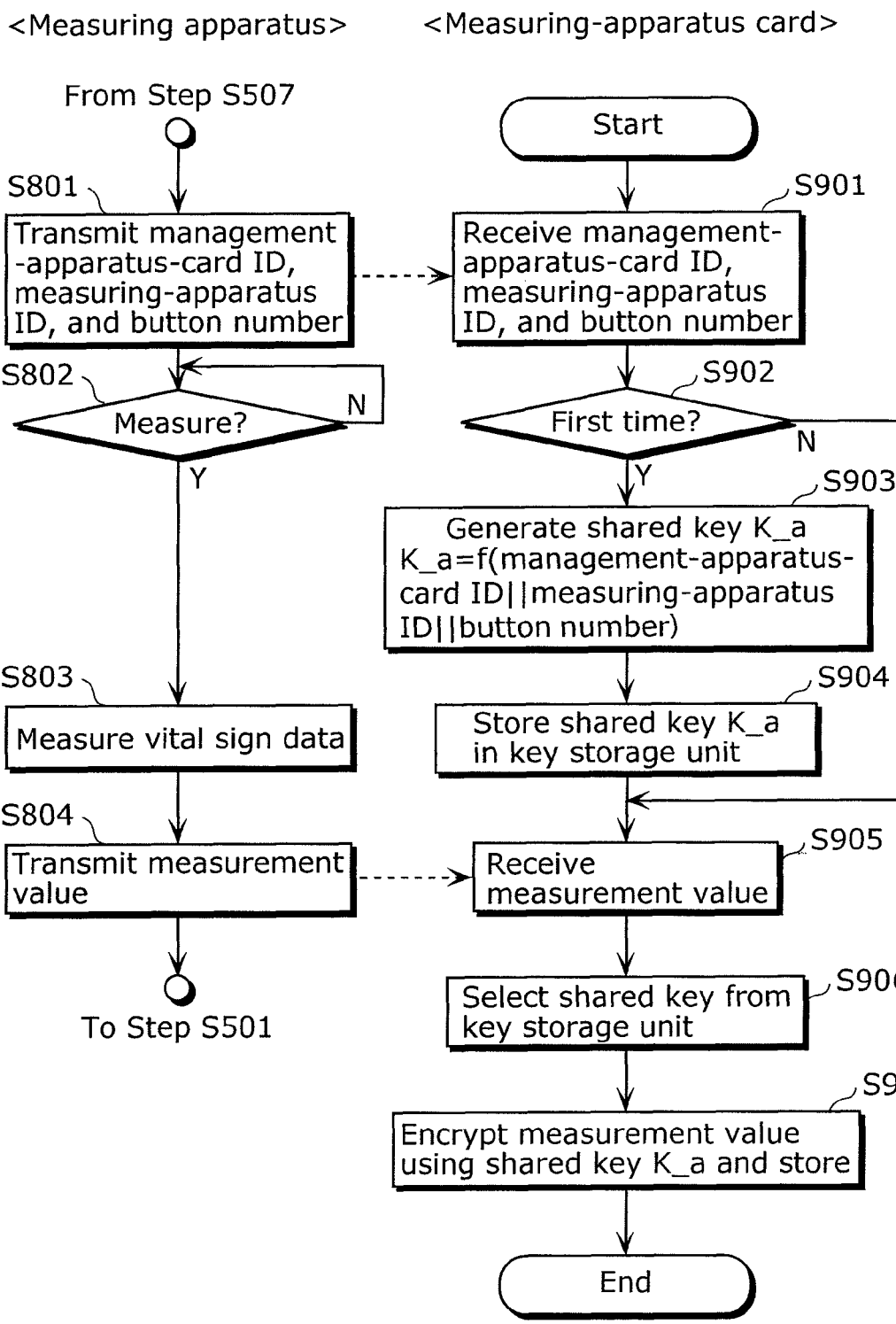
FIG. 15 is a flow chart illustrating a detailed process flow in a measurement step shown in FIG. 13.

FIG. 15 is a flow chart illustrating a detailed process flow in a measurement step (Step S508) shown in FIG. 13. In FIG. 15, a left flow chart illustrates a process flow in the measuring apparatus 101. In contrast, a right flow chart illustrates a process flow in the measuring-apparatus card 102 attached to the measuring apparatus 101.

To begin with, the flow chart of the measuring apparatus 101 will be described.

First, the card I/F unit 1014 transmits the button number received by the button unit 1013, the management-apparatus-card ID corresponding to the button number and stored in the management-apparatus-card information table 1016*a*, and the measuring-apparatus ID stored in the measuring-apparatus ID storage unit 1011 to the measuring-apparatus card 102 (Step S801). The vital sign data measurement unit 1012 then judges whether or not measurement is started (Step S802). Specifically, in the case where a measuring apparatus is, for example, a weight scales, when a user is on the measuring apparatus, the vital sign data measurement unit 1012 judges that the measurement is started. Here, in the case where it is judged that the measurement is not started (N in Step S802), the vital sign data measurement unit 1012 judges again whether a measurement is started (Step S802). On the other hand, in the case where it is judged that the measurement is started (Y in Step S802), the vital sign data measurement unit 1012 measures vital sign data to generate a measurement value (Step S803). The card I/F unit 1014 then transmits the measurement value to the measuring-apparatus card 102 (Step S804).

Next, the flow chart of the measuring-apparatus card 102 attached to the measuring apparatus 101 will be described.

First, the card I/F unit 1023 receives the management-apparatus-card ID, the measuring-apparatus ID, and the button number from the measuring apparatus 101 (Step S901). The key calculation unit 1022 judges whether or not the measuring-apparatus ID and the button number are information received for the first time (Step S902). Specifically, in the case where there is no shared key corresponding to the received measuring-apparatus ID and button number, the key calculation unit 1022 judges that the measuring-apparatus ID and the button number are the information received for the first time by referring to the management-apparatus information table 1028*a* stored in the key storage unit 1028. Here, in the case where it is judged that the measuring-apparatus ID and the button number are not the information received for the first time (N in Step S902), the process advances to Step S905. On the other hand, in the case where it is judged that the measuring-apparatus ID and the button number are the information received for the first time (Y in Step S902), the key calculation unit 1022 generates a shared key K_a by calculating a function f with the use of the management-apparatus-card ID, the measuring-apparatus ID, and the button number received in Step S901 (Step S903). The key storage unit 1028 then stores, into the management-apparatus information table 1028*a*, the shared key K_a together with the management-apparatus-card ID, the measuring-apparatus ID, and the button number (Step S904). The card I/F unit 1023 then receives the measurement value from the measuring apparatus 101 (Step S905). The encrypting unit 1026 selects the shared key K_a corresponding to the received measurement value by referring to the management-apparatus information table 1028*a* (Step S906). The encrypting unit 1026 then encrypts the measurement value using the selected shared key K_a. The measurement value storage unit 1025 then stores, into the measurement value table 1025*a*, the encrypted measurement value in association with the measuring-apparatus ID and the button number (Step S907).

Figure 16:
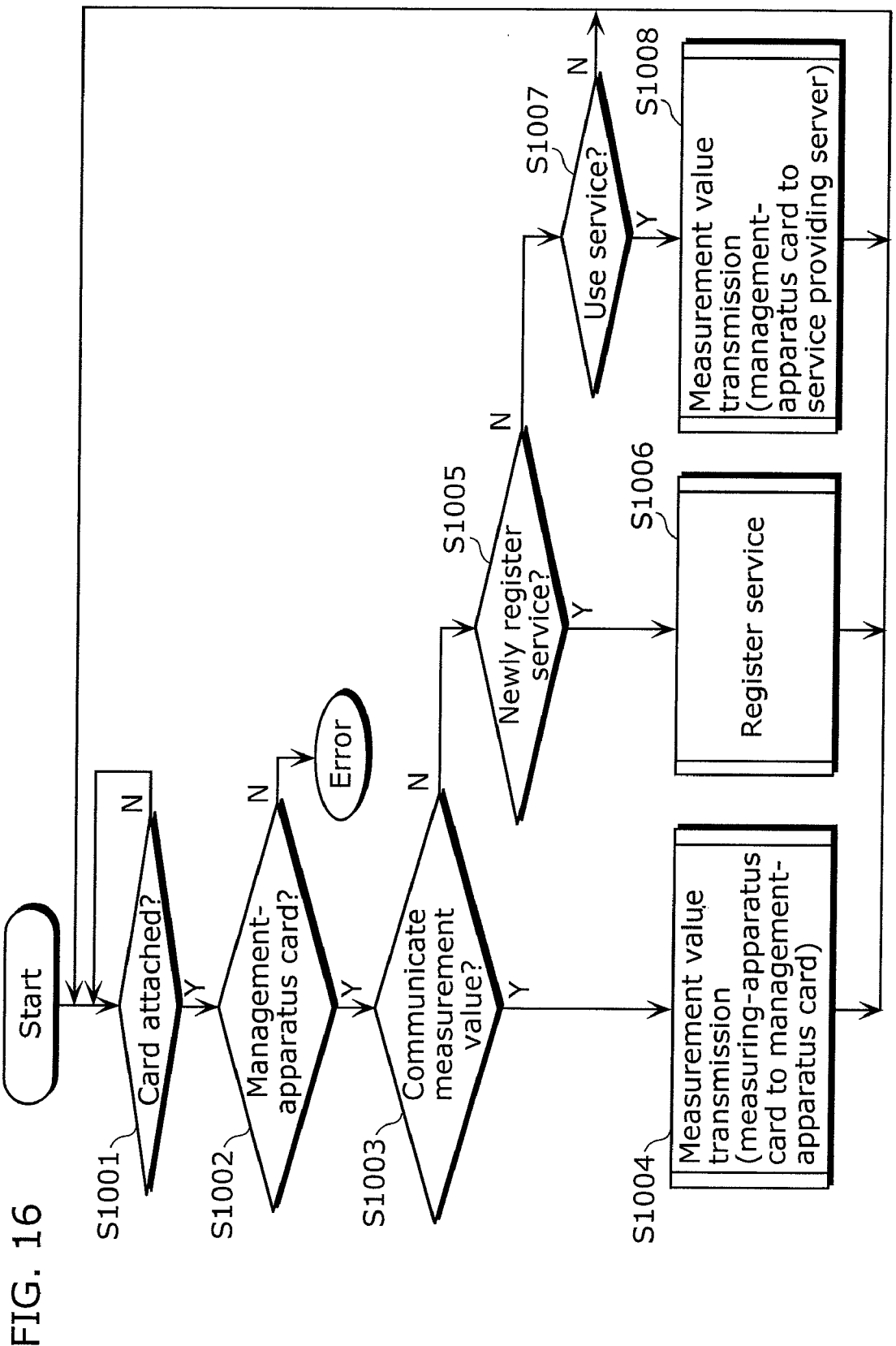
FIG. 16 is a flow chart illustrating a process flow in the management apparatus according to the embodiments 1 and 2 of the present invention.

FIG. 16 is a flow chart illustrating a process flow in the management apparatus 105.

First, the card I/F unit 1051 judges whether or not a card is attached (Step S1001). Here, it is judged that the card is not attached (N in Step S1001), the card I/F unit 1051 judges again whether or not a card is attached (S1001). On the other hand, in the case where it is judged that the card is attached (Y in Step S1001), the card I/F unit 1051 judges whether or not the attached card is a management-apparatus card (Step S1002). Here, in the case where it is judged that the attached card is not the measuring-apparatus card (N in Step S1002), the control unit 1054 performs error processing. On the other hand, in the case where it is judged that the attached card is the measuring-apparatus card (Y in Step S1002), the control unit 1054 judges whether or not transmission of a measurement value is to be started (Step S1003).

Here, in the case where it is judged that the transmission of the measurement value is to be started (Y in Step S1003), the management apparatus 105 transmits a measurement value from the measuring-apparatus card 102 to the management-apparatus card 106 (Step S1004).

On the other hand, in the case where it is judged that the transmission of the measurement value is not to be started (N in Step S1003), the control unit 1054 judges whether or not new registration of a service is to be started (Step S1005). Here, in the case where it is judged that the new registration of the service is to be started (Y in Step S1005), the management apparatus 105 registers a service (Step S1006).

On the other hand, in the case where it is judged that the new registration of the service is not to be started (N in Step S1005), the control unit 1054 judges whether or not use of a service is to be started (Step S1007). Here, in the case where it is judged that the use of the service is to be started (Y in Step S1007), the management apparatus 105 transmits the measurement value from the management-apparatus card 106 to the service providing server 107 (Step S1008). On the other hand, in the case where it is judged that the use of the service is not to be started (N in Step S1007), the control unit 1054 judges again whether or not use of a service is to be started (Step S1007).

Figure 17:
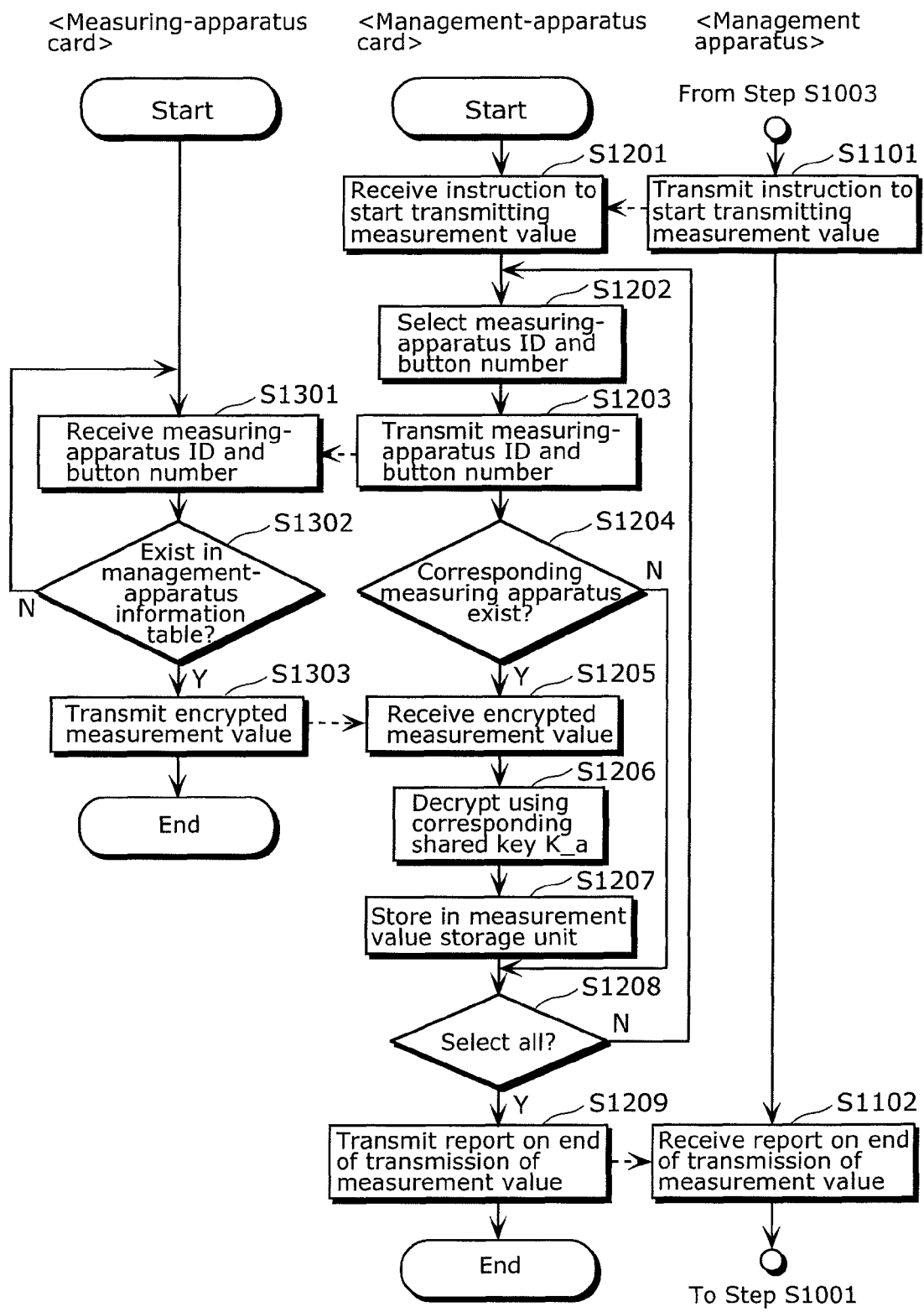
FIG. 17 is a flow chart illustrating a detailed process flow in a measurement value transmission step shown in FIG. 16.

FIG. 17 is a flow chart illustrating a detailed process flow in a measurement value transmission step (Step S1004) shown in FIG. 16. In FIG. 17, a left flow chart illustrates a process flow in the measuring-apparatus card 102 attached to the measuring apparatus 101. Furthermore, a central flow chart illustrates a process flow in the management-apparatus card 106 attached to the management apparatus 105. Moreover, a right flow chart illustrates a process flow in the management apparatus 105.

To begin with, the flow chart of the management apparatus 105 will be described.

First, the card I/F unit 1051 transmits an instruction to start transmitting a measurement value (from the measuring-apparatus card 102 to the management-apparatus card 106) to the management-apparatus card 106 (Step S1101). The card I/F unit 1051 then receives a report on an end of the transmission of the measurement value from the management-apparatus card 106 (Step S1102).

Next, the flow chart of the management-apparatus card 106 will be described.

First, the card I/F unit 1061 receives the instruction to start transmitting the measurement value from the management apparatus 105 (Step S1201). The near field wireless communication unit 1065 then selects the measuring-apparatus ID and the button number from the measuring-apparatus information table 1064*a* stored in the key storage unit 1064 (Step S1202). The near field wireless communication unit 1065 then transmits the selected measuring-apparatus ID and button number to the measuring-apparatus card 102 attached to the measuring apparatus 101 via the near field wireless communication path 109 (Step S1203). The near field wireless communication unit 1065 then judges whether or not the measuring apparatus 101 corresponding to the transmitted information exists, based on a response of the measuring-apparatus card 102 or the like (Step S1204). Here, in the case where it is judged that the measuring apparatus 101 corresponding to the transmitted information does not exist (N in Step S1204), the process advances to Step S1208. On the other hand, in the case where it is judged that the measuring apparatus 101 corresponding to the transmitted information exists (Y in Step S1204), the near field wireless communication unit 1065 receives an encrypted measurement value from the measuring-apparatus card 102 via the near field wireless communication path 109 (Step S1205). The decrypting unit 1066 then obtains a shared key K_a corresponding to the encrypted measurement value from the measuring-apparatus information table 1064a. The decrypting unit 1066 decrypts the encrypted measurement value using the obtained shared key K_a (Step S1206). The measurement value storage unit 1067 then stores the decrypted measurement value (Step S1207). The near field wireless communication unit 1065 then judges whether or not all measuring-apparatus IDs and button numbers are selected from the measuring-apparatus information table 1064a (Step S1208). Here, in the case where it is judged that all the measuring-apparatus IDs and button numbers are not selected (N in Step S1208), the near field wireless communication unit 1065 selects, from the measuring-apparatus information table 1064a, a measuring-apparatus ID and a button number that are not yet selected (Step S1202). On the other hand, in the case where it is judged that all the measuring-apparatus IDs and button numbers are selected (Y in Step S1208), the card I/F unit 1061 transmits the report on the end of the transmission of the measurement value to the management apparatus 105 (Step S1209).

Next, the flow chart of the measuring-apparatus card 102 will be described.

First, the near field wireless communication unit 1027 receives the measuring-apparatus ID and the button number from the management-apparatus card 106 via the near field wireless communication path 109 (Step S1301). The near field wireless communication unit 1027 judges whether or not the received measuring-apparatus ID and button number are in the management-apparatus information table 1028a stored in the key storage unit 1028 (Step S1302). Here, in the case where it is judged that the measuring-apparatus ID and the button number are in the management-apparatus information table 1028a (Y in Step S1302), the near field wireless communication unit 1027 transmits, to the management-apparatus card 106 of the management-apparatus-card ID corresponding to the measuring-apparatus ID and the button number, the encrypted measurement value corresponding to the measuring-apparatus ID and the button number and stored in the measurement value table 1025a (S1303). On the other hand, in the case where it is judged that the measuring-apparatus ID and the button number are not in the management-apparatus information table 1028a (N in Step S1302), the near field wireless communication unit 1027 receives again a measuring-apparatus ID and a button number from the management-apparatus card 106 via the near field wireless communication path 109 (Step S1301).

Figure 18:
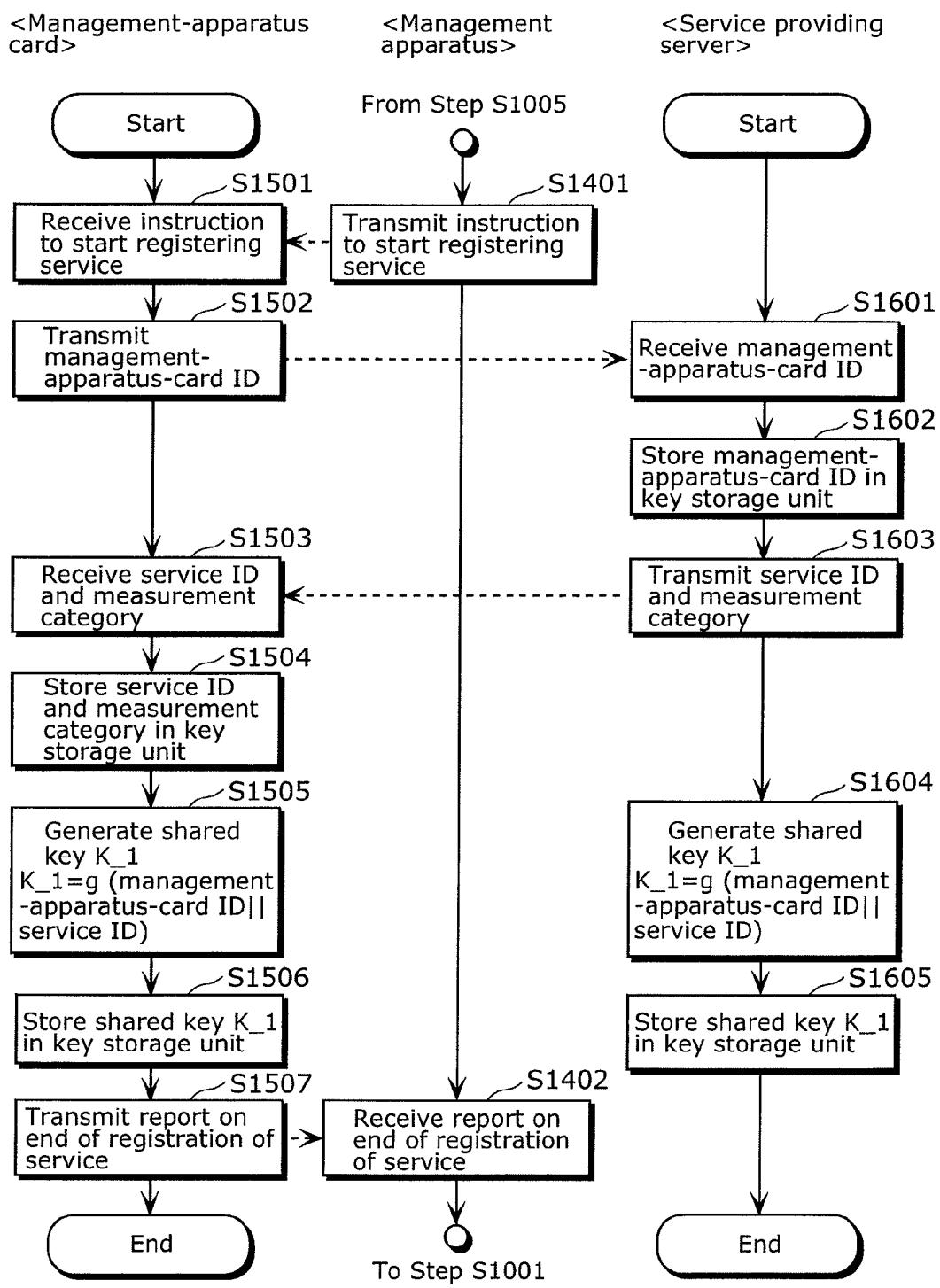
FIG. 18 is a flow chart illustrating a detailed process flow in a service registration step shown in FIG. 16.

FIG. 18 is a flow chart illustrating a detailed process flow in a service registration step (Step S1006) shown in FIG. 16. In FIG. 18, a left flow chart illustrates a process flow in the management-apparatus card 106 attached to the management apparatus 105. Furthermore, a central flow chart illustrates a process flow in the management apparatus 105. Moreover, a right flow chart illustrates a process flow in the service providing server 107.

To begin with, the flow chart of the management apparatus 105 will be described.

First, the card I/F unit 1051 transmits an instruction to start registering a service to the management-apparatus card 106 (Step S1401). The card I/F unit 1051 then receives a report on an end of the registration of the service from the management-apparatus card 106 (Step S1402).

Next, the flow chart of the management-apparatus card 106 will be described.

First, the card I/F unit 1061 receives the instruction to start registering the service from the management apparatus 105 (Step S1501). The communication unit 1069 then transmits the management-apparatus-card ID stored in the card ID storage unit 1062 to the service providing server 107 via the communication path 110 (Step S1502). The communication unit 1069 then receives a service ID and a measurement category from the service providing server 107 via the communication path 110 (Step S1503). The key storage unit 1064 then stores the received service ID and measurement category into the service information table 1064b (Step S703). The key calculation unit 1063 then generates a shared key K_1 by calculating a function g with the use of the received service ID and management-apparatus-card ID stored in the card ID storage unit 1062 (Step S1505). The key storage unit 1064 then stores the generated shared key K_1, in association with the management-apparatus-card ID and the service ID, into the service information table 1064b (Step S1506). The card I/F unit 1061 then transmits the report on the end of the registration of the service to the management apparatus 105 (Step S1507).

Next, the flow chart of the service providing server 107 will be described.

First, the communication unit 1072 receives the management-apparatus-card ID from the management-apparatus card 106 via the communication path 110 (Step S1601). The key storage unit 1074 then stores the received management-apparatus-card ID (Step S1602). The communication unit 1072 then transmits the service ID stored in the service ID storage unit 1071 and the measurement category to the management-apparatus card 106 via the communication path 110 (Step S1603). The key calculation unit 1073 then generates a shared key K_1 by calculating a function g with the use of the received management-apparatus-card ID and the service ID stored in the service ID storage unit 1071 (Step S1604). The key storage unit 1064 then stores the generated shared key K_1 in association with the management-apparatus-card ID and the service ID (Step S1605).

Figure 19:
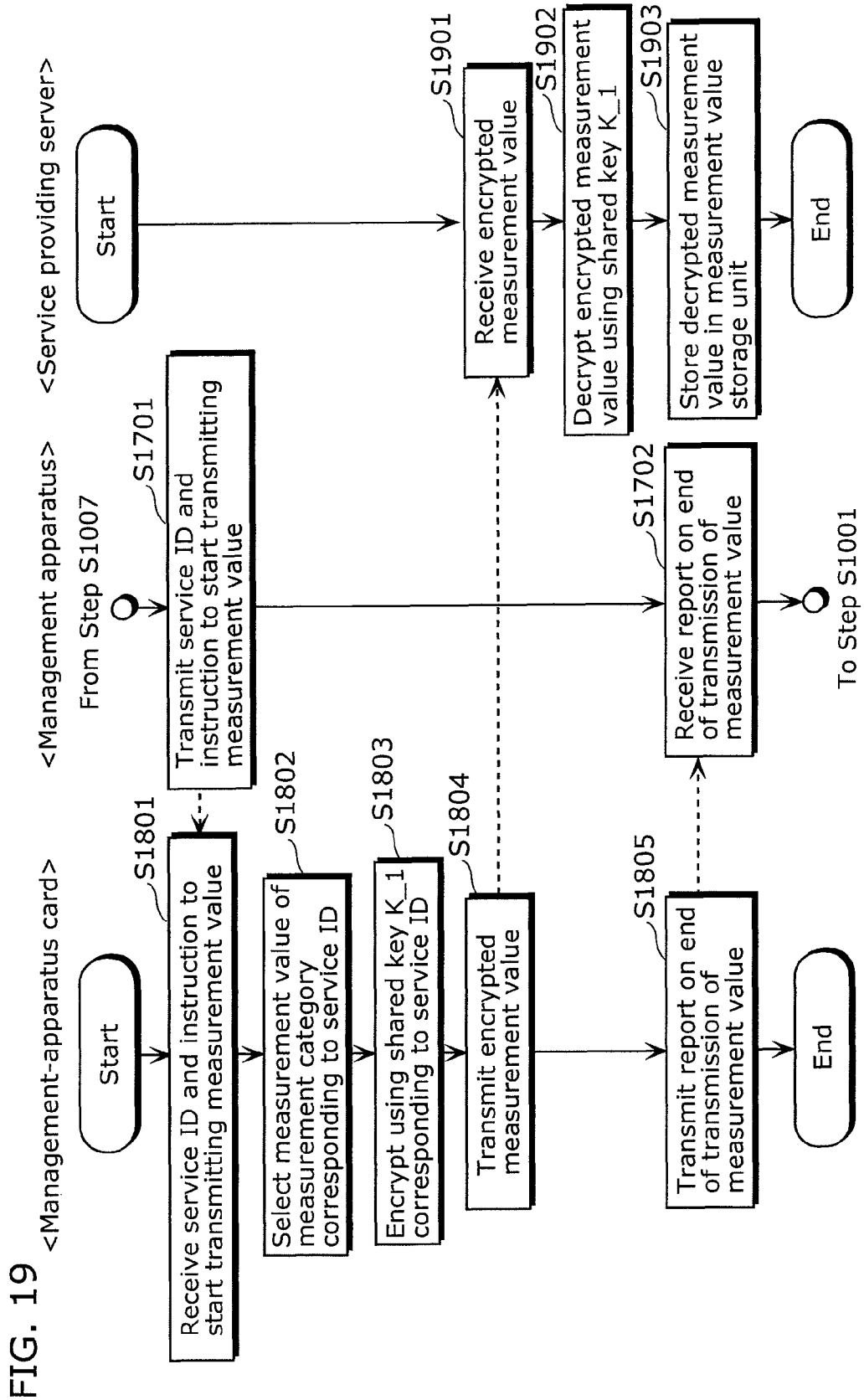
FIG. 19 is a flow chart illustrating a detailed process flow in the measurement value transmission step shown in FIG. 16.

FIG. 19 is a flow chart illustrating a detailed process flow in a measurement value transmission step (Step S1008) shown in FIG. 16. In FIG. 19, a left flow chart illustrates a process flow in the management-apparatus card 106 attached to the management apparatus 105. Furthermore, a central flow chart illustrates a process flow in the management apparatus 105. Moreover, a right flow chart illustrates a process flow in the service providing server 107.

To begin with, the flow chart of the management apparatus 105 will be described.

First, the card I/F unit 1051 transmits, to the management-apparatus card 106, an instruction to start transmitting a measurement value (from the management-apparatus card 106 to the service providing server 107) together with a service ID for identifying the service providing server 107 to be communicated with (Step S1701). The card I/F unit 1051 then receives a report on an end of the transmission of the measurement value from the management-apparatus card 106 (Step S1702).

Next, the flow chart of the management-apparatus card 106 will be described.

First, the card I/F unit 1061 receives the instruction to start transmitting the measurement value and the service ID from the management apparatus 105 (Step S1801). The encrypting unit 1068 then obtains the measurement category corresponding to the received service ID by referring to the service information table 1064b stored in the key storage unit 1064. The encrypting unit 1068 then selects the measurement value corresponding to the obtained measurement category from the measurement value storage unit 1067 (Step S1802). The encrypting unit 1068 then obtains the shared key K_1 corresponding to the received service ID by referring to the service information table 1064b. The encrypting unit 1068 then encrypts the measurement value selected in Step S1802 using the obtained shared key K_1 (Step S1803). The communication unit 1069 then transmits the encrypted measurement value to the service providing server 107 via the communication path 110 (Step S1804). Lastly, the card I/F unit 1061 transmits the report on the end of the transmission of the measurement value to the management apparatus 105 (Step S1805).

Next, the flow chart of the service providing server 107 will be described.

First, the communication unit 1072 receives the encrypted measurement value from the management-apparatus card 106 via the communication path 110 (Step S1901). The decrypting unit 1075 then obtains the shared key K_1 corresponding to the received encrypted measurement value from the key storage unit 1074. The decrypting unit 1075 then decrypts the obtained encrypted measurement value using the obtained shared key K_1 (Step S1902). Finally, the measurement value storage unit 1067 stores the decrypted measurement value (Step S1903).

As described above, in the health care system 100 according to the embodiment 1, since the measuring-apparatus card 102 transmits, to the management-apparatus card 106, the measurement value that is encrypted by using the shared key shared with the management-apparatus card 106, it is possible to assure the confidentiality of the measurement value.

Furthermore, since the shared key used in encrypting and decrypting the measurement value is generated based on the measuring-apparatus ID indicating the measuring apparatus 101, the button number identifying the user of the measuring apparatus 101, and the management-apparatus-card ID indicating the management-apparatus card 106, the health care system 100 according to the embodiment 1 can assure, for each user, the confidentiality of the measurement value.

Moreover, since an information source of the measuring-apparatus ID that can be received from the measuring apparatus 101 is different from that of the management-apparatus-card ID that can be received from the management-apparatus card 106, it is not possible to generate the shared key without information from both of the information sources. As a result, the health care system 100 according to the embodiment 1 can assure the confidentiality of the shared key generated by either the management-apparatus card 106 or the measuring-apparatus card 102.

Furthermore, only in the case where the management-apparatus card 106 is attached to the measuring apparatus 101, the measuring apparatus 101 and the management-apparatus card 106 can exchange the measuring-apparatus ID and the button number for the management-apparatus-card ID with each other via the card interface. Accordingly, since a combination of the measuring-apparatus ID, the button number, and the management-apparatus-card ID, all of which are necessary in generating the shared key, is not communicated, it is possible to assure the confidentiality of the shared key generated by either the management-apparatus card 106 or the measuring-apparatus card 102.

Moreover, both in the case where the management-apparatus card 106 is attached to the measuring apparatus 101 and where the measuring-apparatus card 102 is attached to the measuring apparatus 101, the measuring apparatus 101 identifies the user by the same button. Accordingly, since there is no need to provide buttons each corresponding to one of the above cases, not only can the number of components in the measuring apparatus 101 according to the embodiment 1 be reduced but also the measuring apparatus 101 can be miniaturized.

Embodiment 2

The following will describe a health care system according to an embodiment 2 with reference to the drawings.

The measurement value is encrypted with symmetric-key cryptography in the health care system 100 according to the embodiment 1, and a health care system 100 according to the embodiment 2 differs from the health care system 100 according to the embodiment 1 in that a measurement value is encrypted with public-key cryptography. Hereafter, a description of the same elements as in the health care system 100 according to the embodiment 1 is omitted, and elements that are different from those in the health care system 100 according to the embodiment 1 will be mainly described.

<Measuring Apparatus 101>

Since a measuring apparatus 101 according to the embodiment 2 has the same functional configuration as the functional configuration of the measuring apparatus 101 according to the embodiment 1 shown in FIG. 2, a description of the measuring apparatus 101 according to the embodiment 2 is omitted. Hereafter, differences between the two will be described.

A card I/F unit 1014 is an example of an interface unit. When a management-apparatus card 106 is attached to the measuring apparatus 101, the card I/F unit 1014 provides, to the management-apparatus card 106, a measuring-apparatus ID and a button number and receives, from the to the management-apparatus card 106, a public key generated by the management-apparatus card 106 using the outputted measuring-apparatus ID and button number.

Figure 20:
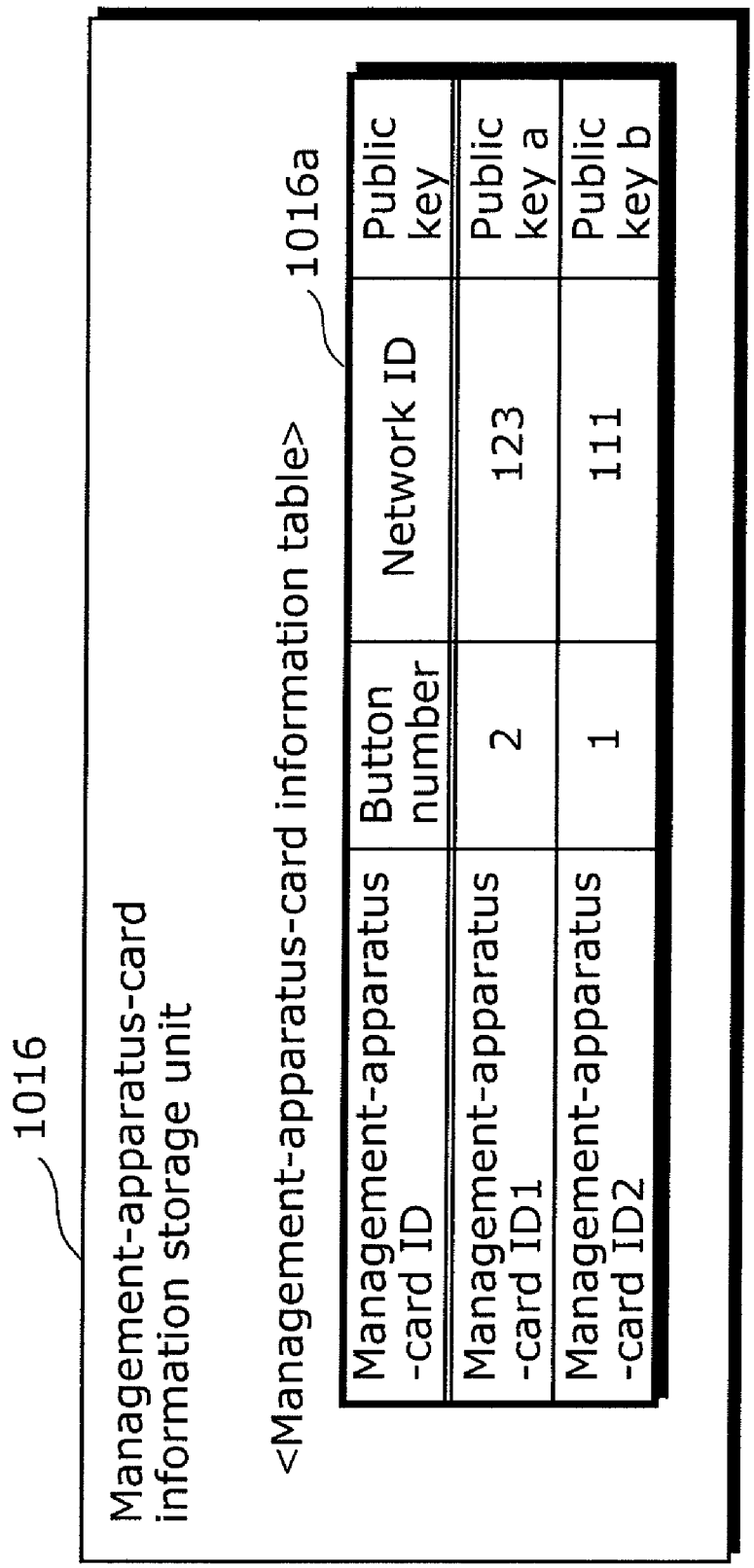
FIG. 20 is a diagram illustrating an example of a management-apparatus-card information table according to the embodiment 2 of the present invention.

A management-apparatus-card information storage unit 1016 stores, into a management-apparatus-card information table 1016a, the management-apparatus-card ID of the management-apparatus card 106, the button number, a network ID, and a public key corresponding to the management-apparatus-card ID, the button number, and the network ID. FIG. 20 is a diagram illustrating an example of the management-apparatus-card information table 1016a. As shown in FIG. 20, the management-apparatus-card ID, the button number, the network ID, and the public key are stored in the management-apparatus-card information table 1016a. That is to say, the management-apparatus-card information table 1016a according to the embodiment 2 differs from the management-apparatus-card information table 1016a according to the embodiment 1 in that the public key is stored into the management-apparatus-card information table 1016a. For example, the management-apparatus-card information table 1016a shown in FIG. 20 indicates that a public key corresponding to the management-apparatus card 106 identified by a management-apparatus-card ID "Management-apparatus-card ID 1" and a button of the measuring apparatus 101 identified by a button number "2" is a "Public key a".

<Measuring-Apparatus Card 102>

Figure 21:
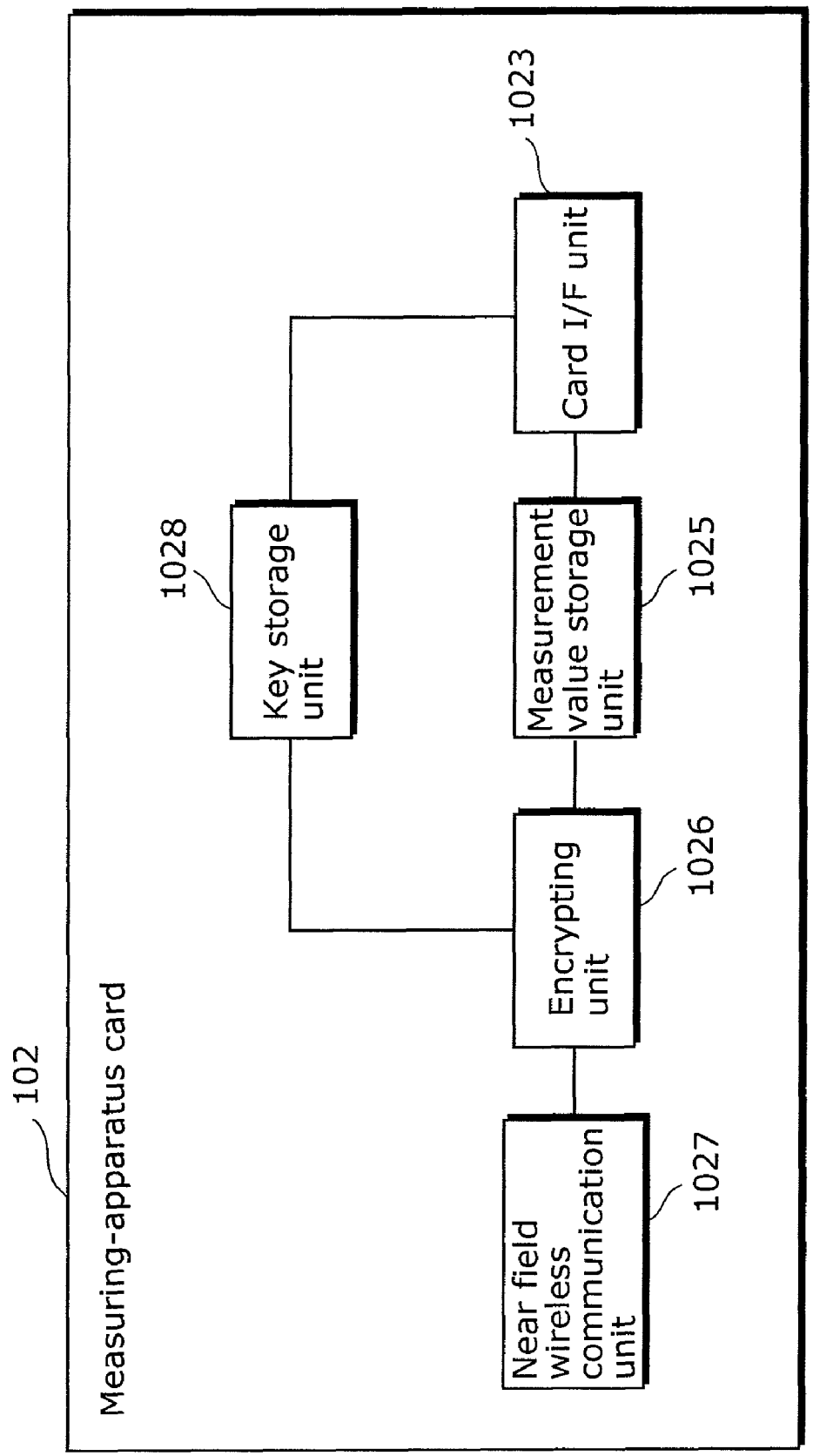
FIG. 21 is a diagram illustrating a functional configuration of a measuring-apparatus card according to the embodiment 2 of the present invention.

FIG. 21 is a diagram illustrating a functional configuration of a measuring-apparatus card 102. It is to be noted that a description of a measuring-apparatus card 104 is omitted since the measuring-apparatus card 104 has the same functional configuration as the measuring-apparatus card 102. As shown in FIG. 21, the measuring-apparatus card 102 includes a card I/F unit 1023, a measurement value storage unit 1025, an encrypting unit 1026, a near field wireless communication unit 1027, and a key storage unit 1028. That is to say, the measuring-apparatus card 102 according to the embodiment 2 differs from the measuring-apparatus card 102 according to the embodiment 1 shown in FIG. 4 in that a key calculation unit generating a decryption key is not included.

The encrypting unit 1026 is an example of a control unit. When a button of an button unit 1013 included in the measuring apparatus 101 is pressed, the encrypting unit 1026 obtains, from a management-apparatus information table 1028a stored in the key storage unit 1028, a public key corresponding to a button number of the pressed button. The encrypting unit 1026 then encrypts a measurement value measured by a vital sign data measurement unit 1012 included in the measuring apparatus 101 using the public key.

The key storage unit 1028 stores, into the management-apparatus information table 1028a, the public key received from the management-apparatus card 106. FIG. 22 is a diagram illustrating an example of the management-apparatus information table 1028a. As shown in FIG. 22, the management-apparatus-card ID, the measuring-apparatus ID, the button number, the network ID, and the public key are stored in the management-apparatus information table 1028a. As stated above, the management-apparatus information table 1028a according to the embodiment 2 differs from the management-apparatus information table 1028a according to the embodiment 1 in that the public key instead of the shared key is stored.

<Management Apparatus 105>

Since a management apparatus 105 according to the embodiment 2 has the same functional configuration as the functional configuration of the management apparatus 105 according to the embodiment 1 shown in FIG. 7, a description of the management apparatus 105 according to the embodiment 2 is omitted.

<Management-Apparatus Card 106>

Since a management-apparatus card 106 according to the embodiment 2 has the same functional configuration as the functional configuration of the management-apparatus card 106 according to the embodiment 1 shown in FIG. 7, a description of the management-apparatus card 106 according to the embodiment 2 is omitted.

The management-apparatus card 106 according to the embodiment 2 largely differs from the management-apparatus card 106 according to the embodiment 1 which generates the shared key in that a public key and a secret key corresponding to the public key, which are used in encrypting and decrypting a measurement value to be transmitted to the measuring-apparatus card 102, are generated. The following will mainly describe components of the management-apparatus card 106 according to the embodiment 2 that are different from those of the management-apparatus card 106 according to the embodiment 1.

A key calculation unit 1063 is an example of a generation unit, and generates a public key and a secret key corresponding to the public key, using a management-apparatus-card ID stored in a card ID storage unit 1062 and a measuring-apparatus ID and button number received from the measuring apparatus 101 when the management-apparatus card 106 is attached to the measuring apparatus 101. It is to be noted that the public key and the secret key may be generated using publicly known technologies such as RSA cryptography.

The key storage unit 1064 stores a measuring-apparatus information table 1064a including information relevant to the measuring apparatus 101 (including an encryption key generated by the key calculation unit 1063) and a service information table 1064b including information relevant to a service providing server 107 (including the public key received from the service providing server 107).

FIG. 23 is a diagram illustrating respective examples of the measuring-apparatus information table 1064a and the service information table 1064b which are stored in the key storage unit 1064. As shown in FIG. 23, a measuring-apparatus ID, a button number, a network ID, and a secret key are stored in the measuring-apparatus information table 1064a. The secret key is the secret key generated by the key calculation unit 1063. For example, the measuring-apparatus information table 1064a shown in FIG. 23 indicates that a measurement value measured by a user identified by a button number "2" would be decrypted using "Secret key a" in a measuring apparatus identified by a measuring-apparatus ID "Weight scales 1".

On the other hand, a service ID, a measurement category, a network ID, and a public key are stored in the service information table 1064b. The public key is the public key provided by the service providing server 107. For instance, the service information table 1064b shown in FIG. 23 indicates that data indicated by a measurement category "User ID" and "Body weight", which is transmitted to a service providing server identified by a service ID "Service A", would be encrypted using "Public key a".

The decrypting unit 1066 is an example of the control unit, and decrypts the encrypted measurement value received by the near field wireless communication unit 1065, using the secret key included in the measuring-apparatus information table 1064a stored in the key storage unit 1064.

The encrypting unit 1068 re-encrypts the measurement value of a measurement category corresponding to the service providing server 107, using the public key received from the service providing server 107.

<Service Providing Server 107>

Since a service providing server 107 according to the embodiment 2 has the same functional configuration as the functional configuration of the service providing server 107 according to the embodiment 1 shown in FIG. 10, a description of the service providing server 107 according to the embodiment 2 is omitted.

The service providing server 107 according to the embodiment 2 largely differs from the service providing server 107 according to the embodiment 1 which generates the shared key in that a public key and a secret key corresponding to the public key, which are used in encrypting and decrypting a measurement value to be transmitted to the management-apparatus card 106, are generated. The following will mainly describe components of the service providing server 107 according to the embodiment 2 that are different from those of the service providing server 107 according to the embodiment 1.

A key calculation unit 1073 generates a public key and a secret key corresponding to the public key, using the management-apparatus-card ID received from the management-apparatus card 106 and the service ID stored in the service ID storage unit 1071. It is to be noted that the public key and the secret key may be generated using publicly known technologies such as the RSA cryptography.

A decrypting unit 1075 decrypts the encrypted measurement value received from the management-apparatus card 106 using the secret key generated by the key calculation unit 1073.

Next, operations of the health care system 100 configured as above will be described. As with the health care system 100 according to the embodiment 1, the operations of the health care system 100 according to the embodiment 2 are classified broadly into the following four phases: (1) Measuring apparatus Registration Phase; (2) Service Registration Phase; (3) Measurement Phase; and (4) Measurement Value Transmission Phase. The following will mainly describe processes that are different from those of the embodiment 1 with reference to FIGS. 24 and 25.

Figure 24:
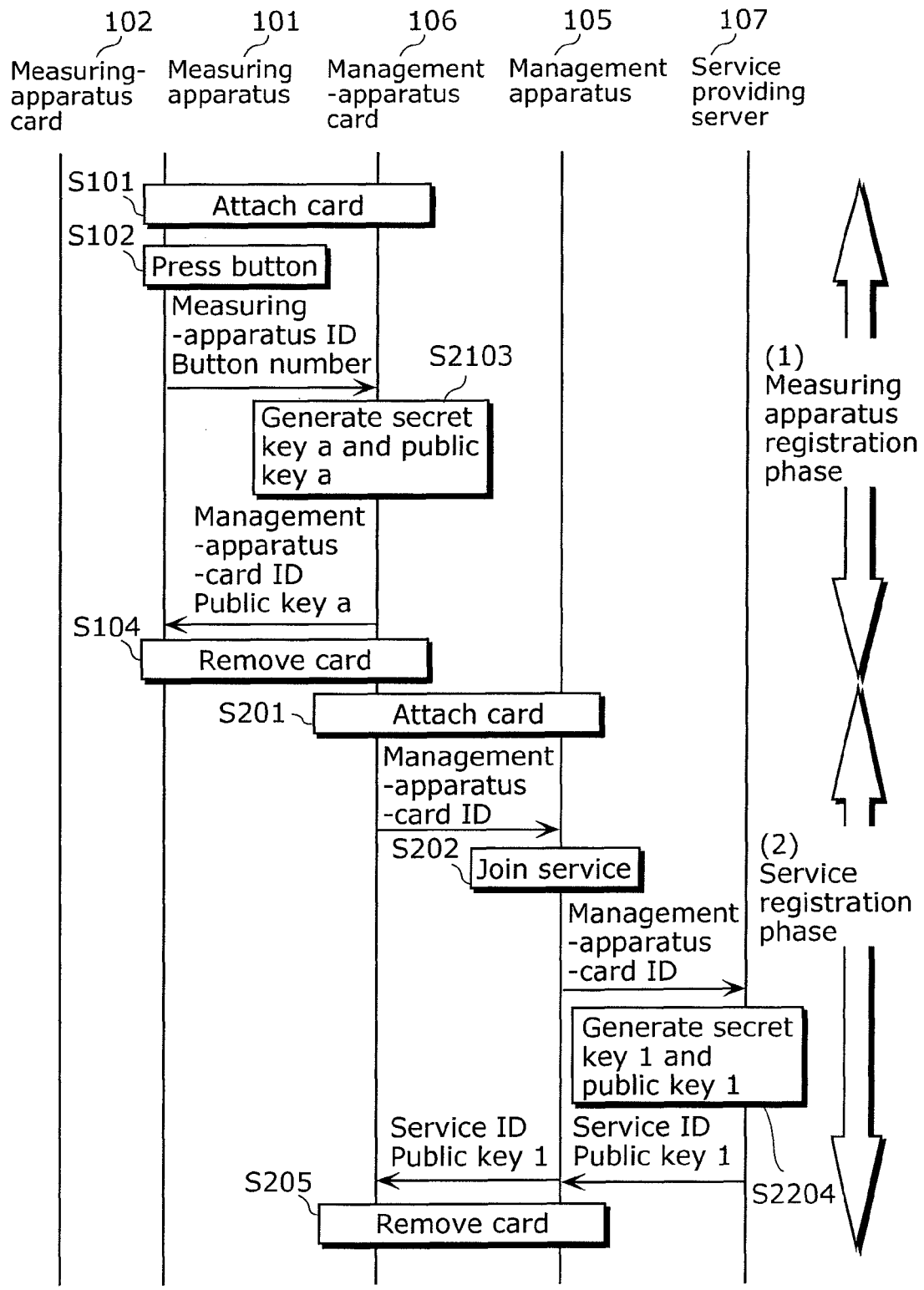
FIG. 24 is a sequence diagram illustrating a process flow in a measuring apparatus registration phase and a service registration phase in the health care system according to the embodiment 2 of the present invention.

FIG. 24 is a sequence diagram illustrating a process flow in (1) Measuring Apparatus Registration Phase and (2) Service Registration Phase in the health care system 100.

(1) Measuring Apparatus Registration Phase

As with the embodiment 1, first, processes at Steps S101 and S102 are performed. The management-apparatus card 106 receives a measuring-apparatus ID and a button number from the measuring apparatus 101.

Subsequently, the key calculation unit 1063 of the management-apparatus card 106 generates a public key a and a secret key a corresponding to the public key a, using a management-apparatus-card ID, the measuring-apparatus ID, and the button number (Step S2103). The generated secret key a is stored, in association with the measuring-apparatus ID and the button number, into the key storage unit 1064 of the management-apparatus card 106.

Subsequently, the measuring apparatus 101 receives the management-apparatus-card ID and the public key a from the management-apparatus card 106. The received management-apparatus-card ID and the public key a are then stored, in association with the button number, into the management-apparatus-card information storage unit 1016 of the measuring apparatus 101.

As with the embodiment 1, when a user A removes the management-apparatus card 106 from the measuring apparatus 101, the measuring apparatus 101 detects the removal of the management-apparatus card 106 (Step S104).

(2) Service Registration Phase

As with the embodiment 1, first, processes at Steps S201 and S202 are performed. The service providing server 107 then receives the management-apparatus-card ID from the management apparatus 105.

Subsequently, the key calculation unit 1073 of the service providing server 107 generates a public key 1 and a secret key 1 corresponding to the public key 1, using the management-apparatus-card ID and the service ID (Step S2204). The generated secret key 1 is stored into the key storage unit 1074. By contrast, the generated public key 1, together with the service ID, the measurement category, is transmitted to the management-apparatus card 106.

As with the embodiment 1, when the user A removes the management-apparatus card 106 from the management apparatus 105, the management apparatus 105 detects the removal of the management-apparatus card 106 (Step S205).

Figure 25:
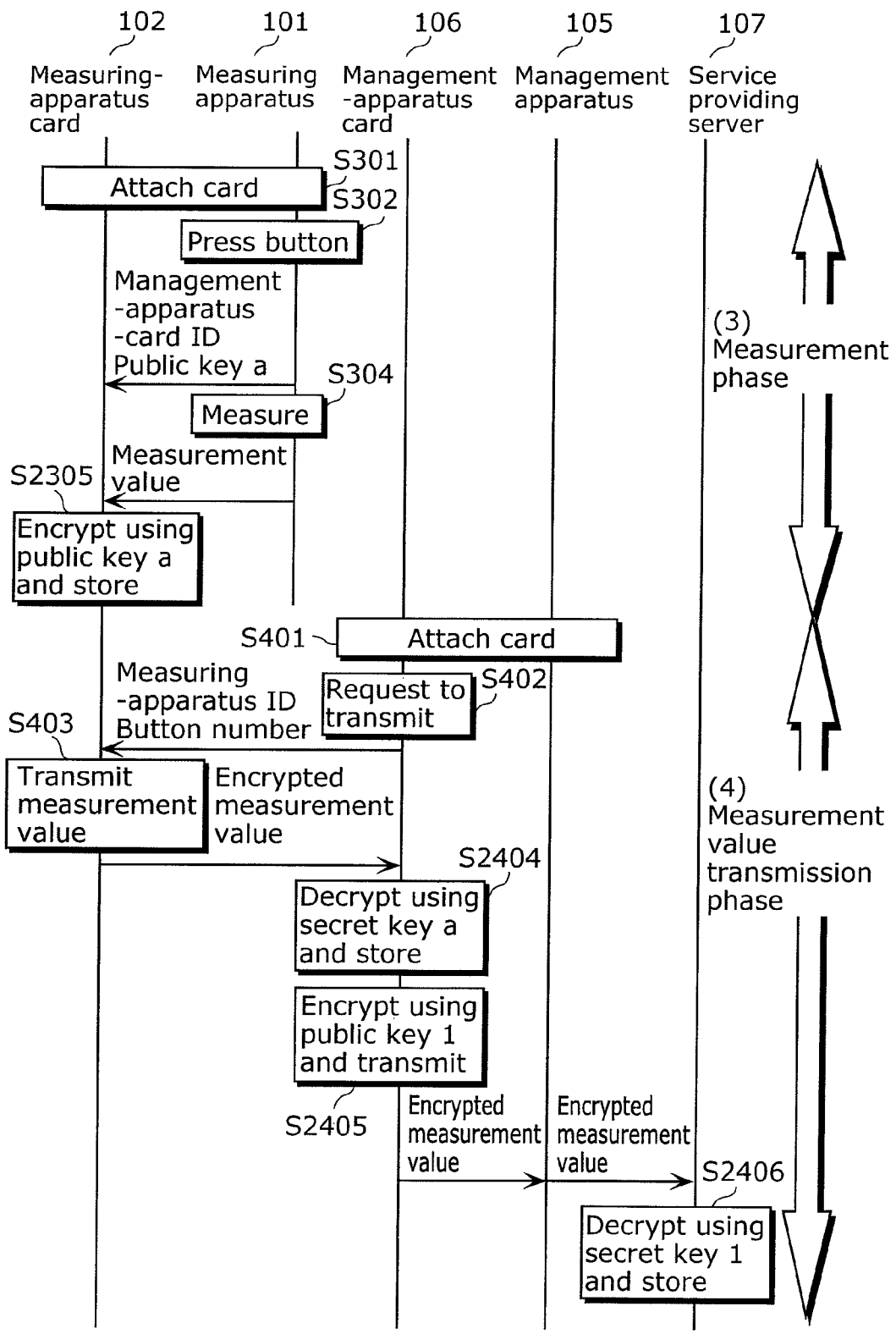
FIG. 25 is a sequence diagram illustrating a process flow in a measurement phase and a measurement value transmission phase in the health care system according to the embodiment 2 of the present invention.

FIG. 25 is a sequence diagram illustrating a process flow in (3) Measurement Phase and (4) Measurement Value Transmission Phase in the health care system 100.

(3) Measurement Phase

As with the embodiment 1, first, processes at Steps S301 to S304 are performed. The measuring-apparatus card 102 then receives a measurement value from the measuring apparatus 101.

Subsequently, the measuring-apparatus card 102 encrypts the received measurement value using the public key a. Further, the measuring-apparatus card 102 stores the encrypted measurement value, together with the measuring-apparatus ID of the measuring apparatus 101 and the button number of the button pressed at measurement, into the measurement value table 1025a stored in the measurement value storage unit 1025 (Step S2305).

(4) Measurement Value Transmission Phase

As with the embodiment 1, first, processes at Steps S401 to S403 are performed. The management-apparatus card 106 then receives the encrypted measurement value from the measuring-apparatus card 102.

Subsequently, the management-apparatus card 106 decrypts the received encrypted measurement value using the secret key a stored in the key storage unit 1064. The management-apparatus card 106 then stores the decrypted measurement value into the measurement value storage unit 1067 (Step S2404).

Subsequently, by referring to the service information table 1064b stored in the key storage unit 1064, the management-apparatus card 106 encrypts only the measurement value to be collected by the service providing server 107 using the public key 1. The management-apparatus card 106 then transmits the encrypted measurement value to the service providing server 107 (Step S2405).

Subsequently, the service providing server 107 decrypts the received encrypted measurement value using the secret key 1 stored in the key storage unit 1074. The service providing server 107 then stores the decrypted measurement value into the measurement value storage unit 1076 (Step S2406).

Next, an operation of each of the measuring apparatus 101, the measuring-apparatus card 102, the management apparatus 105, the management-apparatus card 106, and the service providing server 107 will be described.

Since an overall process flow of the measuring apparatus 101 is the same as the process flow of the measuring apparatus 101 according to the embodiment 1 shown in FIG. 13, a description of the overall process flow is omitted.

Figure 26:
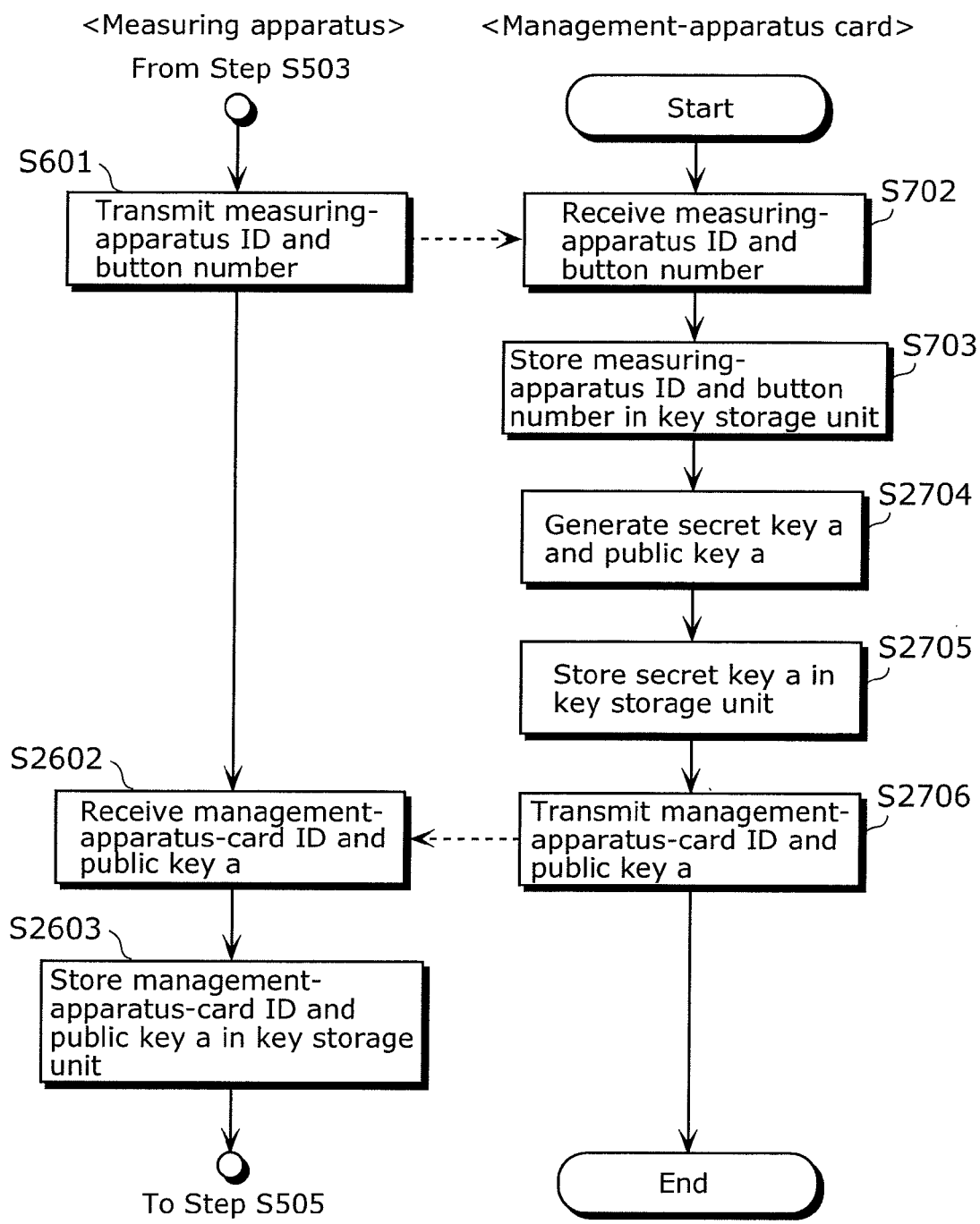
FIG. 26 is a flow chart illustrating a detailed process flow in the measuring apparatus registration step shown in FIG. 13.

FIG. 26 is a flow chart illustrating a detailed process flow in the measuring apparatus registration step (Step S504) shown in FIG. 13. In FIG. 26, a left flow chart illustrates a process flow in the measuring apparatus 101. In contrast, a right flow chart illustrates a process flow in the management-apparatus card 106 attached to the measuring apparatus 101.

To begin with, the flow chart of the measuring apparatus 101 will be described.

As with the embodiment 1, first, the card I/F unit 1014 transmits the measuring-apparatus ID stored in the measuring-apparatus ID storage unit 1011 and the button number received by the button unit 1013 to the management-apparatus card 106 (Step S601). The card I/F unit 1014 subsequently receives the management-apparatus-card ID and the public key a from the management-apparatus card 106 attached to the measuring apparatus 101 (Step S2602). The management-apparatus-card information storage unit 1016 then stores, into the management-apparatus-card information table 1016a, the received management-apparatus-card ID and public key a in association with the button number (Step S2603).

Next, the flow chart of the management-apparatus card 106 attached to the measuring apparatus 101 will be described.

First, the card I/F unit 1061 receives the measuring-apparatus ID and the button number from the measuring apparatus 101 (Step S702). The key storage unit 1064 then stores the received measuring-apparatus ID and button number into the measuring-apparatus information table 1064a (Step S703). The key calculation unit 1063 then generates a public key a and a secret key a corresponding to the public key a, using the received measuring-apparatus ID and button number and the management-apparatus-card ID stored in the card ID storage unit 1062 (Step S2704). The management-apparatus-card information storage unit 1016 then stores, into the management-apparatus-card information table 1016a, the generated secret key in association with the management-apparatus-card ID and the button number (Step S2705). Lastly, the card I/F unit 1061 transmits the management-apparatus-card ID and the public key a to the measuring apparatus 101 (Step S2706).

Figure 27:
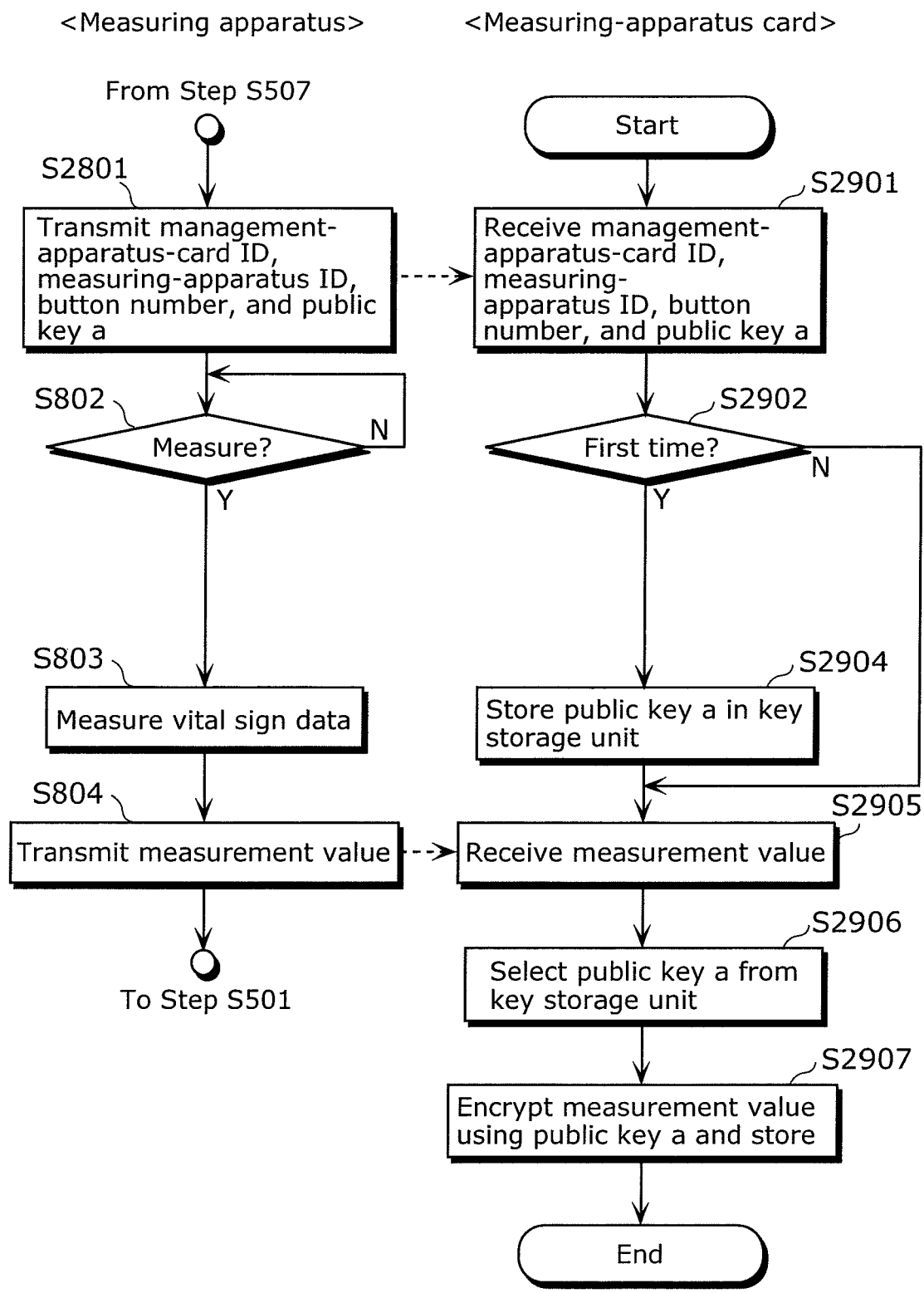
FIG. 27 is a flow chart illustrating a detailed process flow in the measurement step shown in FIG. 13.

FIG. 27 is a flow chart illustrating a detailed process flow in the measurement step (Step S508) shown in FIG. 13. In FIG. 27, a left flow chart illustrates a process flow in the measuring apparatus 101. In contrast, a right flow chart illustrates a process flow in the measuring-apparatus card 102 attached to the measuring apparatus 101.

To begin with, the flow chart of the measuring apparatus 101 will be described.

First, the card I/F unit 1014 transmits, to the measuring-apparatus card 102, the button number received by the button unit 1013, the management-apparatus-card ID and public key a which correspond to the button number and which are stored in the management-apparatus-card information storage unit 1016, and the measuring-apparatus ID stored in the measuring-apparatus ID storage unit 1011 (Step S2801). As with the embodiment 1, subsequently, processes at Steps S802 to S804 are performed.

Next, the flow chart of the measuring-apparatus card 102 attached to the measuring apparatus 101 will be described.

First, the card I/F unit 1023 receives the management-apparatus-card ID, the measuring-apparatus ID, the button number, and the public key a from the measuring apparatus 101 (Step S2901). The key calculation unit 1022 subsequently judges whether or not the measuring-apparatus ID, the button number, and the public key a are information received for the first time (Step S2902). Specifically, in the case where there is no public key a corresponding to the received measuring-apparatus ID and button number, the key calculation unit 1022 judges that the measuring-apparatus ID, the button number, and the public key a are the information received for the first time by referring to the management-apparatus information table 1028a stored in the key storage unit 1028. Here, in the case where it is judged that the measuring-apparatus ID, the button number, and the public key a are not the information received for the first time (N in Step S2902), the process advances to Step S2905. On the other hand, in the case where it is judged that the measuring-apparatus ID, the button number, and the public key a are the information received for the first time (Y in Step S2902), the key storage unit 1028 stores, into the management-apparatus information table 1028a, the public key a together with the management-apparatus-card ID, the measuring-apparatus ID, and the button number (Step S2904). The card I/F unit 1023 then receives the measurement value from the measuring-apparatus card 102 (Step S2905). The encrypting unit 1026 then selects the public key a corresponding to the received measurement value by referring to the management-apparatus information table 1028a (Step S2906). The encrypting unit 1026 then encrypts the measurement value using the selected public key a. The measurement value storage unit 1025 then stores, into the measurement value table 1025a, the encrypted measurement value in association with the measuring-apparatus ID and the button number (Step S2907).

Next, the following will mainly describe a process flow in the management apparatus 105. It is to be noted that since an overall process flow of the management apparatus 105 is the same as the process flow of the management apparatus 105 according to the embodiment 1 shown in FIG. 16, a description of the overall process flow is omitted.

Figure 28:
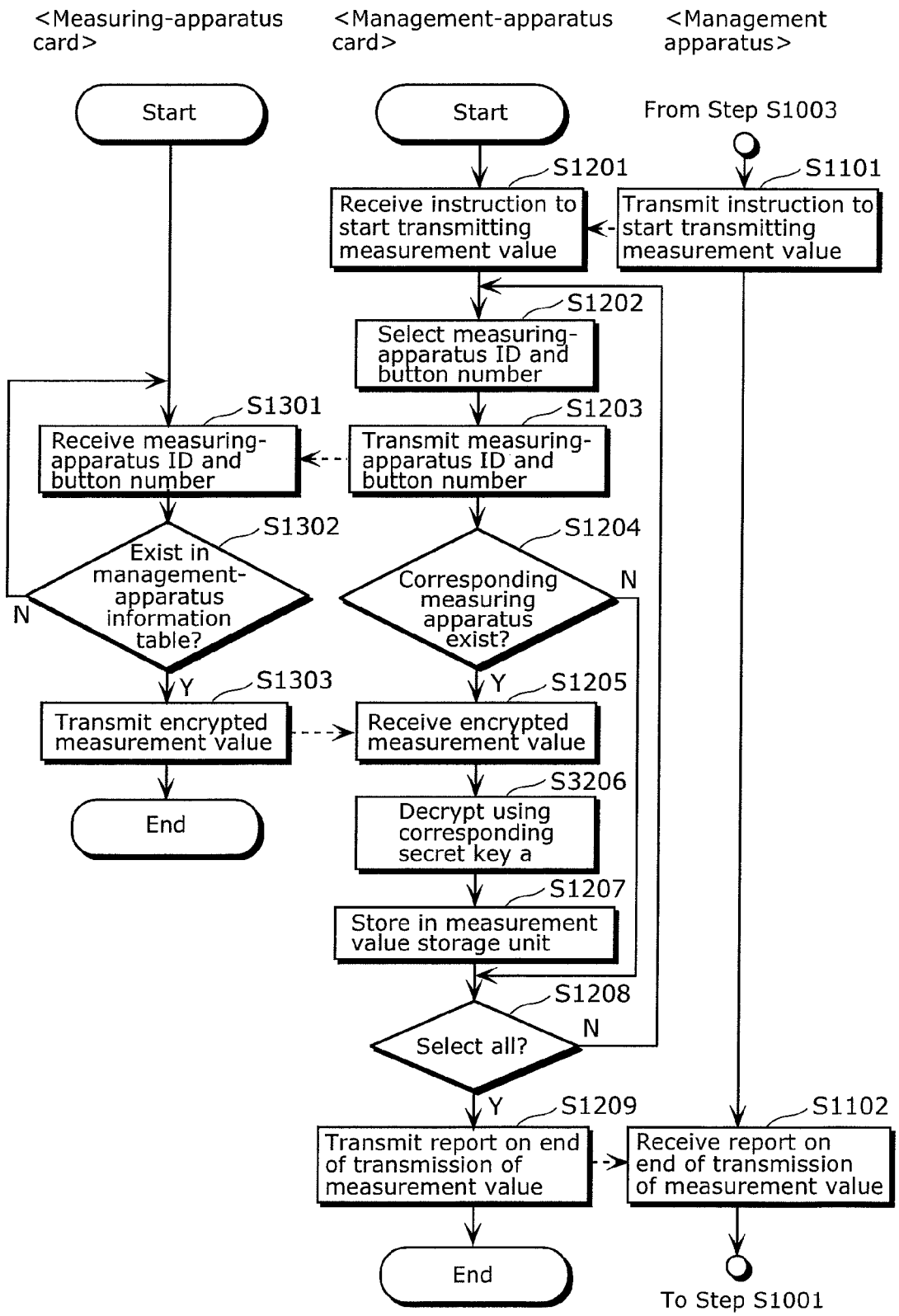
FIG. 28 is a flow chart illustrating a detailed process flow in the measurement value transmission step shown in FIG. 16.

FIG. 28 is a flow chart illustrating a detailed process flow in the measurement value transmission step (Step S1004) shown in FIG. 16. In FIG. 28, a left flow chart illustrates a process flow in the measuring-apparatus card 102 attached to the measuring apparatus 101. Furthermore, a central flow chart illustrates a process flow in the management-apparatus card 106 attached to the management apparatus 105. Moreover, a right flow chart illustrates a process flow in the management apparatus 105.

Since the respective flow charts of the management apparatus 105 and the measuring-apparatus card 102 are the same as the flow charts shown in FIG. 17 in the embodiment 1, a description of the respective flow charts is omitted.

Furthermore, since the flow chart of the management-apparatus card 106 is the same as the flow chart shown in FIG. 17 in the embodiment 1, except Step S3206, only Step S3206 will be described.

After the encrypted measurement value is received from the measuring-apparatus card 102, the decrypting unit 1066 obtains the secret key a corresponding to the encrypted measurement value from the measuring-apparatus information table 1064a. The decrypting unit 1066 then decrypts the encrypted measurement value using the obtained secret key a (Step S3206).

Figure 29:
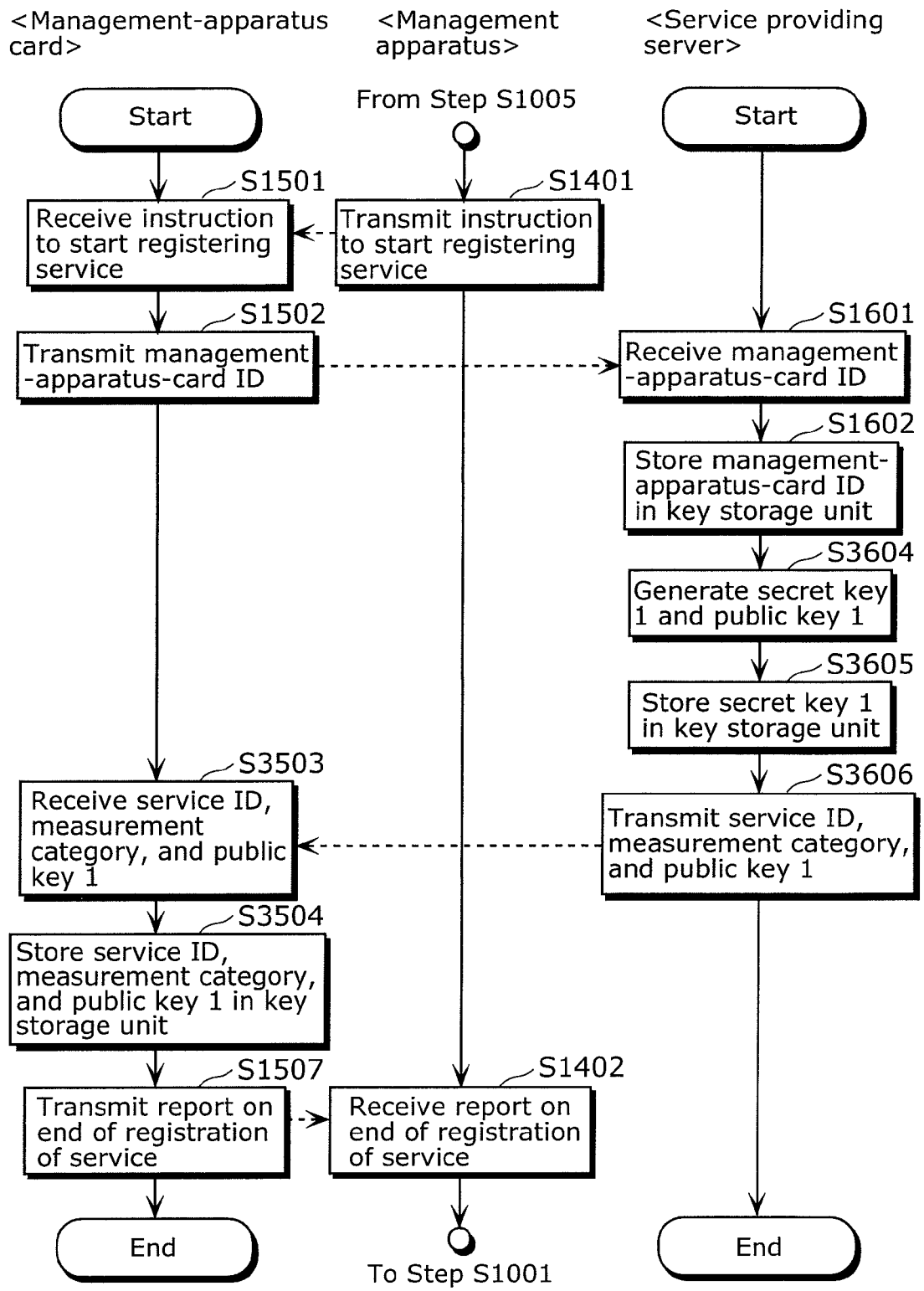
FIG. 29 is a flow chart illustrating a detailed process flow in the service registration step shown in FIG. 16.

FIG. 29 is a flow chart illustrating a detailed process flow in the service registration step (Step S1006) shown in FIG. 16. In FIG. 29, a left flow chart illustrates a process flow in the management-apparatus card 106 attached to the management apparatus 105. Furthermore, a central flow chart illustrates a process flow in the management apparatus 105. Moreover, a right flow chart illustrates a process flow in the service providing server 107.

Since the flow chart of the management apparatus 105 is the same as the flow chart shown in FIG. 18 in the embodiment 1, a description of the flow chart is omitted.

First, the flow chart of the management-apparatus card 106 will be described.

As with the embodiment 1, first, the card I/F unit 1061 receives an instruction to start registering a service from the management apparatus 105 (Step S1501). The communication unit 1069 then transmits the management-apparatus-card ID stored in the card ID storage unit 1062 to the service providing server 107 via the communication path 110 (Step S1502). The communication unit 1069 then receives a service ID, a measurement category, and a public key 1 from the service providing server 107 via the communication path 110 (Step S3503). The key storage unit 1064 then stores the received service ID, measurement category, public key 1 into the service information table 1064b (Step S3504). The card I/F unit 1061 then transmits a report on an end of the registration of the service to the management apparatus 105 (Step S1507).

Next, the flow chart of the service providing server 107 will be described.

As with the embodiment 1, first, the communication unit 1072 receives the management-apparatus-card ID from the management-apparatus card 106 via the communication path 110 (Step S1601). The key storage unit 1074 then stores the received management-apparatus-card ID (Step S1602). The key calculation unit 1073 then generates a public key 1 and a secret key 1 corresponding to the public key 1, using the received management-apparatus-card ID and the service ID stored in the service ID storage unit 1071 (Step S3604). The key storage unit 1074 then stores the generated secret key 1 in association with the management-apparatus-card ID and the service ID (Step S3605). Lastly, the communication unit 1072 transmits the public key 1, the service ID stored in the service ID storage unit 1071, and the measurement category to the management-apparatus card 106 via the communication path 110 (Step S3606).

Figure 30:
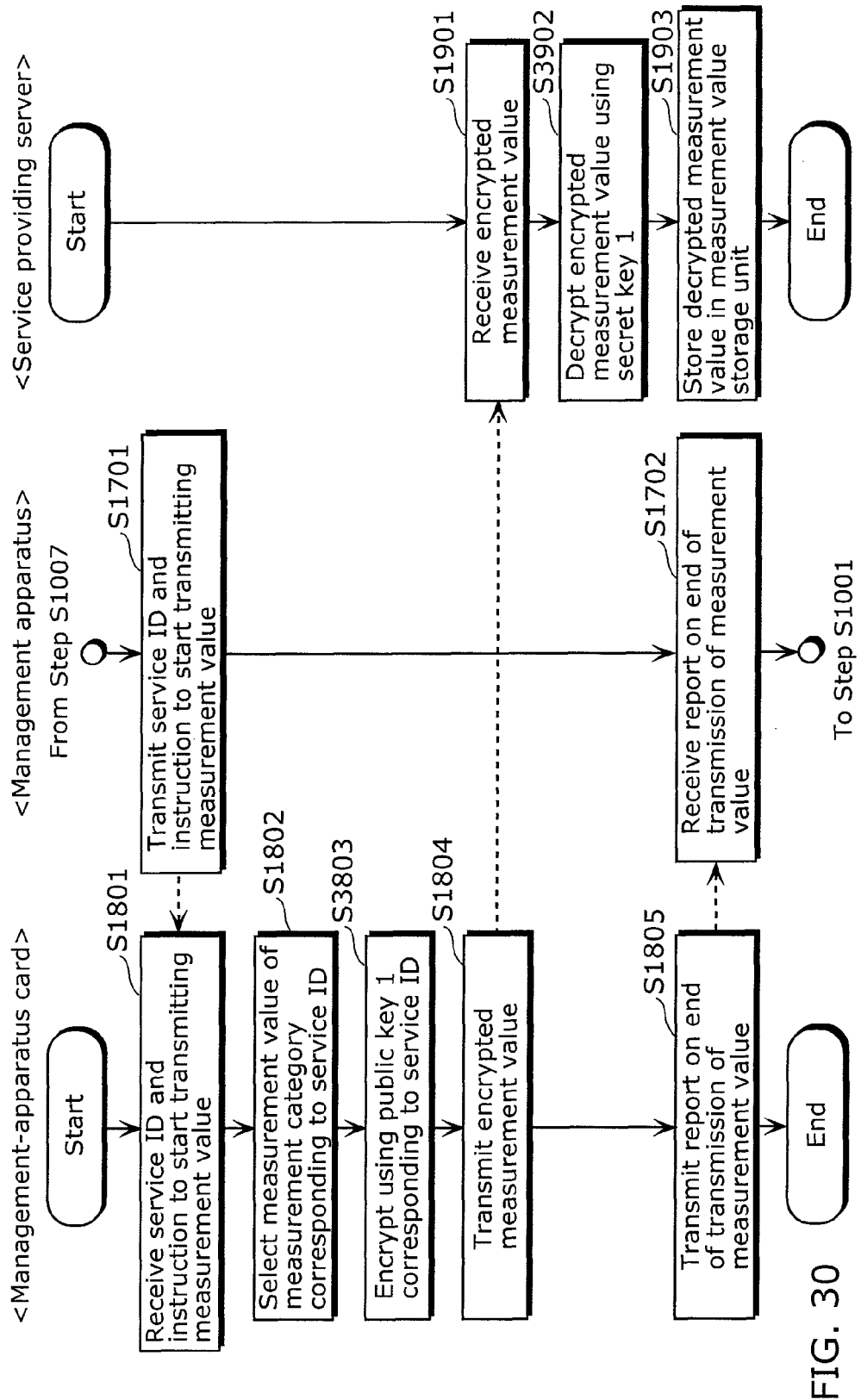
FIG. 30 is a flow chart illustrating a detailed process flow in the measurement value transmission step shown in FIG. 16.

FIG. 30 is a flow chart illustrating a detailed process flow in the measurement value transmission step (Step S1008) shown in FIG. 16. In FIG. 30, a left flow chart illustrates a process flow in the management-apparatus card 106 attached to the management apparatus 105. Furthermore, a central flow chart illustrates a process flow in the management apparatus 105. Moreover, a right flow chart illustrates a process flow in the service providing server 107.

Since the flow chart of the management apparatus 105 is the same as the flow chart shown in FIG. 19 in the embodiment 1, a description of the flow chart is omitted.

First, the flow chart of the management-apparatus card 106 will be described.

Since the flow chart of the management-apparatus card 106 is the same as the flow chart in the embodiment 1, except Step S3803, only Step S3803 will be described.

After the measurement value corresponding to the measurement category is selected, the encrypting unit 1068 obtains the public key 1 corresponding to the received service ID by referring to the service information table 1064b. The encrypting unit 1068 then encrypts the selected measurement value using the obtained public key 1 (Step S3803).

Next, the flow chart of the service providing server 107 will be described.

Since the flow chart of the service providing server 107 is the same as the flow chart in the embodiment 1, except Step S3902, only Step S3902 will be described.

After the encrypted measurement value is received from the management-apparatus card 106, the decrypting unit 1075 obtains the secret key 1 corresponding to the received encrypted measurement value from the key storage unit 1074. The decrypting unit 1075 then decrypts the received encrypted measurement value using the obtained secret key 1 (Step S3902).

As described above, the health care system 100 according to the embodiment 2 assures the confidentiality of the measurement value by transmitting and receiving the measurement value encrypted with the public key encryption system. That is to say, since the measuring-apparatus card 102 encrypts the measurement value using the public key, even if the encryption key held by the measuring apparatus 101 or the measuring-apparatus card 102 is disclosed to the public, the confidentiality of the measurement value can be assured.

(Other Modifications)

It is to be noted that the present invention is not certainly limited to the above embodiments. The present invention includes the following cases.

(1) Although, in the above embodiments, in Measuring Apparatus Registration Phase, the data such as the measuring-apparatus ID, the button number, and the management-apparatus-card ID are transmitted and received when the management-apparatus card, which is a contact IC card, is attached to the measuring apparatus, the present invention is not limited to this configuration. For instance, the management-apparatus card may be a contactless IC card having a contactless communication function. In this case, for example, when the management-apparatus card is detected in a short distance from the measuring apparatus so that one-to-one correspondence with the measuring apparatus becomes possible, the data are transmitted and received, with the contactless communication function, between the management-apparatus card and the measuring apparatus or the measuring-apparatus card.

(2) Although, in the above embodiments, in Measuring Apparatus Registration Phase, the button information corresponding to the user is used to identify the user of the management-apparatus card attached to the measuring apparatus, the measuring apparatus according to the present invention may use information other than the button information as long as the information can identify a user. For instance, the measuring apparatus according to the present invention may use biometric information such as a fingerprint, a voiceprint, and hand veins or information such as a mere foot size.

In the case where, for example, not the button information but foot size information is used, in Measuring Apparatus Registration Phase, the measuring apparatus measures a foot size of the user who steps on a weight scales and stores, into the management-apparatus card, the measured foot size as information identifying the user. In Measurement Phase, the measuring apparatus can subsequently store a body weight corresponding to the foot size for each user by measuring the body weight together with the foot size. For this reason, it becomes possible to safely and surely collect a measurement value for each user without making the user aware of an action for identifying the user oneself. Furthermore, as with the body weight and the like, in the case of vital sign data having little variations in the measurement value depending on users, the measuring apparatus may identify the user by a measurement value history, a measurement value range (e.g. a body weight from 65 kg to 70 kg, from 40 kg to 43 kg, and so on), and the like. Moreover, the measuring apparatus may identify the user by Radio Frequency Identification (RF-ID) implanted in a body of the user. The measuring apparatus may also identify the user by a face of the user captured by a camera, a body shape of the user, and the like. In addition, the measuring apparatus may identify the user by personal identification information received from an apparatus different from the measuring apparatus. For instance, in the case where there is an automatic bath system which sets an optimal hot water temperature by identifying the user, the weight scales may receive the personal identification information recognized by the automatic bath system. Consequently, since the weight scales can identify the user in the case where the user measures the body weight of the user after taking a bath, it is possible to store body weight information for each user.

(3) The measuring-apparatus card and the management-apparatus card are not limited to have a card shape. The measuring-apparatus card and the management-apparatus card may have any shape such as a button shape. In addition, the measuring-apparatus card and the management-apparatus card each may be not a removable card but a card integrated with a corresponding one of the measuring apparatus and the management apparatus.

(4) The management-apparatus card may be not a card different for each user but a card to be shared among users. In this case, for example, the management-apparatus card manages, for each user, measurement data stored therein using a password. Specifically, the management-apparatus card can manage, for each user, measurement data stored therein by identifying the user based on a password inputted by the user when the management-apparatus card is attached to an apparatus. In addition, the management-apparatus card may identify the user by using information other than the password. For instance, the management-apparatus card may include a fingerprint reader and identify the user by a fingerprint of the user read by the fingerprint reader. This allows the management-apparatus card to be shared with family members and the like. That is to say, it is possible to save trouble changing a card to be attached to the management apparatus every time the user is replaced.

(5) The measurement value may be stored not into the measuring-apparatus card and the management-apparatus card but into the measuring apparatus and the management apparatus safely. For example, the measurement value may be stored into a tamper resistant region in the measuring apparatus and the management apparatus or into a regular storage region in the measuring apparatus and the management apparatus after being encrypted.

(6) The management apparatus may not be a stationary apparatus such as a desktop PC. For instance, the management apparatus may be a portable mobile terminal such as a mobile phone. Further, the management apparatus may be the portable mobile terminal integrated with the management-apparatus card. Accordingly, the user can check the stored measurement value regardless of a location at which the management apparatus is set.

(7) In the above embodiments, the management-apparatus card requests, from the measuring-apparatus card, a measurement value corresponding to a predetermined measuring apparatus and a predetermined button, with the management-apparatus card being attached to the management apparatus as a trigger. The management-apparatus card, however, may request the measurement value from the measuring-apparatus card periodically. In addition, when the management-apparatus card is detected in a predetermined distance from the measuring apparatus or the measuring-apparatus card, the management-apparatus card may request the measurement value from the measuring-apparatus card. Accordingly, the user can accumulate the measurement value in the management-apparatus card without being aware of anything in particular.

(8) In the above embodiments, the measuring-apparatus card transmits the measurement value to the management-apparatus card in response to the request from the management-apparatus card. However, in the case where the management-apparatus card is attached to the management apparatus, the measuring-apparatus card may transmit the measurement value to the management-apparatus card even when there is no request from the management-apparatus card and every time the measuring apparatus measures vital sign data. In addition, when the measuring apparatus is activated, the measuring-apparatus card may transmit the measurement value to the management-apparatus card. In this case, since the management-apparatus card may not be attached to the management apparatus when the measurement value is transmitted to the management apparatus, for instance, the management apparatus may accumulate the transmitted measurement value in a memory and provide the measurement value accumulated in the memory to the management-apparatus card when the management-apparatus card is attached to the management apparatus.

(9) In the above embodiments, when the management-apparatus card is attached to the management apparatus, the management-apparatus card receives the measurement value transmitted from the measuring apparatus. However, when the management-apparatus card is not attached to the management apparatus, the management-apparatus card may receive the measurement value transmitted from the measuring apparatus. For example, when the management-apparatus card is in a pocket of a shirt of the user, the management-apparatus card may receive the measurement value transmitted from the measuring apparatus. As a result, the user can easily accumulate the measurement value in the management-apparatus card.

(10) Although, in the above embodiments, the measuring-apparatus card encrypts the measurement value when the measuring-apparatus card receives the measurement value from the measuring apparatus, the measuring-apparatus card may encrypt the measurement value when the measuring-apparatus card transmits the measurement value to the management-apparatus card. In this case, the measurement value storage unit included in the measuring-apparatus card stores the measurement value which is not encrypted into the measurement value table.

(11) In the above embodiments, the management-apparatus card transmits the measurement value to the service providing server, with the management-apparatus card being attached to the management apparatus as a trigger. The management-apparatus card, however, may transmit the measurement value to the service providing server, with the service providing server periodically polling the management-apparatus card as a trigger. It is to be noted that although the management apparatus makes, to the measuring apparatus, a request to transmit, for example, "Transmit Measurement Value Corresponding to Button 1", the present invention is not limited to this. For instance, even in the case where there is no request to transmit from the management apparatus, the measuring apparatus may transmit the measurement value and the button number to the management apparatus. In this case, for example, the management apparatus may accumulate the received measurement value and button number in the memory, and receive, from the memory, the measurement value corresponding to the button number when the management-apparatus card is attached to the management apparatus.

(12) Although, in the above embodiments, the measuring-apparatus card and the management-apparatus card share the secret function f in advance, the measuring-apparatus card and the management-apparatus card may share a secret master key. In this case, the measuring-apparatus card and the management-apparatus card generate a shared key using the secret master key and a public function (e.g. Hash function SHA-1).

(13) Although, in the above embodiments, association of information (e.g. button) identifying the user corresponding to the measurement value with the management-apparatus card (card different for each user) is performed by referring to the table stored in the management-apparatus card, the association may be performed by referring to the table stored in the measuring apparatus or the measuring-apparatus card. In this case, the management-apparatus-card ID and the shared key are stored into the measuring apparatus or the measuring-apparatus card. For this reason, the management-apparatus card can collect the measurement value, with the management-apparatus-card ID stored in the measuring apparatus or the measuring-apparatus card being a clue.

(14) In the above embodiments, the shared key of the measuring-apparatus card and the management-apparatus card is generated using the management-apparatus-card ID, the measuring-apparatus ID, and the button number. However, the shared key of the measuring-apparatus card and the management-apparatus card may be generated using the measuring-apparatus ID, which is information indicating the measuring-apparatus card and which is stored in the measuring-apparatus card, in addition to the management-apparatus-card ID, the measuring-apparatus ID, and the button number. In this case, when both of the measuring-apparatus card and the management-apparatus card can be connected to the measuring apparatus simultaneously, the measuring-apparatus card may directly transmit the measuring-apparatus-card ID to the management-apparatus card at a time when both of the measuring-apparatus card and the management-apparatus card are connected in such a manner. On the other hand, when both of the measuring-apparatus card and the management-apparatus card cannot be connected to the measuring apparatus simultaneously, the measuring apparatus first may receive the measuring-apparatus-card ID from the measuring-apparatus card attached to the measuring apparatus, and then transmit the measuring-apparatus card ID to the management-apparatus card attached to the measuring apparatus which is replaced by the management-apparatus card.

(15) Although the measuring-apparatus card or the like stores the measurement value in association with the button number, the measurement value may be stored further in association with time information. In this case, for instance, the measuring apparatus includes a time information receiving unit which receives time information. In Measurement Phase, the measuring-apparatus card may receive, from the measuring apparatus, the measurement value and the time information received by the time information receiving unit at measurement. Further, the measuring-apparatus card may store the measurement value and the time information together. The time information may indicate an absolute time or a relative time such as a timer and a counter. In addition, the time information may be transmitted from the management-apparatus card to the service providing server as necessary. Accordingly, for example, the service providing server can know variations in a measurement value corresponding to a time. It is to be noted that in the case where the time information is the relative time such as the timer and the counter, the management apparatus or the service providing server which manages a relationship between the absolute time and the relative time may convert the relative time into the absolute time.

(16) Although, in the above embodiments, the measurement value is transmitted using the near field wireless communication in the case where the measuring-apparatus card transmits the measurement value to the management-apparatus card, a communication method to be used is not limited to the near field wireless communication. For instance, the communication method may be wide-area wireless communication used for communication of a mobile phone, PHS, and the like, and wire communication such as a wide area network and a local area network (LAN). Accordingly, even when the user is at a place away from the measuring apparatus (e.g. hospital away from home), the user can receive measurement data stored in the measuring-apparatus card.

(17) Each of the above apparatuses is specifically a computer system including a micro processing unit, a ROM, a RAM, a hard disk unit, a display unit, a keyboard, a mouse, and the like. A computer program is stored in the RAM or the hard disk unit. The micro processing unit operates according to the computer program, so that each of the apparatuses fulfills a function. Here, in order to fulfill predetermined functions, the computer program is programmed by combining plural instruction codes each of which indicates an instruction for a computer.

(18) Part or all of the components included in each of the above apparatuses may be included in one system large scale integration (LSI). The system LSI is a super-multifunctional LSI manufactured by integrating components on one chip and is, specifically, a computer system including a micro processing unit, a ROM, a RAM, and the like. The computer program is stored in the RAM. The micro processing unit operates according to the computer program, so that the system LSI fulfills its function.

(19) Part or all of the components included in each of the above apparatuses may be included in an IC card removable from each of the apparatuses or in a stand alone module. The IC card or the module is a computer system including a micro processing unit, a ROM, a RAM, and the like. The IC card or the module may include the above super-multifunctional LSI. The micro processing unit operates according to the computer program, so that the IC card or the module fulfills its function. The IC card or the module may have tamper-resistance.

(20) The present invention may be any of the above methods. Furthermore, the present invention may be a computer program which causes a computer to execute these methods, and a digital signal which is composed of the computer program.

Moreover, in the present invention, the computer program or the digital signal may be recorded on a computer-readable recording medium such as a flexible disk, a hard disk, a CD-ROM, an MO, a DVD, a DVD-ROM, a DVD-RAM, a Blu-ray Disc, and a semiconductor memory. In addition, the digital signal may be recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a micro processing unit and a memory. The memory may store the above computer program, and the micro processing unit may operate according to the computer program.

Furthermore, the present invention may execute the computer program or the digital signal in another independent computer system by recording the computer program or the digital signal on the recording medium and transmitting the recorded computer program or digital signal or by transmitting the computer program or the digital signal via the network and the like.

(21) The above embodiments and the above modifications may be combined respectively.

INDUSTRIAL APPLICABILITY

In the management-apparatus card and health care system according to the present invention, a user can measure a body weight and the like of the user empty-handed, and at a later date only such information of the user of the management-apparatus card can be collected based on a correspondence between the information and a button or the like distinguishing the user from users of a measuring apparatus, the correspondence being stored in the management-apparatus card. For this reason, it becomes possible to safely collect and accumulate the information of the user and further to safely transmit the information to a service provider, and the management-apparatus card and health care system according to the present invention are useful for a remote health care system which does not cause a mental and physical strain to a user. In addition, because the user can carry the information of the user, the management-apparatus card and health care system according to the present invention are useful for a mobile health care system.

What is claimed is:

1. A management-apparatus card capable of being physically attached to a management apparatus and being physically attached to a measuring apparatus, the management apparatus receiving encrypted vital sign data from the measuring apparatus and managing the received encrypted vital sign data, the measuring apparatus measuring vital sign data of a user of the measuring apparatus and encrypting the vital sign data using an encryption key, said management-apparatus card comprising:

an interface unit configured to receive, from the measuring apparatus, first unique information identifying the measuring apparatus, and identification information identifying the user of the measuring apparatus;

a first storage unit configured to store second unique information identifying said management-apparatus card;

a generation unit configured to generate a decryption key corresponding to the encryption key, the decryption key being generated using the first unique information, the second unique information, and the identification information;

a second storage unit configured to store the generated decryption key; and a control unit configured to:
receive the encrypted vital sign data from the measuring apparatus;

decrypt the received vital sign data using the stored decryption key; and obtain the decrypted vital sign data, wherein said management-apparatus card is a portable IC card, and wherein said interface unit is configured to receive, when said management-apparatus card is physically attached to the measuring apparatus, the first unique information and the identification information from the measuring apparatus.

2. The management-apparatus card according to claim 1, wherein said control unit is configured to receive the encrypted vital sign data from the measuring apparatus, when said management-apparatus card identifies the user based on the identification information and transmits to the measuring apparatus a request for the vital sign data corresponding to the identification information.

3. The management-apparatus card according to claim 1, wherein said control unit is configured to receive the encrypted vital sign data from the measuring apparatus, when said management-apparatus card identifies the user based on the identification information and receives from the measuring apparatus a notification of transmission of the vital sign data corresponding to the identification information of the identified user.

4. The management-apparatus card according to claim 1, wherein said control unit is configured to transmit the identification information to the measuring apparatus, and receive the encrypted vital sign data corresponding to the identification information from the measuring apparatus, when said management-apparatus card is detected within a predetermined range of the measuring apparatus.

5. The management-apparatus card according to claim 1, wherein said control unit is further configured to transmit the decrypted vital sign data to the management apparatus.

6. The management-apparatus card according to claim 1, wherein the encryption key is a public key, and the decryption key is a secret key corresponding to the public key, and said generation unit is configured to generate the public key and the secret key, using the first unique information, the second unique information, and the identification information.

7. A measuring apparatus transmitting vital sign data to a management-apparatus card physically attached to a management apparatus, the management apparatus managing the vital sign data, said measuring apparatus comprising:

a measuring unit configured to measure vital sign data of a user of said measuring apparatus;

a storage unit configured to store first unique information identifying said measuring apparatus;

an interface unit configured to:

receive second unique information identifying the management-apparatus card from the management-apparatus card;

store, in said storage unit, the second unique information in association with identification information identifying the user; and transmit the first unique information and the identification information to the management-apparatus card; and a control unit configured to:

obtain, from said storage unit, the first unique information, the second unique information, and the identification information;

generate an encryption key based on the first unique information, the second unique information, and the identification information;

obtain the vital sign data corresponding to the user from said measuring unit;

encrypt the obtained vital sign data using the encryption key; and transmit the encrypted vital sign data to the management-apparatus card, wherein the management-apparatus card is a portable IC card, and wherein, when said measuring apparatus is physically connected to the management-apparatus card, said interface unit is configured to receive the second unique information from the management-apparatus card and to transmit the first unique information and the identification information to the management-apparatus card.

8. The measuring apparatus according to claim 7, further comprising a measuring-apparatus card attached to said measuring apparatus, said measuring-apparatus card being distinct from the management-apparatus card, wherein said measuring-apparatus card includes said control unit configured to:

obtain, from said storage unit, the first unique information, the second unique information, and the identification information;

generate the encryption key based on the first unique information, the second unique information, and the identification information;

obtain the vital sign data corresponding to the user from said measuring unit;

encrypt the obtained vital sign data using the encryption key; and transmit the encrypted vital sign data to the management-apparatus card.

9. The measuring apparatus according to claim 7, further comprising a specifying unit configured to specify the user among a plurality of users of said measuring apparatus, wherein said control unit is configured to encrypt the vital sign data corresponding to the user, using the encryption key generated based on the first unique information, the second unique information, and the identification information, when said specifying unit specifies the user.

10. The measuring apparatus according to claim 7, wherein said control unit is configured to transmit the encrypted vital sign data to the management-apparatus card, when the management-apparatus card identifies the user based on the identification information and transmits to said measuring apparatus a request for the vital sign data corresponding to the identification information.

11. The measuring apparatus according to claim 7, wherein said control unit is configured to:

identify the user based on the identification information;

transmit to the management-apparatus card a notification of transmission of the vital sign data corresponding to the identification information of the identified user; and transmit the encrypted vital sign data to the management-apparatus card.

12. The measuring apparatus according to claim 7, wherein said control unit is configured to receive the identification information from the management-apparatus card, and transmit the encrypted vital sign data corresponding to the identification information to the management-apparatus card, when the management-apparatus card is detected within a predetermined range of said measuring apparatus.

13. A health care system comprising:
a measuring apparatus measuring vital sign data; and
a management apparatus managing the vital sign data; and
a measuring-apparatus card capable of being physically attached to said measuring apparatus, said measuring-apparatus card transmitting the vital sign data to a management-apparatus card physically attached to said measuring apparatus,
wherein said measuring apparatus includes:
  a measuring unit configured to measure the vital sign data of a user of said measuring apparatus;
  a storage unit configured to store first unique information identifying said measuring apparatus; and
  an interface unit configured to:
    receive second unique information identifying the management-apparatus card from the management-apparatus card;
    store, in said storage unit, the second unique information in association with identification information identifying the user; and
    transmit the first unique information and the identification information to the management-apparatus card,
wherein said measuring-apparatus card includes a control unit configured to:
  receive, from said measuring apparatus, the first unique information, the second unique information, and the identification information;
  generate an encryption key based on the first unique information, the second unique information, and the identification information;
  obtain from said measuring apparatus the vital sign data corresponding to the user;
  encrypt the obtained vital sign data using the encryption key; and
  transmit the encrypted vital sign data corresponding to the user to the management-apparatus card,
wherein said measuring-apparatus card is portable IC card, and
wherein, when said measuring apparatus is physically connected to the management-apparatus card, said interface unit is configured to receive the second unique information from the management-apparatus card and to transmit the first unique information and the identification information to the management-apparatus card.

14. A health care system comprising:
a measuring apparatus measuring vital sign data;
a management apparatus managing the vital sign data;
a measuring-apparatus card capable of being physically attached to said measuring apparatus and transmitting the vital sign data to said management apparatus; and
a management-apparatus card capable of being physically attached to said measuring apparatus and being physically attached to said management apparatus, said management-apparatus card receiving the vital sign data, and storing the received vital sign data in said management apparatus,
wherein said management-apparatus card includes:
  a first interface unit configured to receive, from said measuring apparatus, first unique information identifying said measuring apparatus, and identification information indentifying a user of said measuring apparatus;
  a first storage unit configured to store second unique information identifying said management-apparatus card;
  a first control unit configured to generate a decryption key, using the first unique information, the second unique information, and the identification information; and
  a second storage unit configured to store the generated decryption key,
wherein said measuring apparatus includes:
  a measuring unit configured to measure the vital sign data of the user of said measuring apparatus;
  a third storage unit configured to store the first unique information; and
  a second interface unit configured to receive the second unique information from said management-apparatus card, and transmit to said management-apparatus card the first unique information and the identification information,
wherein said measuring-apparatus card includes a second control unit configured to:
  receive, from said measuring apparatus, the first unique information, the second unique information, and the identification information;
  generate an encryption key corresponding to the decryption key based on the first unique information, the second unique information, and the identification information;
  receive the vital sign data corresponding to the user from said measuring apparatus;
  encrypt the received vital sign data using the encryption key; and
  transmit the encrypted vital sign data corresponding to the user to said management-apparatus card attached to said measuring apparatus,
wherein said first control unit is configured to decrypt the encrypted vital sign data using the decryption key stored in said second storage unit, and transmit the decrypted vital sign data to said management apparatus, when said management-apparatus card receives the encrypted vital sign data from said measuring-apparatus card,
wherein said management-apparatus card is a portable IC card and said measuring-apparatus card is a portable IC card,
wherein said first interface unit is configured to receive, when said management-apparatus card is physically attached to said measuring apparatus, the first unique information and the identification information from said measuring apparatus, and
wherein, when said measuring apparatus is physically connected to said management-apparatus card, said second interface unit is configured to receive the second unique information from said management-apparatus card and to transmit the first unique information and the identification information to said management-apparatus card.

15. The health care system according to claim 14, wherein said measuring apparatus further includes an identification unit configured to identify the user among a plurality of users of said measuring apparatus, and
said second interface unit is configured to transmit, to said management-apparatus card, identification information of the user identified by said identification unit, when said management-apparatus card is attached to said second interface unit, and to transmit, to said measuring-apparatus card, vital sign data of the user identified by said identification unit, when said measuring-apparatus card is attached to said second interface unit.

16. The health care system according to claim 15, wherein said identification unit is a button provided on said measuring apparatus.

17. A health care system comprising:
a measuring apparatus measuring vital sign data;
a management apparatus managing the vital sign data;
a measuring-apparatus card capable of being physically attached to said measuring apparatus transmitting the vital sign data to said management apparatus
a management-apparatus card capable of being physically attached to said management apparatus and being physically attached to said measuring apparatus, receiving the vital sign data, and storing the received vital sign data in said management apparatus,
wherein said management-apparatus card includes:
  a first interface unit configured to receive, from said measuring apparatus, first unique information identifying said measuring apparatus, and identification information indentifying a user of said measuring apparatus;
  a first storage unit configured to store second unique information identifying said management-apparatus card;
  a first control unit configured to generate a public key and a secret key, using the first unique information, the second unique information, and the identification information; and
  a second storage unit configured to store the generated secret key,
wherein said measuring apparatus includes:
  a measuring unit configured to measure the vital sign data of the user of said measuring apparatus;
  a third storage unit configured to store the first unique information; and
  a second interface unit configured to transmit the first unique information and the identification information to said management-apparatus card, and receive the public key from said management-apparatus card, the public key being generated at by said management-apparatus card by using the first unique information and the identification information transmitted by said second interface unit,
wherein said measuring-apparatus card includes a second control unit configured to:
  receive, from said measuring apparatus, the public key and the vital sign data corresponding to the user;
  encrypt the received vital sign data using the public key; and
  transmit the encrypted vital sign data corresponding to the user to said management-apparatus card, said measuring-apparatus card being attached to said measuring apparatus,
wherein said first control unit is configured to decrypt the encrypted vital sign data using the secret key stored in said second storage unit, and store the decrypted vital sign data in said management apparatus, when said management-apparatus card receives the encrypted vital sign data from said measuring-apparatus card,
wherein said management-apparatus card is a portable IC card and said measuring-apparatus card is a portable IC card,
wherein said first interface unit is configured to receive, when said management-apparatus card is physically attached to said measuring apparatus, the first unique information and the identification information from said measuring apparatus, and
wherein, when said measuring apparatus is physically connected to said management-apparatus card, said second interface unit is configured to receive the second unique information from said management-apparatus card and to transmit the first unique information and the identification information to said management-apparatus card.

18. A method for communicating vital sign data in a health care system, the health care system including a measuring apparatus, a management apparatus, a measuring-apparatus card, and a management-apparatus card, the measuring apparatus measuring vital sign data, the management apparatus managing the vital sign data, the measuring-apparatus card being capable of being physically attached to the measuring apparatus and transmitting the vital sign data to the management apparatus, the management-apparatus card being capable of being physically attached to the management apparatus and being physically attached to the measuring apparatus, receiving the vital sign data, and storing the received vital sign data in the management apparatus, the method comprising:
  receiving, at the management-apparatus card from the measuring apparatus, first unique information identifying the measuring apparatus, and identification information identifying a user of the measuring apparatus;
  generating, at the management-apparatus card, a decryption key using the first unique information, second unique information identifying the management-apparatus card, and the identification information;
  measuring, at the measuring apparatus, the vital sign data of the user of the measuring apparatus;
  receiving, at the measuring apparatus from the management-apparatus card, the second unique information;
  transmitting, from the measuring apparatus to the management-apparatus card, the first unique information and the identification information;
  receiving, at the measuring-apparatus card from the measuring apparatus, the vital sign data corresponding to the user together with the first unique information and the second unique information, when the measuring-apparatus card transmits the vital sign data corresponding to the user to the management-apparatus card attached to the measuring apparatus;
  generating, at the measuring-apparatus card, an encryption key corresponding to the decryption key based on the first unique information, the second unique information, and the identification information;
  encrypting, at the measuring-apparatus card, the received vital sign data using the encryption key;
  transmitting, from the measuring-apparatus card to the management-apparatus card, the encrypted vital sign data; and
  decrypting, at the management-apparatus card, the encrypted vital sign data using the generated decryption key and storing, at the management-apparatus card, the decrypted vital sign data in the management apparatus, when the management-apparatus card receives the encrypted vital sign data from the measuring-apparatus card,
wherein the management-apparatus card is a portable IC card and the measuring-apparatus card is a portable IC card,
wherein said method further comprises:
  when the management-apparatus card is physically attached to the measuring apparatus, receiving, at the management-apparatus card, the first unique information and the identification information from the measuring apparatus; and
  when the measuring apparatus is physically connected to the management-apparatus card, (i) receiving, at the measuring apparatus, the second unique information from the management-apparatus card, and (ii)

transmitting, at the measuring apparatus, the first unique information and the identification information to the management-apparatus card.

19. A method for communicating vital sign data in a health care system, the health care system including a measuring apparatus, a management apparatus, a measuring-apparatus card, and a management-apparatus card, the measuring apparatus measuring vital sign data, the management apparatus managing the vital sign data, the measuring-apparatus card being capable of being physically attached to the measuring apparatus and transmitting the vital sign data to the management apparatus, the management-apparatus card being capable of being physically attached to the management apparatus and being physically attached to the management apparatus, receiving the vital sign data, and storing the received vital sign data in the management apparatus, the method comprising:

receiving, at the management-apparatus card from the measuring apparatus, first unique information identifying the measuring apparatus, and identification information identifying a user of the measuring apparatus;

generating, at the management-apparatus card, a public key and a secret key using the first unique information, second unique information identifying the management-apparatus card, and the identification information;

measuring, at the measuring apparatus, the vital sign data of the user of the measuring apparatus;

transmitting, from the measuring apparatus to the management-apparatus card, the first unique information and the identification information;

receiving, at the measuring apparatus from the management-apparatus card, the public key generated by using the first unique information and the identification information;

receiving, at the measuring-apparatus card from the measuring apparatus, the public key and the vital sign data corresponding to the user, when the measuring-apparatus card transmits the vital sign data corresponding to the user to the management-apparatus card attached to the measuring apparatus;

encrypting, at the measuring-apparatus card, the received vital sign data using the public key;

transmitting, from the measuring-apparatus card to the management-apparatus card, the encrypted vital sign data; and decrypting, at the management-apparatus card, the encrypted vital sign data using the generated secret key and storing, at the management-apparatus card, the decrypted vital sign data in the management apparatus, when the management-apparatus card receives the encrypted vital sign data from the measuring-apparatus card, wherein said method further comprises:
when the management-apparatus card is physically attached to the measuring apparatus, receiving, at the management-apparatus card, the first unique information and the identification information from the measuring apparatus; and
when the measuring apparatus is physically connected to the management-apparatus card, (i) receiving, at the measuring apparatus, the second unique information from the management-apparatus card and (ii) transmitting, at the measuring apparatus, the first unique information and the identification information to the management-apparatus card.

20. A method comprising:

detecting, at a measuring apparatus, a management-apparatus card being physically attached to the measuring apparatus and first data being inputted to the measuring apparatus by a user;

generating, at the measuring apparatus, first identification information based on the first data, when the management-apparatus card is physically attached to the measuring apparatus and the first data is inputted to the measuring apparatus by the user;

receiving, at the management-apparatus card, the first identification information and first unique information indentifying the measuring apparatus stored in the measuring apparatus from the measuring apparatus, when the management-apparatus card is physically attached to the measuring apparatus and the first data is inputted to the measuring apparatus by the user;

generating, at the management-apparatus card, a decryption key based on the received first identification information, the received first unique information, and second unique information indentifying the management-apparatus card and stored in the management-apparatus card, when the management-apparatus card is physically attached to the measuring apparatus and the first data is inputted to the measuring apparatus by the user;

sending, from the management-apparatus card to the measuring apparatus, the second unique information when the management-apparatus card is physically attached to the measuring apparatus and the first data is inputted to the measuring apparatus by the user;

detecting, at the measuring apparatus, the management-apparatus card being physically removed from the measuring apparatus, a measuring-apparatus card being physically attached to the measuring apparatus, and second data being inputted to the measuring apparatus;

generating, at the measuring apparatus, second identification information based on the second data when the management-apparatus card is physically removed from the measuring apparatus, the measuring-apparatus card is physically attached to the measuring apparatus, and second data is inputted to the measuring apparatus;

receiving, at the measuring-apparatus card, the sent second identification information, the first unique information, and the second identification information from the measuring apparatus when the management-apparatus card is physically removed from the measuring apparatus, the measuring-apparatus card is physically attached to the measuring apparatus, and second data is inputted to the measuring apparatus;

generating, at the measuring-apparatus card, an encryption key, based on the received sent second identification information, the received first unique information, and the received second identification information when the management-apparatus card is physically removed from the measuring apparatus, the measuring-apparatus card is physically attached to the measuring apparatus, and the second data is inputted to the measuring apparatus;

receiving, at the measuring-apparatus card, measurement data being measured by the measuring apparatus, when the management-apparatus card is physically removed from the measuring apparatus, the measuring-apparatus card is physically attached to the measuring apparatus, and the second data is inputted to the measuring apparatus; and encrypting, at the measuring-apparatus card, the received measured data based on the encryption key when the management-apparatus card is physically removed from the measuring apparatus, the measuring-apparatus card is physically attached to the measuring apparatus, and the second data is inputted to the measuring apparatus, wherein, when the first data is identical to the second data, the encrypted measured data is decrypted by using the decryption key at the management-apparatus card.

* * * * *